United States Patent
Liu et al.

(10) Patent No.: US 12,334,806 B2
(45) Date of Patent: *Jun. 17, 2025

(54) HYBRID POWER CONVERSION SYSTEM AND CONTROL METHOD

(71) Applicant: Halo Microelectronics International, Campbell, CA (US)

(72) Inventors: Rui Liu, Fremont, CA (US); Thomas Liu, Freemont, CA (US); Songnan Yang, Frisco, TX (US)

(73) Assignee: Halo Microelectronics International, Campbell, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 18/389,216

(22) Filed: Nov. 13, 2023

(65) Prior Publication Data

US 2024/0079949 A1 Mar. 7, 2024

Related U.S. Application Data

(63) Continuation-in-part of application No. 17/663,696, filed on May 17, 2022, now Pat. No. 11,817,770, which is a continuation-in-part of application No. 17/326,503, filed on May 21, 2021, now Pat. No. 11,451,151.

(51) Int. Cl.
*H02M 1/00* (2007.01)
*H02M 3/07* (2006.01)
*H02M 3/158* (2006.01)

(52) U.S. Cl.
CPC .......... *H02M 1/0095* (2021.05); *H02M 3/07* (2013.01); *H02M 3/1584* (2013.01); *H02M 1/0054* (2021.05); *H02M 3/072* (2021.05)

(58) Field of Classification Search
CPC ..... H02M 3/07; H02M 3/1584; H02M 1/0095
See application file for complete search history.

(56) References Cited

U.S. PATENT DOCUMENTS

| | | | | |
|---|---|---|---|---|
| 7,397,299 B2* | 7/2008 | Ki | ......................... | H02M 3/073 327/536 |
| 8,860,396 B2* | 10/2014 | Giuliano | ................. | H02M 3/07 323/288 |
| 11,451,151 B1* | 9/2022 | Liu | ......................... | H02M 3/07 |
| 2017/0244318 A1* | 8/2017 | Giuliano | ................. | H02M 3/07 |
| 2019/0372457 A1* | 12/2019 | Zhang | ..................... | H02M 1/42 |
| 2020/0212704 A1* | 7/2020 | Eftimie | .................... | H02M 3/07 |
| 2022/0190714 A1* | 6/2022 | Ye | ............................ | H02M 3/07 |
| 2023/0013485 A1* | 1/2023 | Kawano | .................. | H02M 3/07 |

* cited by examiner

*Primary Examiner* — Jue Zhang
(74) *Attorney, Agent, or Firm* — AP3 Law Firm PLLC

(57) ABSTRACT

A converter includes L phase legs, each phase leg of the L phase legs comprising a plurality of switches connected in series between an input power source and ground, wherein a first flying capacitor of an Mth phase is cross-coupled between an Mth phase leg and an (M+1)th phase leg, and a first flying capacitor of an Lth phase is cross-coupled between an Lth phase leg and a first phase leg, and wherein switches of the L phase legs are configured such that a ratio of an input voltage of the hybrid multi-phase step-down power converter to an output voltage of the hybrid multi-phase step-down power converter is equal to N/D, and wherein L, M, N are positive integers with M<L, L>2, and D is a duty cycle of the hybrid multi-phase step-down power converter.

23 Claims, 55 Drawing Sheets

L: Even Integer

L: Odd Integer

HYBRID POWER CONVERSION SYSTEM AND CONTROL METHOD

PRIORITY CLAIM AND CROSS-REFERENCE

This application is a continuation-in-part of U.S. patent application Ser. No. 17/663,696, filed May 17, 2022, now U.S. Pat. No. 11,817,770, and entitled "Hybrid Power Conversion System and Control Method," which is a continuation-in-part of U.S. patent application Ser. No. 17/326,503, filed May 21, 2021, now U.S. Pat. No. 11,451,151, and entitled "Hybrid Power Conversion System and Control Method," all of which are hereby incorporated herein by reference.

TECHNICAL FIELD

The present invention relates to a hybrid power conversion system, and, in particular embodiments, to a hybrid dual-phase step-up power conversion system.

BACKGROUND

As technologies further advance, a variety of portable devices, such as mobile phones, tablet PCs, digital cameras, MP3 players and/or the like, have become popular. Batteries provide power for various high voltage applications such as display backlights, audio amplifiers, piezoelectric haptic actuators and the like. For example, each portable device may comprise a Liquid Crystal Display (LCD). The LCD does not emit light by itself. The LCD needs a backlight to provide illumination so as to produce a visible image. The backlight may be formed by a plurality of light-emitting diodes (LEDs). Each LED typically requires 3.3 V to emit light. Depending on the number of the LEDs, the backlight may need a supply voltage up to 20 V. A boost converter may be coupled between a power source (e.g., a battery) and a high voltage load (e.g., a backlight comprising a plurality of LEDs). The boost converter is configured to convert a source voltage (e.g., the output voltage of a battery cell) to a level (e.g., 20 V) suitable for driving the plurality of LEDs.

A conventional boost converter comprises a switching element, a blocking device, an energy storage element and an output filter. The switching element may be implemented as a metal-oxide-semiconductor field-effect transistor (MOSFET). The blocking device may be implemented as a diode. The energy storage element may be implemented as an inductor. The output filter may be implemented as a capacitor. The diode and the MOSFET are connected in series across the capacitor. The inductor is coupled between an input power source and the common node of the diode and the MOSFET transistor. The conventional boost converter is used to provide an output voltage higher than an input voltage from the input power source by modulating the width of a pulse applied to the MOSFET.

In the portable device, the power source may be implemented as a single-cell battery. In order to achieve an output voltage approximately equal to 20 V, the step-up ratio of the conventional boost converter should be 1:4 or higher. Such a high step-up ratio makes it more difficult to achieve the desired efficiency using the conventional boost converter.

A cascaded power conversion system may be employed to achieve better efficiency. The cascaded power conversion system comprises a boost converter and a charge pump converter connected in cascade. The boost converter can adjust its output voltage by varying the duty cycle of the boost converter. The charge pump converter is able to achieve a step-up ratio of 1:2.

FIG. 1 illustrates a single-phase step-up power conversion system. The single-phase step-up power conversion system 100 comprises an input capacitor 101, an input inductor 102, power switches 103, 104, 105, 106, a first capacitor 107, a second capacitor 108, an output capacitor 109 and a single-phase step-up controller 120. The power switches 103-106 are connected in series between an output terminal Vo and ground. The input capacitor 101 is connected between an input terminal VIN and ground. The input inductor 102 is connected between VIN and a common node of switches 103 and 104. The first capacitor 107 is connected between a common node of switches 105 and 106, and the common node of switches 103 and 104. The second capacitor 108 is connected between a common node of switches 104 and 105, and ground. The single-phase step-up controller 120 is configured to generate gate drive signals applied to the gates of switches 103-106, respectively.

In FIG. 1, the input capacitor 101, the input inductor 102, power switches 103, 104 and the second capacitor 108 form a boost converter. The capacitors 107-109 and power switches 103-106 form a 1:2 step-up charge pump converter. Since the output voltage across the output capacitor 109 is equal to twice of the voltage across the second capacitor 108, which is also the output voltage of the boost converter, the output voltage Vo of the single-phase step-up power conversion system 100 is at least two times higher than the input voltage VIN.

FIG. 2 illustrates gate drive signals associated with the single-phase step-up power conversion system shown in FIG. 1. As shown in FIG. 2, power switches 103 and 105 are turned on (e.g., from t1 to t2) and off (e.g., from t2 to t3) at the same time. Likewise, power switches 104 and 106 are on and off at the same time. In addition, power switches 103 and 104 operate in a complimentary manner. Likewise, power switches 105 and 106 operate in a complimentary manner. By varying the duty cycle of power switch 103, the output voltage can be more than twice of the input voltage. For example, the duty cycle is 50%, the output voltage is four times of the input voltage. It should be noted that in a conventional boost converter, a duty cycle of 50% results in an output voltage equal to twice of the input voltage. Furthermore, with the same output voltage, a higher duty cycle of power switch 103 results in a lower root mean square (RMS) current and power dissipation, thereby achieving higher efficiency. One disadvantage of the single-phase step-up power conversion system shown in FIG. 1 is that ripple currents of capacitors 101, 108, and 109 are high, resulting additional power losses in these capacitors. To reduce the power dissipation of these capacitors, a dual-phase step-up power conversion system is used.

FIG. 3 illustrates a dual-phase step-up power conversion system. The dual-phase step-up power conversion system 200 comprises an input capacitor 201, a first input inductor 211, a second input inductor 221, power switches 212, 213, 214, 215, power switches 222, 223, 224, 225, a first capacitor 216, a second capacitor 217, a third capacitor 202, an output capacitor 203 and a dual-phase step-up controller 230.

The power switches 212-215 are connected in series between an output terminal Vo and ground. The power switches 222-225 are connected in series between an output terminal Vo and ground. The input capacitor 201 is connected between an input terminal VIN and ground. The first input inductor 211 is connected between VIN and a common node of switches 213 and 212. The first capacitor 216 is connected between a common node of switches 215 and 214, and the common node of switches 213 and 212. The second input inductor 221 is connected between VIN and a common node of switches 223 and 222. The second capacitor 217 is connected between a common node of switches 225 and 224, and the common node of switches 223 and 222. The third capacitor 202 is connected between a common node of switches 214 and 213, and ground. The common node of switches 224 and 223 is connected to the common node of switches 214 and 213. The dual-phase step-up controller 230 is configured to generate gate drive signals applied to the gates of switches 212-215 and switches 222-225, respectively.

In FIG. 3, the input capacitor 201, the first input inductor 211, power switches 213, 212 and the third capacitor 202 form a first boost converter. The capacitors 202, 216, 203 and power switches 212-215 form a first 1:2 step-up charge pump. The first boost converter and the first 1:2 step-up charge pump form a first phase of the dual-phase step-up power conversion system 200. The input capacitor 201, the second input inductor 221, power switches 223, 222 and the third capacitor 202 form a second boost converter. The capacitors 202, 217, 203 and power switches 222-225 form a second 1:2 step-up charge pump. The second boost converter and the second 1:2 step-up charge pump form a second phase of the dual-phase step-up power conversion system 200. In FIG. 3, capacitors 201, 202, and 203 are shared between the two boost converters and the two 1:2 step-up charger pumps.

FIG. 4 illustrates gate drive signals associated with the dual-phase step-up power conversion system shown in FIG. 3. The operating principle of the power switches in FIG. 4 is similar to that shown in FIG. 2 except that the two phases shown in FIG. 4 are configured to be out of phase from each other. For example, the switch 212 of the first phase is turned on from a first time instant t1 and a second time instant t2. By employing the out of phase control, the corresponding switch of the second phase (e.g., switch 222) is turned on from a third time instant t3 and a fourth time instant t4. Likewise, the switch 212 is turned off from the second time instant t2 and a fifth time instant t5. Switch 222 is turned off from the fourth time instant t4 and a sixth time instant t6. The out of phase control results in cancellation of ripple currents in capacitors 201, 202, and 203, thereby reducing the power dissipation in these capacitors.

Although better efficiency can be achieved with the dual-phase step-up power conversion system shown in FIG. 3, there are eight power switches and five capacitors in the dual-phase step-up power conversion system. The eight power switches need a large silicon area and many external components.

As power consumption has become more important, there may be a need for simplifying the dual-phase step-up power conversion system shown in FIG. 3. More particularly, the dual-phase step-up power conversion system having eight power switches and five capacitors is not cost-effective. It is desirable to have a simplified system to perform the functions of the dual-phase step-up power conversion system described above with respect to FIG. 3-4.

SUMMARY

These and other problems are generally solved or circumvented, and technical advantages are generally achieved, by preferred embodiments of the present disclosure which provide a hybrid dual-phase step-up power conversion system.

In accordance with an embodiment, a hybrid dual-phase step-up power conversion system comprises a first leg comprising a first switch, a second switch and a third switch connected in series between an output terminal of the hybrid dual-phase step-up power conversion system and ground, a second leg comprising a fourth switch, a fifth switch and a sixth switch connected in series between the output terminal of the hybrid dual-phase step-up power conversion system and ground, and a first capacitor and a second capacitor cross-coupled between the first leg and the second leg, wherein switches of the first leg and switches of the second leg are configured such that a sum of a voltage across the first capacitor and a voltage across the second capacitor is fed into the output terminal of the hybrid dual-phase step-up power conversion system.

In accordance with another embodiment, a method comprises providing a hybrid dual-phase step-up power conversion system comprising a first leg and a second leg comprising a plurality of switches, a first capacitor and a second capacitor cross-coupled between the first leg and the second leg, in a first operating mode of the hybrid dual-phase step-up power conversion system, configuring the plurality of switches of the first leg and the second leg such that the second capacitor and the first capacitor are connected in series between an output of the hybrid dual-phase step-up power conversion system and ground, wherein the first capacitor is connected to ground, and in a second operating mode of the hybrid dual-phase step-up power conversion system, configuring the plurality of switches of the first leg and the second leg such that the first capacitor and the second capacitor are connected in series between the output of the hybrid dual-phase step-up power conversion system and ground, wherein the second capacitor is connected to ground.

In accordance with yet another embodiment, a system comprises a first leg comprising a first switch, a second switch and a third switch connected in series between an output terminal of the system and ground, a second leg comprising a fourth switch, a fifth switch and a sixth switch connected in series between the output terminal of the system and ground, a first inductor connected between an input terminal of the system and a common node of the second switch and the third switch, a second inductor connected between the input terminal of the system and a common node of the fifth switch and the sixth switch, a first capacitor connected between a common node of the fourth switch and the fifth switch, and a common node of the second switch and the third switch, and a second capacitor connected between a common node of the first switch and the second switch, and a common node of the fifth switch and the sixth switch.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a hybrid dual-phase step-up power conversion system. The invention may also be applied, however, to a variety of power systems. Hereinafter, various embodiments will be explained in detail with reference to the accompanying drawings.

Figure 1:
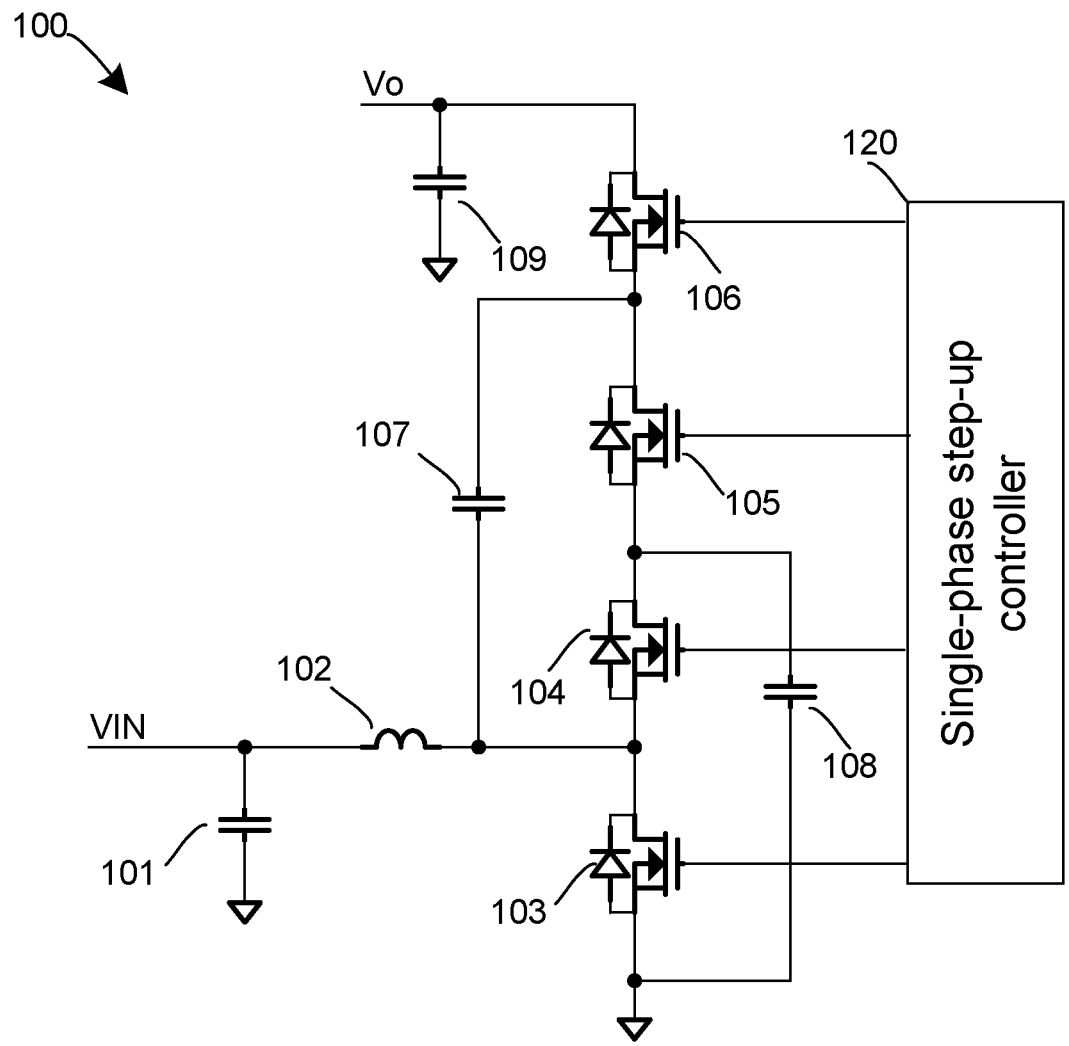
FIG. 1 illustrates a single-phase step-up power conversion system.
Figure 2:
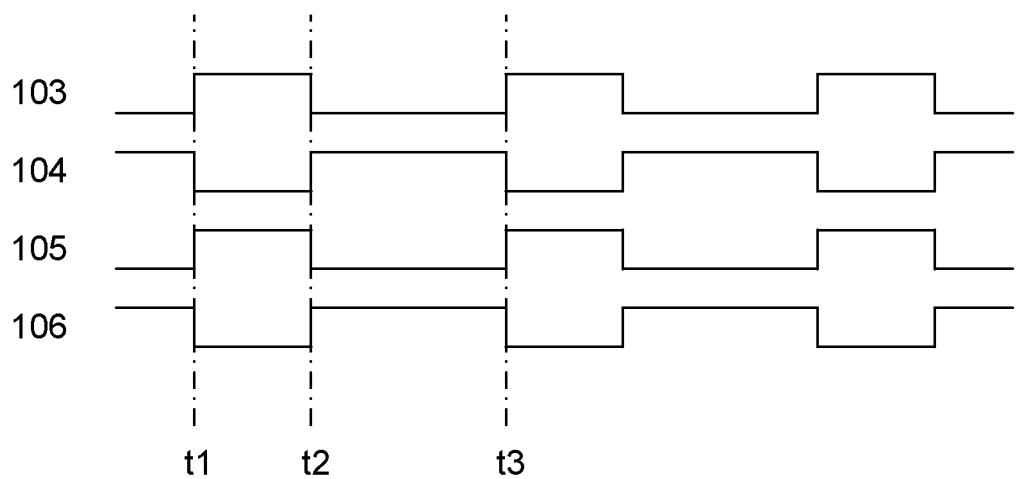
FIG. 2 illustrates gate drive signals associated with the single-phase step-up power conversion system shown in FIG. 1.
Figure 3:
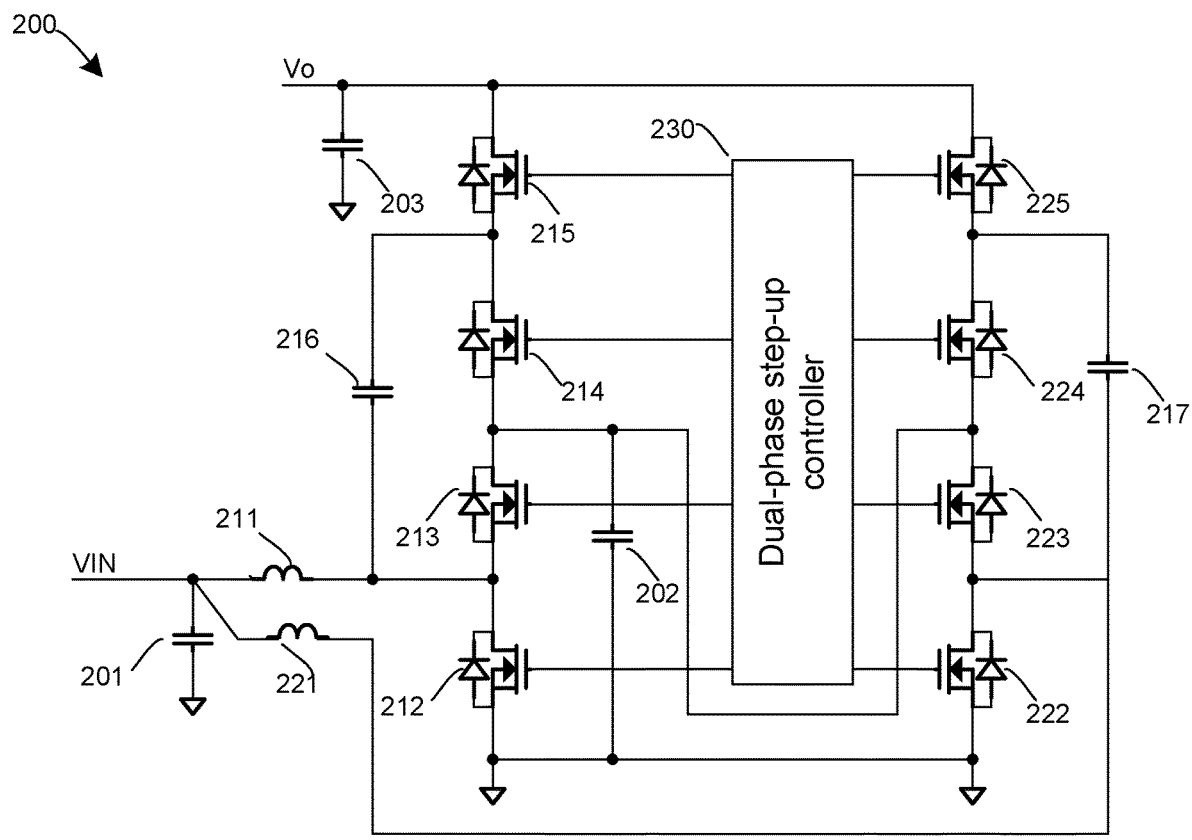
FIG. 3 illustrates a dual-phase step-up power conversion system.
Figure 4:
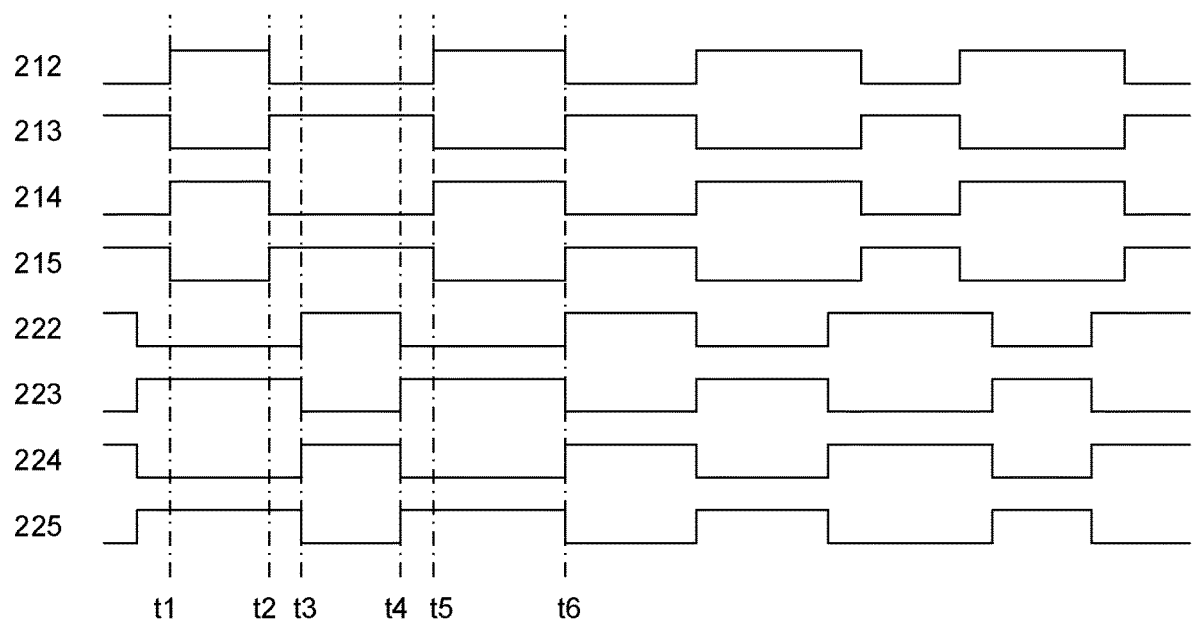
FIG. 4 illustrates gate drive signals associated with the dual-phase step-up power conversion system shown in FIG. 3.
Figure 5:
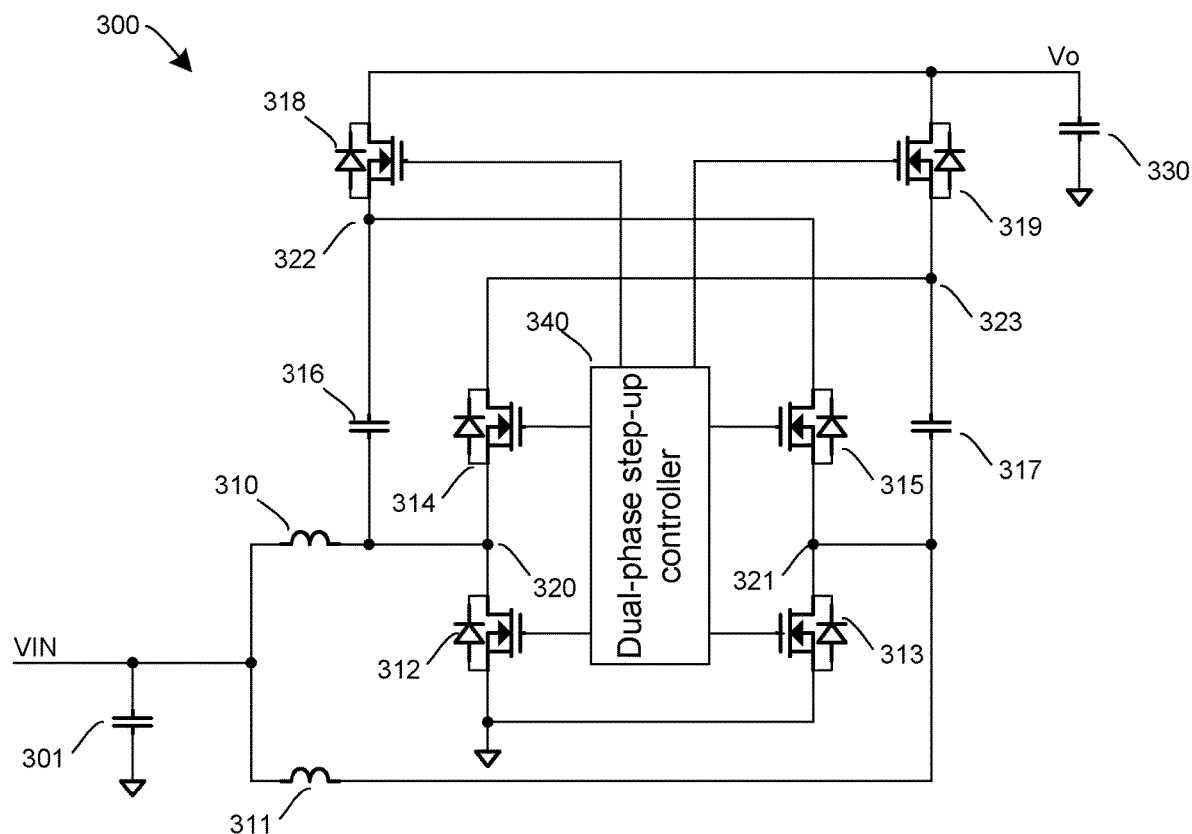
FIG. 5 illustrates a schematic diagram of a hybrid dual-phase step-up power conversion system in accordance with various embodiments of the present disclosure.

FIG. 5 illustrates a schematic diagram of a hybrid dual-phase step-up power conversion system in accordance with various embodiments of the present disclosure. The hybrid dual-phase step-up power conversion system 300 comprises an input capacitor 301, a first inductor 310, a second inductor 311, a first switch 319, a second switch 314, a third switch 312, a fourth switch 318, a fifth switch 315, a sixth switch 313, a first capacitor 316, a second capacitor 317 and an output capacitor 330. The hybrid dual-phase step-up power conversion system 300 further comprises a dual-phase step-up controller 340. The dual-phase step-up controller 340 is employed to generate suitable gate drive signals for controlling the switches 312, 313, 314, 315, 318 and 319.

The hybrid dual-phase step-up power conversion system 300 comprises two legs. A first leg comprises the first switch 319, the second switch 314 and the third switch 312 connected in series between an output terminal Vo and ground. A second leg comprises the fourth switch 318, the fifth switch 315 and the sixth switch 313 connected in series between the output terminal Vo and ground. As shown in FIG. 5, node 323 is a common node of the first switch 319 and the second switch 314. Node 320 is a common node of the second switch 314 and the third switch 312. Node 322 is a common node of the fourth switch 318 and the fifth switch 315. Node 321 is a common node of the fifth switch 315 and the sixth switch 313.

The first inductor 310 is connected between an input terminal VIN and node 320. The second inductor connected between VIN and node 321. The first capacitor 316 and the second capacitor 317 are cross-coupled between the first leg and the second leg. More particularly, the first capacitor 316 is connected between nodes 322 and 320. The second capacitor 317 is connected between nodes 323 and 321.

In some embodiments, the first inductor 310, the second switch 314, the third switch 312, the second inductor 311, the fifth switch 315, the sixth switch 313, the first capacitor 316 and the second capacitor 317 form a boost converter stage of the hybrid dual-phase step-up power conversion system 300. As shown in FIG. 5, the first inductor 310, the second switch 314, the third switch 312 and the second capacitor 317 form a first boost converter. The second inductor 311, the fifth switch 315, the sixth switch 313 and the first capacitor 316 form a second boost converter. On the other hand, the first switch 319, the second switch 314, the third switch 312, the fourth switch 318, the fifth switch 315, the sixth switch 313, the first capacitor 316 and the second capacitor 317 form a charge pump stage of the hybrid dual-phase step-up power conversion system 300. As shown in FIG. 5, the first switch 319, the second switch 314 and the third switch 312 form a first phase of the hybrid dual-phase step-up power conversion system 300. The fourth switch 318, the fifth switch 315 and the sixth switch 313 form a second phase of the hybrid dual-phase step-up power conversion system 300. The first capacitor 316 functions as a first flying capacitor. The second capacitor 317 functions as a second flying capacitor.

It should be noted many components shown in FIG. 5 are shared by the two stages of the hybrid dual-phase step-up power conversion system 300. These shared components help to reduce the total number of switches and capacitors in the hybrid dual-phase step-up power conversion system 300, thereby reducing the cost and improving the reliability of the hybrid dual-phase step-up power conversion system 300.

In operation, the second switch 314 and the third switch 312 are controlled by a first pair of complementary drive signals. The fifth switch 315 and the sixth switch 313 are controlled by a second pair of complementary drive signals. Drive signals of the third switch 312 and the sixth switch 313 are 180 degrees out of phase from each other. In some embodiments, the third switch 312 and the sixth switch 313 are configured to operate with a 50% duty cycle. Under the 50% duty cycle, an output voltage of the hybrid dual-phase step-up power conversion system 300 is four times greater than an input voltage of the hybrid dual-phase step-up power conversion system. In alternative embodiments, for adjusting the output voltage of the hybrid dual-phase step-up power conversion system, the third switch 312 and the sixth switch 313 may be configured to operate with a duty cycle in a range from 50% to 100%. The output voltage may be adjusted through varying the duty cycle.

In operation, switches of the first leg and switches of the second leg are configured such that a sum of a voltage across the first capacitor 316 and a voltage across the second capacitor 317 is fed into the output terminal of the hybrid dual-phase step-up power conversion system 300. More particularly, when the duty cycle is equal to 50%, the hybrid dual-phase step-up power conversion system 300 is configured to operate in two different operating modes. In a first operating mode, the third switch 312, the fifth switch 315, the first switch 319 are configured to be turned on, and the second switch 314, the sixth switch 313, the fourth switch 318 are configured to be turned off. In the first operating mode, the first capacitor 316 functions as an output capacitor of a boost converter stage of the hybrid dual-phase step-up power conversion system. The second capacitor 317 and the first capacitor 316 are connected in series between an output of the hybrid dual-phase step-up power conversion system and ground.

In a second operating mode, the third switch 312, the fifth switch 315, the first switch 319 are configured to be turned off, and the second switch 314, the sixth switch 313, the fourth switch 318 are configured to be turned on. In the second operating mode, the second capacitor 317 functions as an output capacitor of the boost converter stage of the hybrid dual-phase step-up power conversion system. The first capacitor 316 and the second capacitor 317 are connected in series between an output of the hybrid dual-phase step-up power conversion system and ground.

Furthermore, when the duty cycle is in a range from 50% to 100%, the hybrid dual-phase step-up power conversion system 300 is configured to operate in three different operating modes. The first two modes are similar to those described above, and hence are not discussed again to avoid repetition. In a third operating mode of the hybrid dual-phase step-up power conversion system, the third switch 312 and the sixth switch 313 are configured to be turned on, and the first switch 319, the second switch 314, the fourth switch 318 the fifth switch 315 are configured to be turned off. In the third operating mode, the first capacitor 316 and the second capacitor 317 are floating. The detailed description of these three operating modes will be described below with respect to FIGS. 6-9.

In accordance with an embodiment, the switches of FIG. 5 may be MOSFET devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 5 shows the switches (e.g., switch 312) are implemented as single n-type transistors, a person skilled in the art would recognize there may be many variations, modifications and alternatives. For example, depending on different applications and design needs, all or at least some of the switches may be implemented as p-type transistors. Furthermore, each switch shown in FIG. 5 may be implemented as a plurality of switches connected in parallel. Moreover, a capacitor may be connected in parallel with one switch to achieve zero voltage switching (ZVS)/zero current switching (ZCS).

Figure 6:
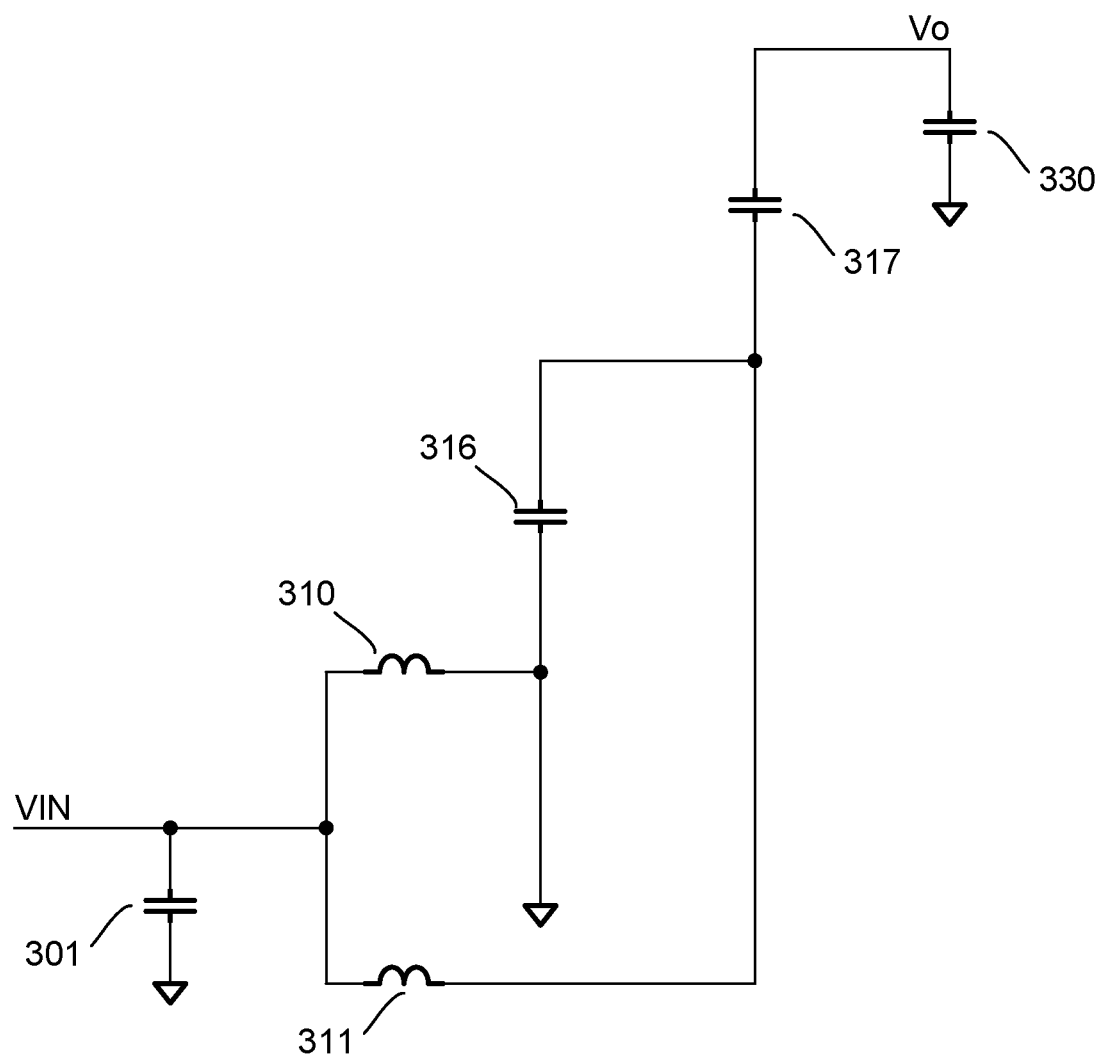
FIG. 6 illustrates an equivalent circuit of a first operating mode of the dual-phase step-up power conversion system shown in FIG. 5 in accordance with various embodiments of the present disclosure.
Figure 7:
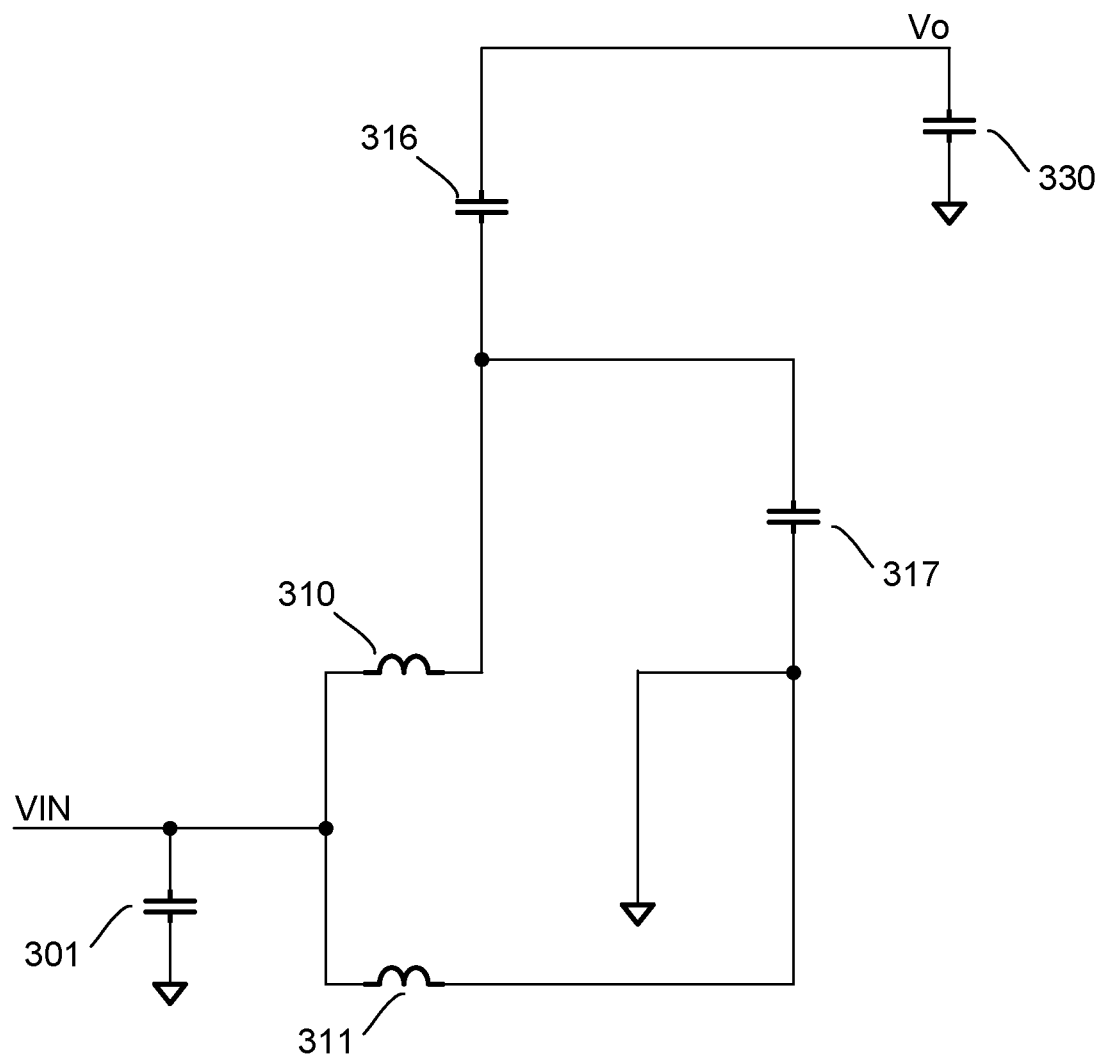
FIG. 7 illustrates an equivalent circuit of a second operating mode of the dual-phase step-up power conversion system shown in FIG. 5 in accordance with various embodiments of the present disclosure.
Figure 8:
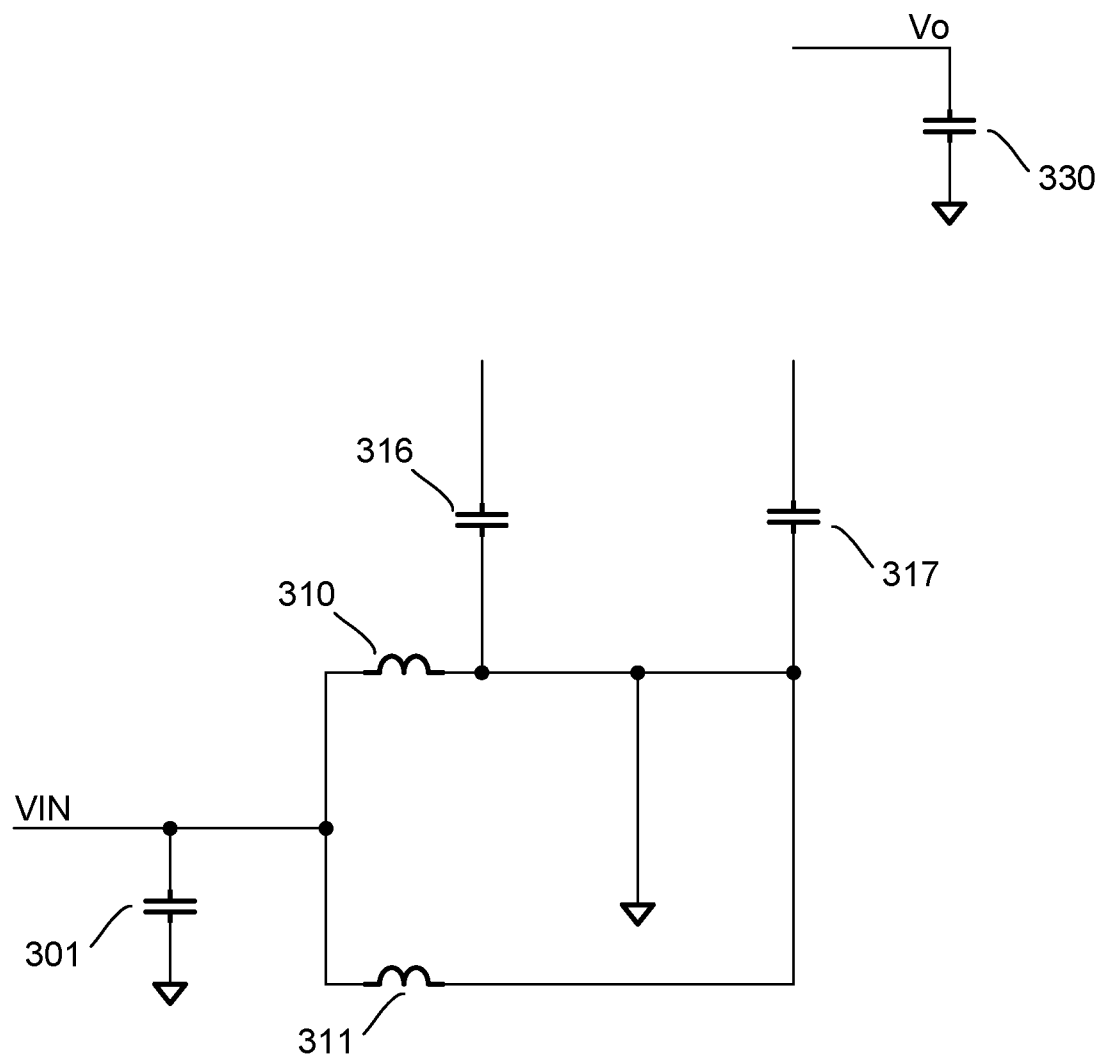
FIG. 8 illustrates an equivalent circuit of a third operating mode of the dual-phase step-up power conversion system shown in FIG. 5 in accordance with various embodiments of the present disclosure.

FIGS. 6-8 illustrate the three operating modes of the dual-phase step-up power conversion system shown in FIG. 5. To aid understanding and clarity, only the components relevant to this discussion are shown in FIGS. 6-8. Furthermore, the respective switches are shown as simple conductors (straight lines) when the switches are in the on state, and the respective switches are shown as open circuits when the switches are in the off state.

FIG. 6 illustrates an equivalent circuit of a first operating mode of the dual-phase step-up power conversion system shown in FIG. 5 in accordance with various embodiments of the present disclosure. In the first operating mode, the third switch 312, the fifth switch 315 and the first switch 319 are turned on, and the second switch 314, the sixth switch 313 and the fourth switch 318 are turned off.

In response to the turn-on of the third switch 312, the node 320 is connected to ground. The input voltage is applied to the first inductor 310. The current flowing through the first inductor 310 increases. In response to the increased current, the energy stored in the first inductor 310 increases accordingly.

In response to the turn-on of the fifth switch 315, the second inductor 311 is connected to the first capacitor 316. The current flowing through the second inductor 311 is fed into the first capacitor 316, and the energy stored in the second inductor 311 is deposited into the first capacitor 316.

Referring back to FIG. 5, in some embodiments, the third switch 312 and the sixth switch 313 operate with a duty cycle of 50%. Under this duty cycle, the average voltage across the first capacitor 316 is twice the voltage of the input voltage (VIN). The first capacitor 316 and the second capacitor 317 function as output capacitors of the second boost converter (formed by components 311, 313 and 315) and the first boost converter (formed by components 310, 312 and 314) respectively. These two boost converters are configured to operate in a symmetrical manner. Because of symmetry, the average voltage across the first capacitor 316 is equal to that of the second capacitor 317.

In response to the turn-on of the fifth switch 315 and the first switch 319, the second capacitor 317 is connected in series with the first capacitor 316 between the output terminal Vo and ground. The voltage across the series combination of the two capacitors is twice that of each individual capacitor or four times that of the input voltage (VIN).

FIG. 7 illustrates an equivalent circuit of a second operating mode of the dual-phase step-up power conversion system shown in FIG. 5 in accordance with various embodiments of the present disclosure. In the second operating mode, the third switch 312, the fifth switch 315 and the first switch 319 are turned off, and the second switch 314, the sixth switch 313 and the fourth switch 318 are turned on.

In response to the turn-on of the sixth switch 313, the node 321 is connected to ground. The input voltage is applied to the second inductor 311. The current flowing through the second inductor 311 increases. In response to the increased current, the energy stored in the second inductor 311 increases accordingly.

In response to the turn-on of the second switch 314, the first inductor 310 is connected to the second capacitor 317. The current flowing through the first inductor 310 is fed into the second capacitor 317, and the energy stored in the first inductor 310 is deposited into the second capacitor 317. In some embodiments, the third switch 312 and the sixth switch 313 operate with a duty cycle of 50%. Under this duty cycle, the average voltage across the second capacitor 317 is twice the voltage of the input VIN.

In response to the turn-on of the second switch 314 and the fourth switch 318, the first capacitor 316 is connected in series with the second capacitor 317 between the output terminal Vo and ground. The voltage across the series combination of the two capacitors is twice that of each individual capacitor or four times that of the input VIN.

FIG. 8 illustrates an equivalent circuit of a third operating mode of the dual-phase step-up power conversion system shown in FIG. 5 in accordance with various embodiments of the present disclosure. In the third operating mode, the third switch 312 and the sixth switch 313 are turned on, and the first switch 319, the second switch 314, the fourth switch 318 and the fifth switch 315 are turned off.

In response to the turn-on of the third switch 312, the node 320 is connected to ground. The input voltage is applied to the first inductor 310. The current flowing through the first inductor 310 increases. In response to the increased current, the energy stored in the first inductor 310 increases accordingly.

In response to the turn-on of the sixth switch 313, the node 321 is connected to ground. The input voltage is applied to the second inductor 311. The current flowing through the second inductor 311 increases. In response to the increased current, the energy stored in the second inductor 311 increases accordingly.

In response to the turn-off of the first switch 319, the second switch 314, the fourth switch 318 and the fifth switch 315, the first capacitor 316 and the second capacitor 317 are floating as shown in FIG. 8.

Figure 9:
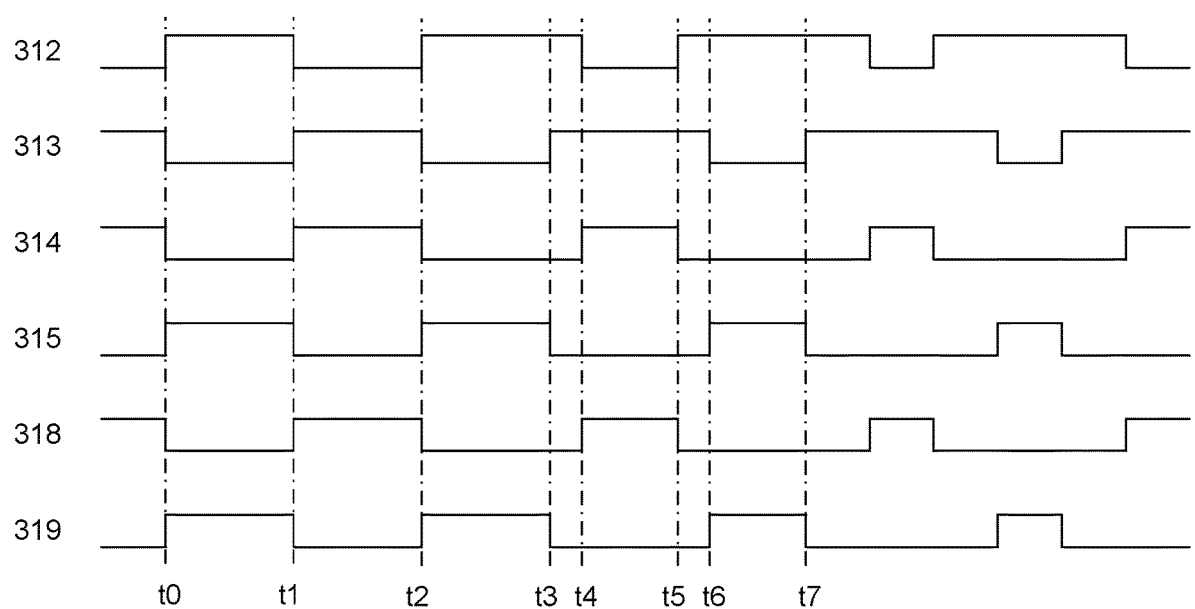
FIG. 9 illustrates gate drive signals associated with the dual-phase step-up power conversion system shown in FIG. 5 in accordance with various embodiments of the present disclosure.

FIG. 9 illustrates gate drive signals associated with the dual-phase step-up power conversion system shown in FIG. 5 in accordance with various embodiments of the present disclosure. Referring back to FIG. 5, the dual-phase step-up controller 340 is configured to generate the gate drive signals for switches 312, 313, 314, 315, 318 and 319. In some embodiments, the duty cycle of the switches 312 and 313 is in a range from 50% to 100%. As shown in FIG. 9, from t0 to t2, the switches 312 and 314 operate in a complementary manner. Switches 313 and 315 operate in a complementary manner. The gate drive signals of switches 312 and 314 are 180 degrees out of phase from each other. The switch 318 is in synchronization with the switch 314. The switch 319 is in synchronization with the switch 315.

From t0 to t2, the switches 312 and 313 operate with a duty cycle of 50%. The step-up ratio of the dual-phase step-up power conversion system is 1:4. The switches 312 and 313 can operate at a duty cycle greater than 50% to increase the step-up ratio up to a level greater than 1:4. In some embodiments, the dual-phase step-up controller 340 senses the output voltage Vo, and adjusts the duty cycle (from 50% to 100%) in a closed loop manner to achieve tight regulation of the dual-phase step-up power conversion system. The detailed operating principle of configuring the switches 312 and 313 to operate at a duty cycle greater than 50% will be discussed below.

From t2 to t3, the switch 312 is turned on and the switch 314 is turned off for a first time period corresponding to a duty cycle greater than 50%. The first time period is defined as DT. From t4 to t5, the switch 312 is turned off and the switch 314 is turned on for a second time period corresponding to one minus the duty cycle. The second time period is defined as T-DT. The phase difference between t2 and t3 is 180 degrees. From t3 to t6, the switch 313 is turned on and the switch 315 is turned off for a time period equal to DT. From t6 to t7, the switch 313 is turned off and the switch 315 is turned on for a time period equal to T-DT. The gate drive signal of the switch 318 is in synchronization with the gate drive signal of the switch 314. Likewise, the gate drive signal of the switch 319 is in synchronization with the gate drive signal of the switch 315.

Referring back to FIG. 6, the first operating mode shown in FIG. 6 corresponds to the switch configuration shown from t2 to t3 or from t0 to t1. Based on this switch configuration, the second capacitor 317 is connected in series with the first capacitor 316 between the output terminal Vo and ground.

Referring back to FIG. 7, the second operating mode shown in FIG. 7 corresponds to the switch configuration shown from t4 to t5 or from t1 to t2. Based on this switch configuration, the first capacitor 316 is connected in series with the second capacitor 317 between the output terminal Vo and ground.

Referring back to FIG. 8, the third operating mode shown in FIG. 8 corresponds to the switch configuration shown from t3 to t4. The time period from t3 to t4 is equal to DT−(T/2). Based on this switch configuration, the first capacitor 316 and the second capacitor 317 are floating. In particular, capacitors 316 and 317 are not connected in series, but are both switched to ground on one terminal and are unconnected on the other terminal. In addition, inductors 310 and 311 are both switched to ground on one terminal.

It should be noted that in the third operating mode (from t3 to t4), the charge pump stage is not active. Switches 318 and 319 are turned off to prevent discharging of the output capacitor 330.

It should further be noted that the switches 312 and 313 may operate with a duty cycle less than 50%. When the duty cycle is less than 50%, the dual-phase step-up controller 340 may create an operating mode in which switches 314 and 315 are simultaneously turned on. In response to the turn-on of switches 314 and 315, the capacitors 316 and 317 are connected in antiparallel. Such an antiparallel connection discharges the capacitors 316 and 317.

Figure 10:
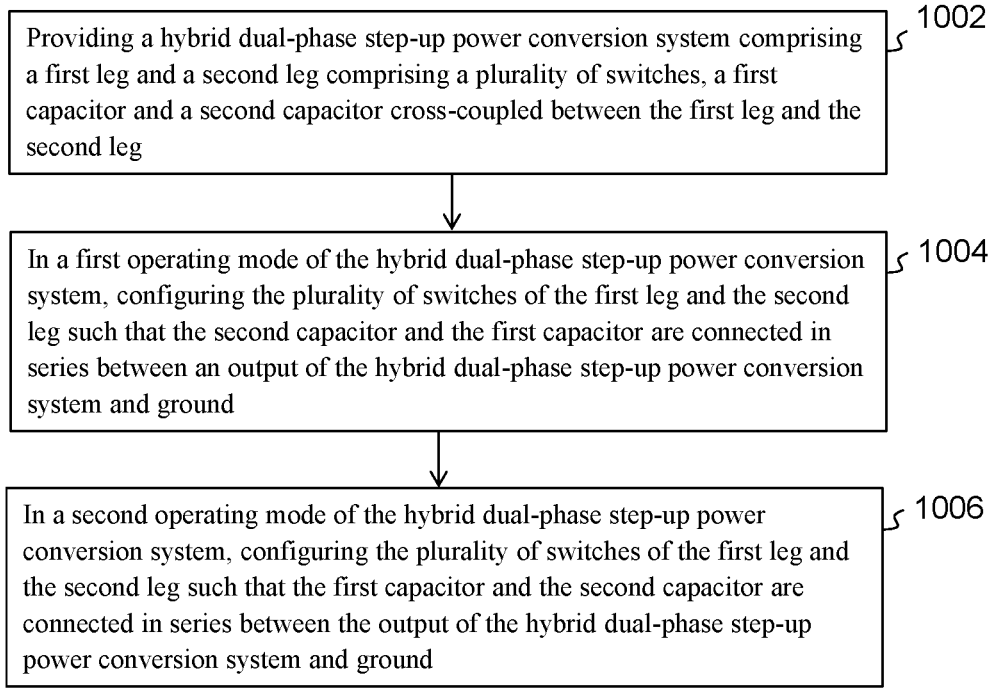
FIG. 10 illustrates a flow chart of a control method for the dual-phase step-up power conversion system shown in FIG. 5 in accordance with various embodiments of the present disclosure.

FIG. 10 illustrates a flow chart of a control method for the dual-phase step-up power conversion system shown in FIG. 5 in accordance with various embodiments of the present disclosure. This flowchart shown in FIG. 10 is merely an example, which should not unduly limit the scope of the claims. One of ordinary skill in the art would recognize many variations, alternatives, and modifications. For example, various steps illustrated in FIG. 10 may be added, removed, replaced, rearranged and repeated.

A hybrid dual-phase step-up power conversion system comprises a boost converter stage and a charge pump stage. The boost converter stage and the charge pump stage share a plurality of switches and capacitors. When the boost converter stage operates with a duty cycle equal to 50%, the dual-phase step-up power conversion system is configured to operate in two different operating modes. The step-up ratio of the dual-phase step-up power conversion system is 1:4. When the boost converter stage operates with a duty cycle greater than 50%, the dual-phase step-up power conversion system is configured to operate in three different operating modes. The step-up ratio is greater than 1:4.

At step 1002, a hybrid dual-phase step-up power conversion system is provided to convert an input voltage to an output voltage higher than the input voltage. The hybrid dual-phase step-up power conversion system comprises a first leg and a second leg. Both legs comprise a plurality of switches. The system further comprises a first capacitor and a second capacitor cross-coupled between the first leg and the second leg. In some embodiments, the hybrid dual-phase step-up power conversion system is implemented as the system shown in FIG. 5.

At step 1004, in a first operating mode of the hybrid dual-phase step-up power conversion system, the plurality of switches of the first leg and the second leg is configured such that the second capacitor and the first capacitor are connected in series between an output of the hybrid dual-phase step-up power conversion system and ground.

At step 1006, in a second operating mode of the hybrid dual-phase step-up power conversion system, the plurality of switches of the first leg and the second leg is configured such that the first capacitor and the second capacitor are connected in series between the output of the hybrid dual-phase step-up power conversion system and ground.

Figure 11:
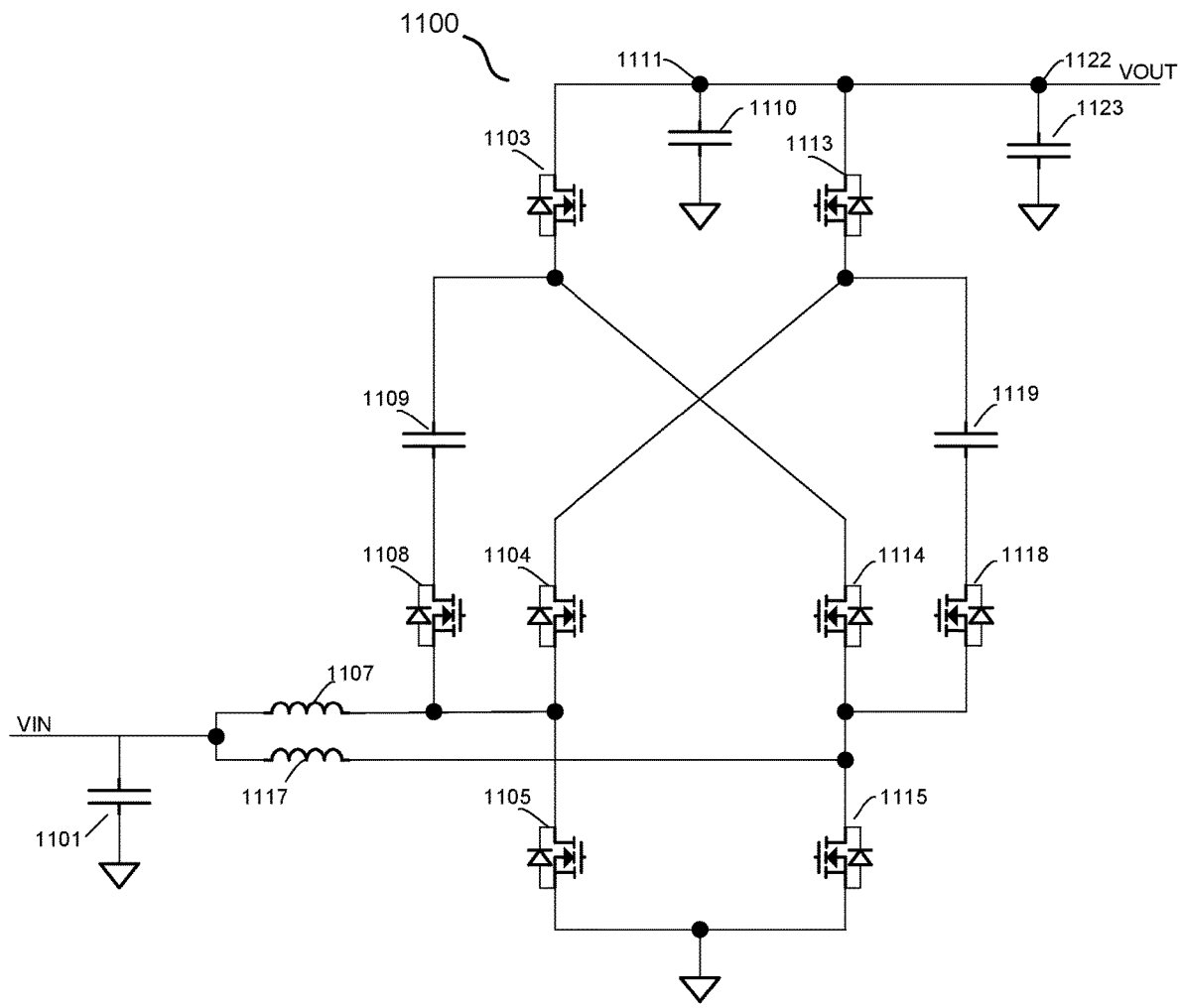
FIG. 11 illustrates a schematic diagram of another hybrid dual-phase step-up power conversion system in accordance with various embodiments of the present disclosure.

FIG. 11 illustrates a schematic diagram of another hybrid dual-phase step-up power conversion system in accordance with various embodiments of the present disclosure. The hybrid dual-phase step-up power conversion system 1100 comprises switches 1103, 1104, 1105, 1108, 1113, 1114, 1115 and 1118, capacitors 1101, 1109, 1119, 1110 and 1123, and inductors 1107 and 1117. The structure and operating principle of the hybrid dual-phase step-up power conversion system 1100 are similar to those of the hybrid dual-phase step-up power conversion system 300 shown in FIG. 5 except that switches 1108 and 1118 are employed to further improve the performance of the hybrid dual-phase step-up power conversion system. In particular, the hybrid dual-phase step-up power conversion system 1100 may be configured as a dual-phase boost conversion system through turning off the switches 1108 and 1118. The dual-phase boost configuration of the system (turning off switches 1108 and 1118) may be alternatively referred to as a bypass mode of the hybrid dual-phase step-up power conversion system 1100. The dual-phase boost conversion system is well known in the art, and hence is not discussed in detail to avoid repetition.

Figure 12:
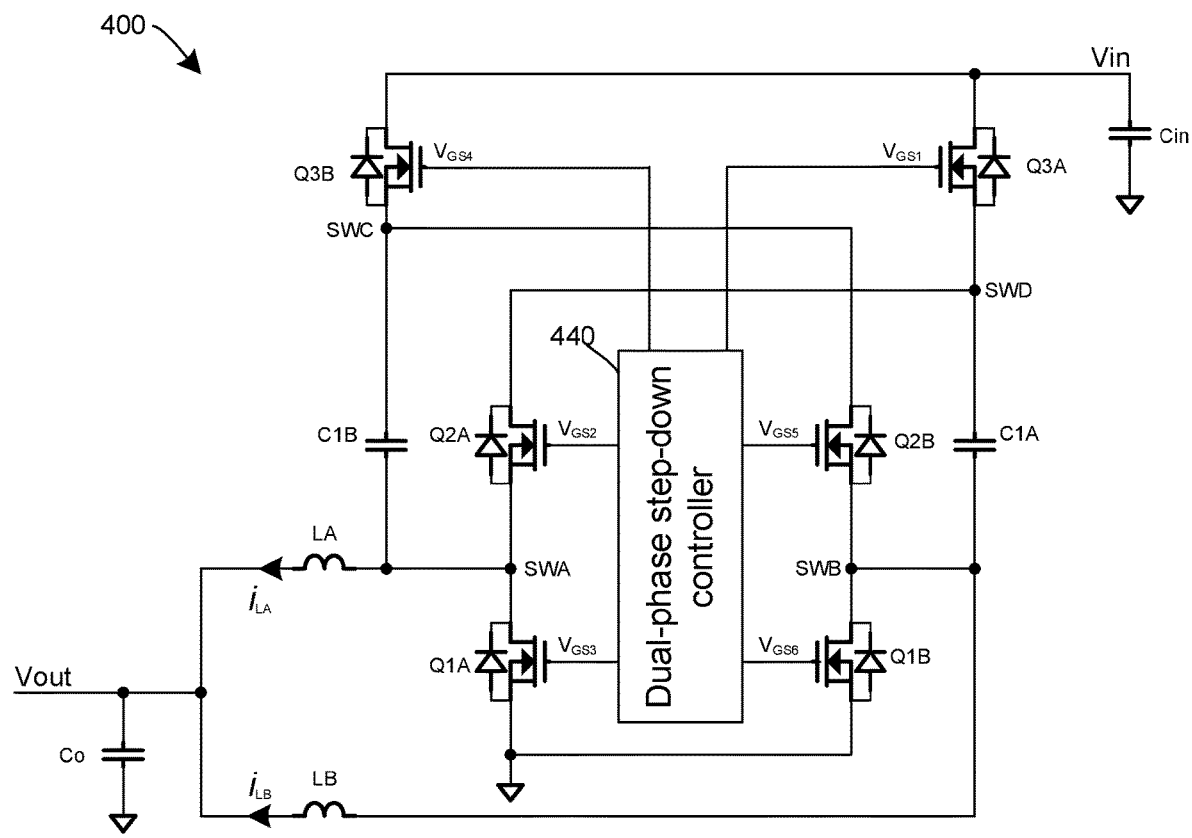
FIG. 12 illustrates a schematic diagram of the hybrid dual-phase step-up power converter of FIG. 5 operating in a step-down power conversion mode.

Referring back to FIG. 5, if the input and the output of the hybrid dual-phase step-up power converter shown in FIG. 5 are swapped, the converter can be used as a step-down power converter operating with the same control scheme described above. Such a system is called a reciprocal system. FIG. 12 illustrates a schematic diagram of the hybrid dual-phase step-up power converter of FIG. 5 operating in a step-down power conversion mode. Since the converter shown in FIG. 12 functions as a step-down converter, the converter shown in FIG. 12 is alternatively reference to as a hybrid dual-phase step-down power converter.

As shown in FIG. 12, the hybrid dual-phase step-down power converter 400 includes two phases. A first phase comprises power switches Q1A, Q2A, Q3A, a flying capacitor C1A and an output inductor LA. The power switches Q1A, Q2A and Q3A are connected in series between ground and the input power source Vin. The common node SWD of the power switches Q2A and Q3A is connected to the flying capacitor C1A. The other terminal of the flying capacitor C1A is connected to the common node SWB of the power switches Q1B and Q2B. The output inductor LB is also connected to the common node SWB.

A second phase comprises power switches Q1B, Q2B, Q3B, a flying capacitor C1B and an output inductor LB. Power switches Q1B, Q2B and Q3B are connected in series between ground and the input power source Vin. The common node SWC of the power switches Q2B and Q3B is connected to the flying capacitor C1B. The other terminal of the flying capacitor C1B is connected to the common node SWA of the power switches Q1A and Q2A. The output inductor LA is also connected to the common node SWA.

Both phases of the hybrid dual-phase step-down power converter 400 share an input filtering capacitor Cin and an output filtering capacitor Co. The input filtering capacitor Cin is connected between the input power source Vin and ground. The output filtering capacitor Co is connected to a common node of the output inductors LA and LB and the ground. The hybrid dual-phase step-down power converter 400 can be viewed as a combination of a dual phase 2:1 switched capacitor converter and a dual-phase buck converter.

As mentioned before, the operation of the hybrid dual-phase step-down power converter 400 is also configured to operate in four different time intervals over one switching cycle. The switching period is defined as Ts. Ts is equal to one over the switching frequency (fs).

Figure 13:
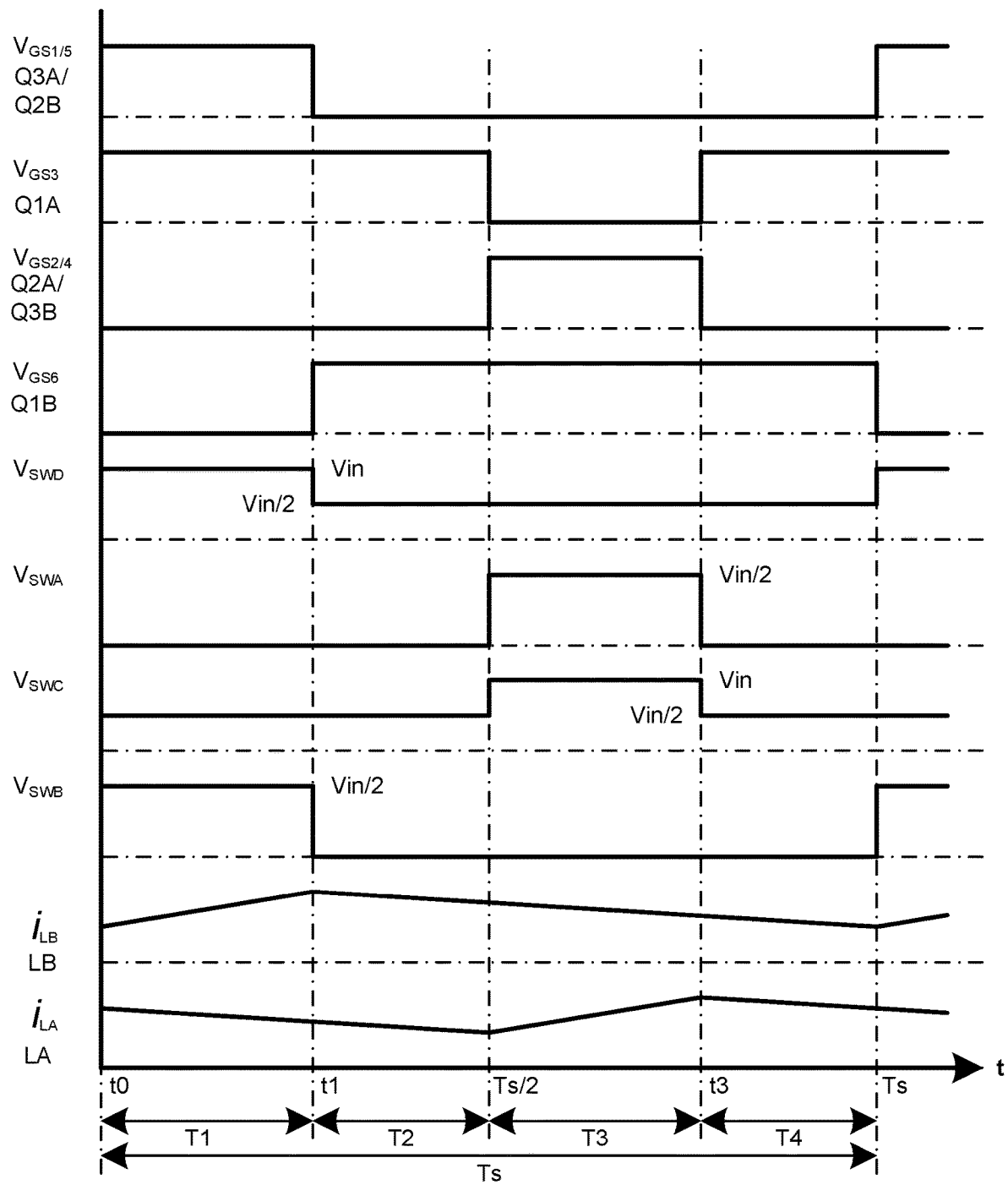
FIG. 13 illustrates various waveforms associated with the hybrid dual-phase step-down converter shown in FIG. 12 in accordance with various embodiments of the present disclosure.

FIG. 13 illustrates various waveforms associated with the hybrid dual-phase step-down converter shown in FIG. 12 in accordance with various embodiments of the present disclosure. The horizontal axis of FIG. 13 represents intervals of time. There may be ten rows in FIG. 13. The first row represents the gate drive signals of switches Q3A and Q2B ($V_{GS1}$ and $V_{GS5}$). The second row represents the gate drive signal of switch Q1A ($V_{GS3}$). The third row represents the gate drive signals of switches Q2A and Q3B ($V_{GS2}$ and $V_{GS4}$). The fourth row represents the gate drive signal of switch Q1B ($V_{GS6}$). The fifth row represents the voltage on the node SWD ($V_{SWD}$) The sixth row represents the voltage on the node SWA ($V_{SWA}$). The seventh row represents the voltage on the node SWC ($V_{SWC}$). The eighth row represents the voltage on the node SWB ($V_{SWB}$). The ninth row represents the current flowing through the inductor LB ($i_{LB}$). The tenth row represents the current flowing through the inductor LA ($i_{LA}$).

As shown in FIG. 13, the four different time intervals are T1, T2, T3 and T4. As shown in FIG. 13, T1 is from t0 to t1. T2 is from t1 to (Ts/2). T3 is from (Ts/2) to t3. T4 is from t3 to Ts.

During the first time interval (T1), the power switches Q3A, Q2B, and Q1A are turned on. The power switches Q2A, Q1B and Q3B are off. Power is delivered from the input power source Vin to the output capacitor Co and the system load connected at Vout through the power switch Q3A, the flying capacitor C1A and the inductor LB. The flying capacitor C1A is charging up and the current flowing through the inductor LB rises. The voltage at the node SWB is equal to the input voltage Vin minus the voltage across the flying capacitor C1A. Meanwhile, the energy stored in the flying capacitor C1B is discharged through the power switches Q1A, Q2B and the output inductor LB to the output capacitor Co and the system load at Vout. The flying capacitor C1B is connected between the switching node SWB and the ground. The voltage across the flying capacitor C1A is equal to the input voltage Vin minus the voltage across the flying capacitor C1B. The output inductor LA is discharging through the power switch Q1A. The current $i_{LA}$ flowing through the output inductor LA has a slew rate of Vout/L. L is the inductance of the output inductors LA and LB.

During the second time interval (T2), the power switch Q1B is turned on, and the power switch Q1A remains on while the rest of the power switches are off. No energy is transferred either between the input power source Vin and the output or between the flying capacitors C1A, C1B and the output. Both inductor currents are discharged to the output capacitor Co and the system load at Vout. Both inductors are discharged by current $i_{LA}$ and $i_{LB}$ at the slew rate of Vout/L, and the energy stored in the output inductors LA and LB is transferred to output capacitor Co and the system load at Vout.

During the third time interval (T3), the power switches Q2A, Q1B and Q3B are turned on, and the power switches Q3A, Q2B, and Q1A are off. Power is delivered from the input power source Vin to the output through the switch Q3B, the flying capacitor C1B and the inductor LA to the output capacitor Co and the system load at Vout. The flying capacitor C1B is charging up and the current flowing through the inductor LA rises. The voltage at node SWA is equal to the input voltage Vin minus the voltage across the flying capacitor C1B. Meanwhile, the energy stored in the flying capacitor C1A is discharged through power switches Q2A, Q1B and the output inductor LA to the output capacitor Co and the system load at Vout. The flying capacitor C1A is connected between the switching node SWA and ground. The voltage across the flying capacitor C1B is equal to the input voltage Vin minus the voltage across the flying capacitor C1A. The output inductor LB is discharging through the power switch Q1B at the slew rate of Vout/L.

During the fourth time interval (T4), the power switch Q1A is turned on, and the power switch Q1B remains on. Other power switches are turned off. No energy is transferred either between the input power source and the output or between the flying capacitors C1A, C1B and the output. Energy stored in both inductors is discharged to the output capacitor Co and the system load at Vout. Both inductors are discharged by current $i_{LA}$ and $i_{LB}$ at the slew rate of Vout/L.

It should be noted that the time intervals T1 and T3 are equal in duration, and the time intervals T2 and T4 are equal in duration for the operation described above. Under such operation condition, the following relationships can be obtained:

$$V(C1B) = V(C1A) = Vin/2 \qquad (1)$$

In Equation (1), V(C1B) and V(C1A) represent the average voltages across the flying capacitors C1B and C1A over one switching period, respectively. If the duty cycle at the switching nodes SWB and SWA is defined as D, and D is equal to (T1/Ts) or (T3/Ts), the output voltage Vout can be expressed as:

$$Vout = V(C1A) \cdot \frac{T1}{Ts} = V(C1B) \cdot \frac{T3}{Ts} = V(C1A) \cdot D = V(C1B) \cdot D = Vin \cdot \frac{D}{2} \qquad (2)$$

Equation (2) indicates that for a same voltage conversion ratio, the duty cycle of the hybrid dual-phase step-down power converter 400 is twice that of a buck converter. Furthermore, the maximum voltage the low side power switches are required to withstand is Vin/2, resulting in the utilization of half voltage rated power switches in comparison with the power switches of the buck converter. This means the total silicon area of the two low-side power switches is smaller than that of the buck converter with the same on resistance. Furthermore, since the voltage swing across the low-side power switches is only one half of the input voltage during each switching transition, a higher switching frequency becomes possible. Such a higher switching frequency helps to reduce the sizes of the output inductors and output filtering capacitors, thereby achieving a smaller PCB area and solution size.

Figure 14:
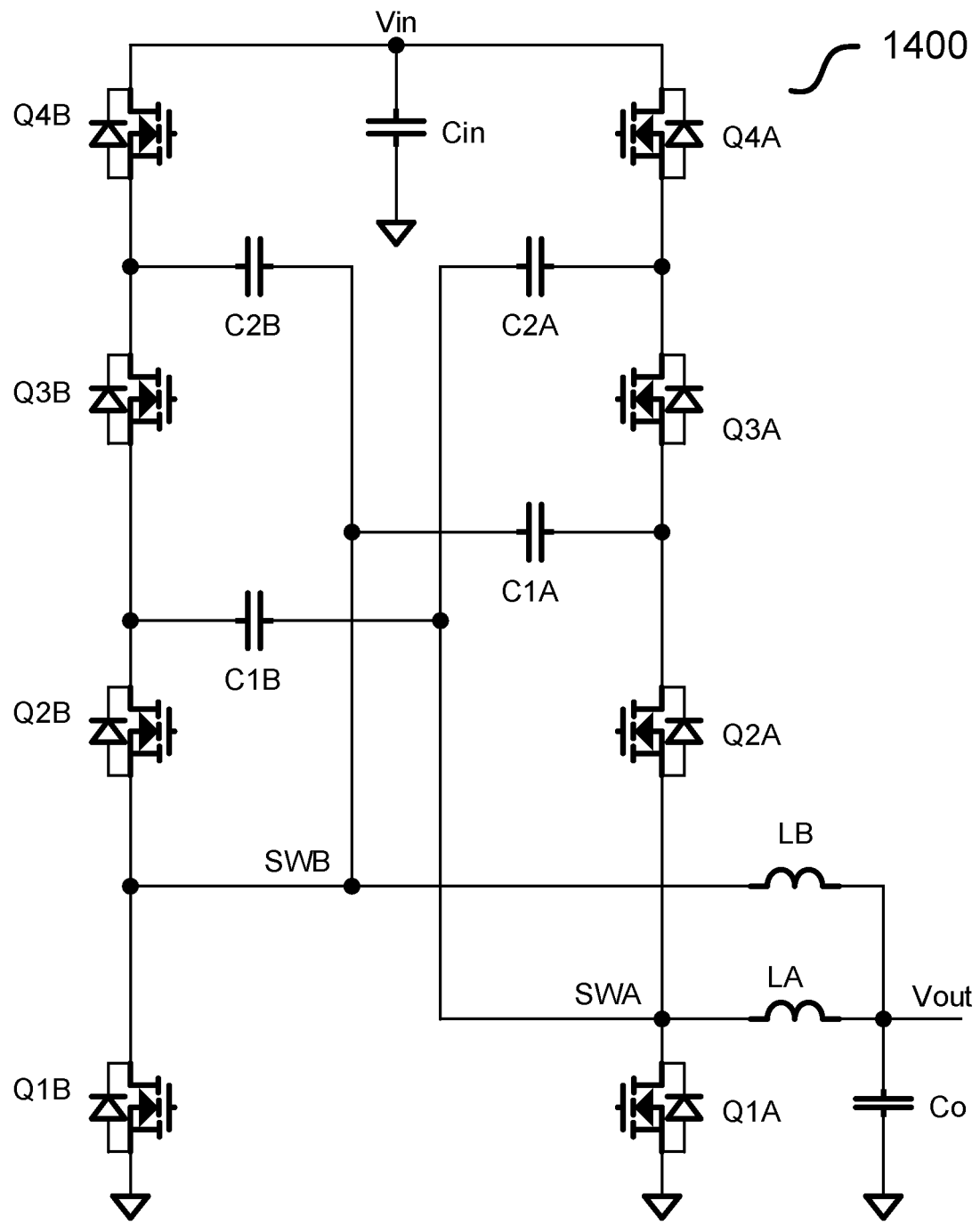
FIG. 14 illustrates a schematic diagram of a hybrid dual-phase step-down power converter having a voltage step-down ratio of 3/D in accordance with various embodiments of the present disclosure.

FIG. 14 illustrates a schematic diagram of a hybrid dual-phase step-down power converter having a voltage step-down ratio of 3/D in accordance with various embodiments of the present disclosure. The hybrid dual-phase step-down power converter 1400 comprises two phase legs. A first phase leg comprises power switches Q4A, Q3A, Q2A and Q1A, flying capacitors C1A and C2A and an output inductor LA. The power switches Q4A, Q3A, Q2A and Q1A are connected in series between the input power source Vin, and ground. The common node of the power switches Q2A and Q3A is connected to the first flying capacitor C1A. The common node of the power switches Q3A and Q4A is connected to the third flying capacitor C2A. The common node of the power switches Q1A and Q2A is connected to the output inductor LA, the second flying capacitor C1B and the third flying capacitor C2A. The common node of the power switches Q1A and Q2A is alternatively referred to as a SWA node as shown in FIG. 14.

The second phase leg comprises power switches Q4B, Q3B, Q2B and Q1B, flying capacitors C1B and C2B, and an output inductor LB. The power switches Q4B, Q3B, Q2B and Q1B are connected in series between the input power source Vin and ground. The common node of the power switches Q4B and Q3B is connected to the fourth flying capacitor C2B. The common node of the power switches Q3B and Q2B is connected to the second flying capacitor C1B. The common node of the power switches Q1B and Q2B is connected to the output inductor LB, the first flying capacitor C1A and the fourth flying capacitor C2B. The common node of the power switches Q1B and Q2B is alternatively referred to as a SWB node as shown in FIG. 14.

As shown in FIG. 14, both phases share the input filtering capacitor Cin and the output filtering capacitor Co. The operating principle of the hybrid dual-phase step-down power converter 1400 shown in FIG. 14 is similar to that of the hybrid dual-phase step-down power converter 400 shown in FIG. 12-13. In some embodiments, there are four time intervals in each switching cycle. During the first time interval T1, the power switches Q1A, Q3A, Q2B and Q4B are turned on, and the rest of the power switches are off. Power is transferred from the input power source Vin to the output capacitor Co and the system load at Vout through the power switch Q4B, the fourth flying capacitor C2B and the output inductor LB. The fourth flying capacitor C2B and the output inductor LB are charged. The energy stored in the second flying capacitor C1B is discharged to the output capacitor Co and the system load at Vout through the power switches Q1A and Q2B. The energy stored in the third flying capacitor C2A is discharged to the output capacitor Co and the system load at Vout through the first flying capacitor C1A, the power switches Q1A, Q3A and the output inductor LB. The first flying capacitor C1A is also charged.

During the second time interval T2, the power switch Q1B is turned on, and the power switch Q1A remains on. The rest of the power switches are off. There is no energy transferred either between the input power source Vin and the output or between the flying capacitors and the output. Both output inductors LA and LB are discharged to deliver energy to the output capacitor Co and the system load at Vout.

During the third time interval T3, the power switches Q1B, Q2A, Q3B and Q4A are turned on, and the rest of the power switches are turned off. The power is transferred from the input power source Vin to the output capacitor Co and the system load at Vout through the power switch Q4A, the third flying capacitor C2A and the output inductor LA. Both the third flying capacitor C2A and the output inductor LA are charged. The energy stored in the fourth flying capacitor C2B is discharged to the output through the power switches Q1B and Q3B, the second flying capacitor C1B and the output inductor LA. At the same time, the second flying capacitor C1B is charged. The energy stored in the first flying capacitor C1A is discharged to the output through the power switches Q1B and Q2A, and the output inductor LA.

During the fourth time interval T4, the power switch Q1A is turned on, and the power switch Q1B remain on. The rest of the power switches are off. No power is transferred either from the input power source Vin to the output or between the flying capacitors and the output. The energy stored in the output inductors LA and LB are discharged to the output capacitor Co and the system load at Vout through the power switches Q1A and Q1B respectively. Under this operation mode, the voltage down conversion ratio (Vin/Vout) is 3/D. D is the duty cycle of the hybrid dual-phase step-down power converter 1400. D is equal to T1/Ts or T3/Ts. Since the duty cycle D is not able to be higher than 50%, the output voltage regulation range of the hybrid dual-phase step-down power converter 1400 is between 0 and Vin/6.

Figure 15:
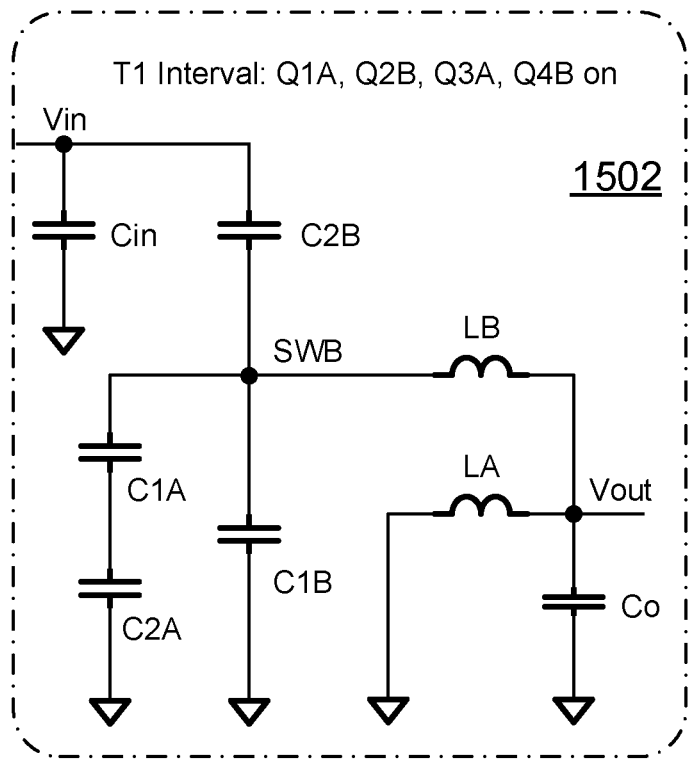
FIG. 15 illustrates two equivalent circuit diagrams for the hybrid dual-phase step-down power converter shown in FIG. 14.
Figure 15:
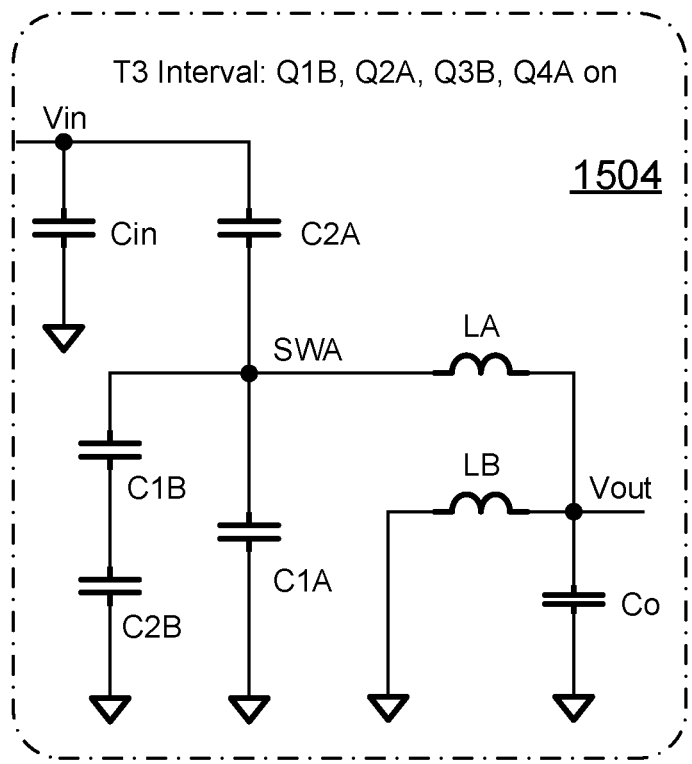

FIG. 15 illustrates two equivalent circuit diagrams for the hybrid dual-phase step-down power converter shown in FIG. 14. For simplicity, the duty cycle D is set to be at the maximum duty cycle, which is 50%. In response to this maximum duty cycle, only two time intervals of the four time intervals described above are applicable as shown in FIG. 15. Circuit 1502 is the hybrid dual-phase step-down power converter 1400 shown in FIG. 14 configured to operate in the first time interval T1. Circuit 1504 is the hybrid dual-phase step-down power converter 1400 shown in FIG. 14 configured to operate in the third time interval T3. It should be noted that under a maximum duty cycle (50%), T2 and T4 are equal to zero. T1 and T3 form one switching period of the hybrid dual-phase step-down power converter 1400.

In the first time interval T1, the switches Q1A, Q2B, Q3A and Q4B are turned on, and the rest of the switches are turned off. There are three current paths connected to the switching node SWB (the input terminal of LB). As shown in FIG. 15, in the first current path, the input power source Vin is configured to provide current to the switching node SWB through the flying capacitor C2B. In the second current path, the series-connected flying capacitors C1A and C2A are configured to provide current to the switching node SWB. In the third current path, the flying capacitor C1B is configured to provide current to the switching node SWB In the third time interval T3, the switches Q1B, Q2A, Q3B and Q4A are turned on, and the rest of the switches are turned off. There are also three current paths connected to the switching node SWA (the input terminal of LA). As shown in FIG. 15, in the first current path, the input power source Vin is configured to provide current to the switching node SWA through the flying capacitor C2A. In the second current path, the series-connected flying capacitors C1B and C2B are configured to provide current to the switching node SWA. In the third current path, the flying capacitor C1A is configured to provide current to the switching node SWA.

According to the analysis of the hybrid dual-phase step down power converter 400, the hybrid dual-phase step-down power converter 1400 has a voltage conversion ratio equal to 6 when the duty cycle D is at 50%. The steady state voltages across flying capacitors C2A and C2B are two thirds of Vin. The steady state voltages across flying capacitors C1A and C1B are one third of Vin. The voltages on the switching nodes (SWA/SWB) are switching between ground and Vin/3.

Now assuming at the beginning of the first time interval T1, the voltages across the flying capacitors are at their steady state value. At the end of the first time interval, due to the discharging of C1B through LB to the Vout node and the system load connected to Vout, the voltage on the flying capacitor C1B drops down to (Vin/3)−ΔV. In some embodiments, ΔV is a voltage variation after the flying capacitor C1B finishes discharging at the end of the first time interval T1. Correspondingly, at the switching node SWB, the voltage drops to (Vin/3)−ΔV, and the voltage across the flying capacitor C2B is equal to Vin−V(SWB), which is (2Vin/3)+ΔV. In the current path having the flying capacitors C2A and C1A, assuming that the flying capacitors C1A and C2A have approximately the same capacitance, since the currents flowing through the flying capacitors C1A and C2A are the same, the voltage drop on the switching node SWB is distributed evenly between the flying capacitors C1A and C2A. In other words, the flying capacitor C2A is discharged to (2Vin/3)−(ΔV/2). The flying capacitor C1A is charged to (Vin/3)+(ΔV/2). In summary, at the end of the first time interval T1, the voltages across all flying capacitors can be expressed by the following equations:

$$V_{C2B} = Vin \times \frac{2}{3} + \Delta V \quad (3)$$

$$V_{C1B} = Vin \times \frac{1}{3} - \Delta V \quad (4)$$

$$V_{C2A} = Vin \times \frac{2}{3} - \frac{\Delta V}{2} \quad (5)$$

$$V_{C1A} = Vin \times \frac{1}{3} + \frac{\Delta V}{2} \quad (6)$$

With these voltages across the flying capacitors, at the beginning of the third time interval T3, the three current paths are reconfigured as shown in circuit 1504. The voltage applied to the switching node SWA from the first current path (from Vin to SWA through C2A) can be expressed as:

$$V_{SWA} = Vin - V_{C2A} = Vin \times \frac{1}{3} + \frac{\Delta V}{2} \quad (7)$$

The voltage applied to the switching node SWA from the second current path (from C2B and C1B to SWA) can be expressed as:

$$V_{SWA} = V_{C2B} - V_{C1B} = Vin \times \frac{1}{3} + 2\Delta V \quad (8)$$

The voltage applied to the switch node SWA from the third current path (from C1A to SWA) can be expressed as:

$$V_{SWA} = V_{C1A} = Vin \times \frac{1}{3} + \frac{\Delta V}{2} \quad (9)$$

As indicated by Equations (7), (8) and (9), the voltage from the second current path (Equation (8)) is higher than the voltage from the first and third current paths. The three current paths have different voltages at the SWA node. The presence of LA between the switching node SWA and Vout prevents a sudden change in the current provided to the Vout node and the load connected to Vout, while allows a sudden change in the voltage on the switching node SWA. As a result of having the voltage difference, charge transfer between flying capacitors will occur. In particular, the current path with two flying capacitors C1B and C2B connected in series charges the current paths with a single capacitor momentarily, thereby causing current spikes and the associated charge sharing losses.

This charge sharing loss can be a significant part of the power conversion loss of the hybrid dual-phase step-down power converter 1400. Especially, when the flying capacitor values are small with respect to the operating frequency of the converter, the charge sharing loss may be even worse. Additional switch states can be introduced to mitigate this issue by reducing the voltage differences among different current paths, which will be described below with respect to FIG. 16.

Figure 16:
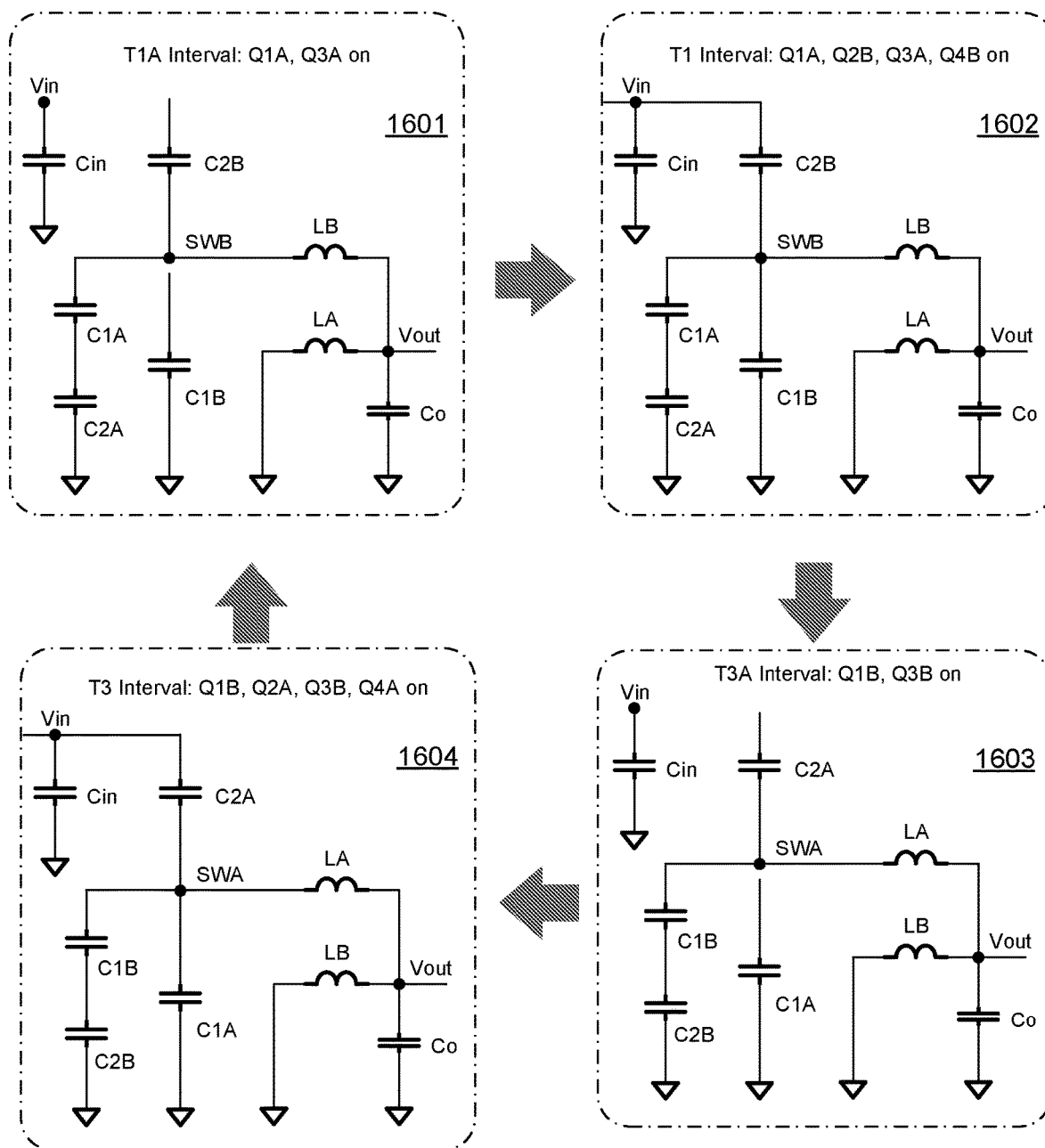
FIG. 16 illustrates four equivalent circuit diagrams for operating the hybrid dual-phase step-down power converter shown in FIG. 14 with two additional switch states in accordance with various embodiments of the present disclosure.

FIG. 16 illustrates four equivalent circuit diagrams for operating the hybrid dual-phase step-down power converter shown in FIG. 14 with two additional switch states in accordance with various embodiments of the present disclosure. The operating principle shown in FIG. 16 is similar to that shown in FIG. 15 except that two more switch states are added to prevent the power loss caused by charge transferring described above with respect to FIG. 15. As shown in FIG. 16, equivalent circuits 1601 and 1603 are used to describe the operating principle of the two additional switch states.

As shown in FIG. 16, a new control scheme extends the control of the hybrid dual-phase step-down power converter shown in FIG. 14 from two switch states (as shown in two equivalent circuits in FIG. 15) to four switch states including two additional switch states (as shown in the four equivalent circuits in FIG. 16).

In the T1 time interval, the operating principle of the circuit 1602 is similar to that of the circuit 1502 shown in FIG. 15, and hence is not discussed again. At the end of the T1 time interval, as indicated by Equations (7), (8) and (9), if the circuit is directly reconfigured as shown in circuit 1504, the voltage from the second current path (from series-connected C1B and C2B to SWA) would be higher than the voltage from the first current path (from Vin and C2A to SWA) and the voltage from the third current path (from C1A to SWA).

In order to eliminate this voltage mismatch, an additional circuit configuration state is added after the T1 time interval. This additional circuit configuration state is referred to as a T3A time interval as shown in FIG. 16. In this newly added time interval (T3A), the switches Q1B and Q3B are turned on, and the rest of the switches are turned off. In response to this system configuration, as shown in FIG. 16, the flying capacitors C1A is disconnected from SWA, and the flying capacitor C2A is disconnected from Vin. Only C1B and C2B are connected in series and further connected to SWA. The voltage across the series-connected flying capacitors C1B and C2B is discharged. At the beginning of the T3A time interval, the voltage across the series-connected C1B and C2B can be expressed as:

$$V_{C2B} - V_{C1B} = Vin \times \frac{1}{3} + 2\Delta V \quad (10)$$

At the end of the T3A time interval, the voltage across the series-connected C1B and C2B is discharged to a lower level, which can be expressed as:

$$V_{C2B} - V_{C1B} = Vin \times \frac{1}{3} + \frac{\Delta V}{2} \quad (11)$$

Equation (11) indicates the voltage across the series-connected C1B and C2B is discharged to a level equal to the voltage of the other two current paths. Once this condition is satisfied, C2A is connected to Vin, and C1A is connected to SWA at the same time to start the T3 time interval, as shown in circuit 1604.

The operating principle of the circuit 1601 for the T1A time interval is similar to that of the circuit 1603. Among the current paths connected to the switching node SWB during T1A time interval, the one having two flying capacitors connected in series (namely C1A and C2A) is connected to SWB first in the T1A time interval to discharge the voltage across C1A and C2A. The T1A time interval ends when the voltage across the series-connected flying capacitors C1A and C2A is equal to the voltage of the other current paths having a single flying capacitor (C2B in the first current path and C1B in the third current path). At the end of the T1A time interval, the T1 time interval starts again to repeat the four-state cycle.

With the newly added two switch states, the voltages from the three current paths at the beginning of T1 and T2 time intervals are equal to each other. As a result, sudden transfer of charges among the flying capacitors can be avoided. As a result of eliminating the charge sharing loss between the flying capacitors, the hybrid dual-phase step-down power converter 1400 can achieve high power conversion efficiency.

In a more general case, the duty cycle D is less than 50%. In consideration with the free-wheeling intervals (e.g., T2 and T4 shown in FIG. 13), the four time intervals (T1, T3A, T3 and T1A) described above turns into six time intervals, namely T1, T1A, T1B, T3, T3A and T3B. It should be noted that T1B and T3B are similar to T2 and T4 shown in FIG. 13. In these two time intervals, both inductors are discharged to provide power for the output capacitor and the system load connected to the output.

Figure 17:
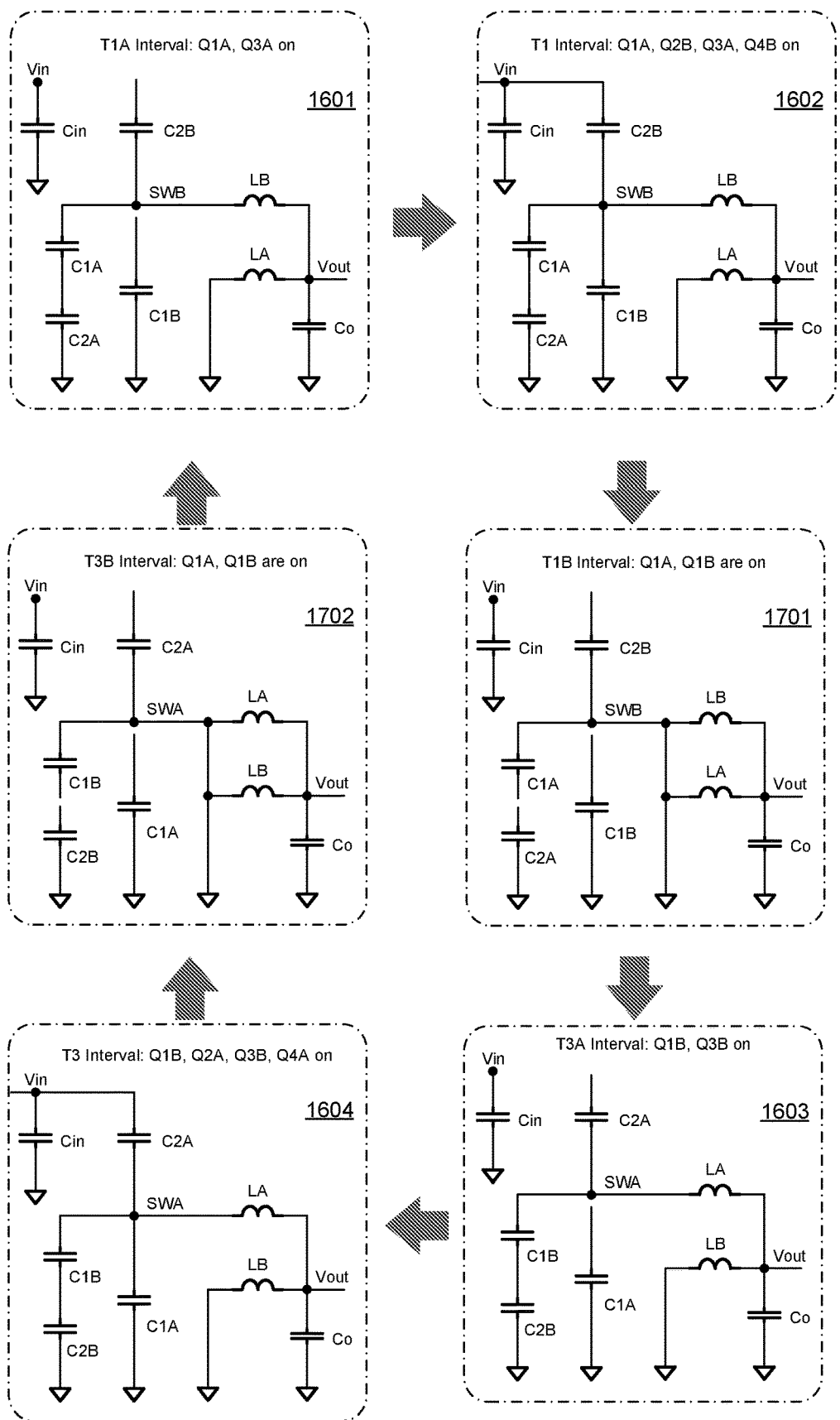
FIG. 17 illustrates six equivalent circuit diagrams for operating the hybrid dual-phase step-down power converter shown in FIG. 14 with four additional switch states in accordance with various embodiments of the present disclosure.

FIG. 17 illustrates six equivalent circuit diagrams for operating the hybrid dual-phase step-down power converter shown in FIG. 14 with four additional switch states in accordance with various embodiments of the present disclosure. Circuit 1701 is the equivalent circuit diagram when the hybrid dual-phase step-down power converter 1400 shown in FIG. 14 is configured to operate in the time interval T1B. Circuit 1702 is the equivalent circuit diagram when the hybrid dual-phase step-down power converter 1400 shown in FIG. 14 is configured to operate in the time interval T3B.

As shown in FIG. 17, the time interval T1B is in between the T1 time interval and the T3A time interval. The time interval T3B is in between the T3 time interval and the T1A time interval. During the T1B and T3B time intervals, both power switches Q1A and Q1B are turned on while all other power switches are off. No power is transferred either from the input power source Vin to the output or between the flying capacitors and the output. The energy stored in the output inductors LA and LB is discharged to the output capacitor Co and the system load at Vout through the power switches Q1A and Q1B, respectively.

Figure 18:
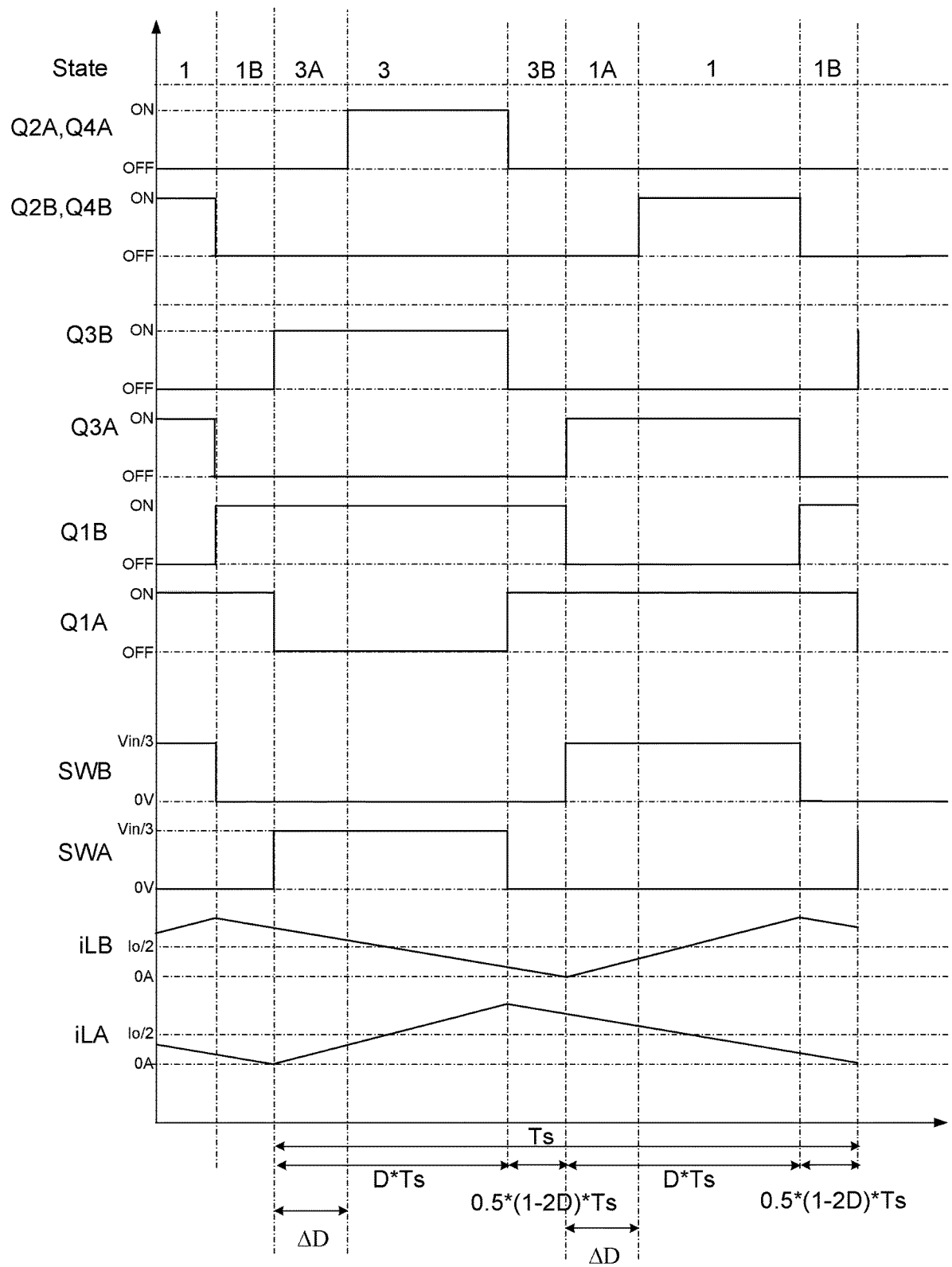
FIG. 18 illustrates the six different time intervals T1, T1B, T3A, T3, T3B and TA in accordance with various embodiments of the present disclosure.

FIG. 18 illustrates the six different time intervals T1, T1B, T3A, T3, T3B and T1A in accordance with various embodiments of the present disclosure. The horizontal axis of FIG. 18 represents intervals of time. There may be ten rows in FIG. 18. The first row represents the gate drive signals of switches Q2A and Q4A. The second row represents the gate drive signal of switches Q2B and Q4B. The third row represents the gate drive signal of switch Q3B. The fourth row represents the gate drive signal of switch Q3A. The fifth row represents the gate drive signal of switch Q1B. The sixth row represents the gate drive signal of switch Q1A. The seventh row represents the voltage on the switching node SWB. The eighth row represents the voltage on the switching node SWA. The ninth row represents the current flowing through the inductor LB ($i_{LB}$). The tenth row represents the current flowing through the inductor LA ($i_{LA}$).

As shown in FIG. 18, power switches Q3A and Q3B have a duty cycle of D. The bottom switches Q1B and Q1A have control signals complementary to the control signals of power switches Q3A and Q3B, respectively. The added switch states 3A and 1A has the same duration of ΔD. During ΔD, both the second from bottom (power switches Q2A, Q2B) and the top power switches (Q4A, Q4B) are turned off to allow the current paths with two flying capacitors in series to connect to the switching node SWA or the switching node SWB first to eliminate the voltage mismatch described above. As a result of having states 3A and 1A, the duty cycle of the power switches Q2A, Q2B, Q4A and Q4B is (D−ΔD).

In certain applications, a higher voltage step-down ratio is needed. The dual-phase hybrid step-down power converters shown in FIG. 12 and FIG. 14 can be uses as a basis for further expanding the circuit to achieve a higher voltage step-down ratio as described below with respect to FIGS. 19 and 20.

Figure 19:
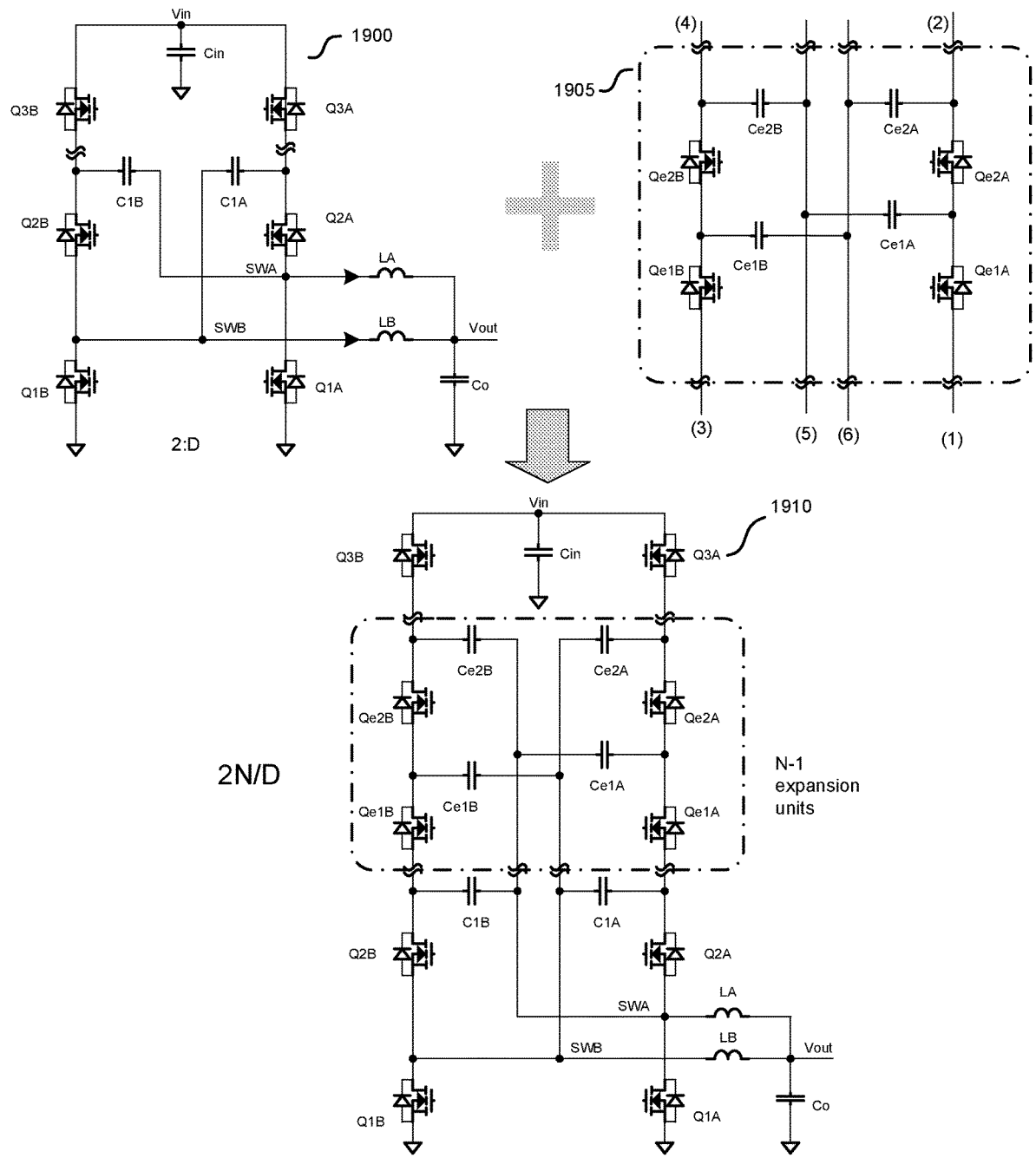
FIG. 19 illustrates a simplified schematic diagram of a hybrid dual-phase step-down power converter based on a combination of the hybrid dual-phase step-down power converter shown in FIG. 12 and an expansion circuit in accordance with various embodiments of the present disclosure.

FIG. 19 illustrates a simplified schematic diagram of a hybrid dual-phase step-down power converter based on a combination of the hybrid dual-phase step-down power converter shown in FIG. 12 and an expansion circuit in accordance with various embodiments of the present disclosure. The hybrid dual-phase step-down power converter shown in FIG. 12 has a voltage step down ratio of 2/D. This converter shown in FIG. 12 is depicted as a 2/D converter 1900 shown in FIG. 19. An expansion unit 1905 is also shown in FIG. 19. The hybrid dual-phase step-down power converter 1910 is based on the 2/D converter 1900 and the expansion unit 1905. As shown in FIG. 19, the hybrid dual-phase step-down power converter 1910 has a step down ratio of 2N/D. N is an integer number greater than 1.

The expansion unit 1905 comprises four power switches Qe1A, Qe1B, Qe2A and Qe2B, and four flying capacitors Ce1A, Ce1B, Ce2A and Ce2B. The power switches Qe1A and Qe2A are connected in series between a first terminal (1) and a second terminal (2) of the expansion unit 1905. Similarly, the power switches Qe1B and Qe2B are connected in series between a third terminal (3) and a fourth terminal (4) of the expansion unit 1905.

The flying capacitor Ce1A is connected between the common node of power switches Qe1A, Qe2A and a fifth terminal (5) of the expansion unit 1905. The flying capacitor Ce2A is connected between a second terminal (2) and a sixth terminal (6) of the expansion unit 1905. The flying capacitor Ce1B is connected between the common node of power switches Qe1B, Qe2B and the sixth terminal of the expansion unit 1905. The flying capacitor Ce2B is connected between the fourth terminal and the fifth terminal of the expansion unit 1905.

The hybrid dual-phase step-down power converter 1900 can be expanded by inserting the expansion unit 1905 between the second and third power switches from the bottom of each phase leg (e.g., between Q2B and Q3B, and between Q2A and Q3A). The first terminal of expansion unit 1905 is connected to the common node of the power switch Q2A and the flying capacitor C1A. The second terminal of expansion unit 1905 is connected to the power switch Q3A. The fifth terminal of the expansion unit 1905 is connected the switching node SWA. The third terminal of expansion unit 1905 is connected to the common node of power switch Q2B and flying capacitor C1B. The fourth terminal of expansion unit 1905 is connected to the power switch Q3B. The sixth terminal of the expansion unit 1905 is connected the switching node SWB. In some embodiments, when N−1 expansion units are inserted into the hybrid dual-phase step-down power converter 1900, the second terminal and the fourth terminal of the expansion unit 1905 shown in FIG. 19 are coupled to the power switches Q3A and Q3B, respectively through the other N−2 expansion units.

FIG. 19 also illustrates the expansion result based on the 2/D converter 1900 and the expansion unit 1905. As shown in FIG. 19, a converter having a step down ratio of 2N/D is depicted as a hybrid dual-phase step-down power converter 1910. N is a positive integer number (e.g., 1, 2, 3 . . . ). In some embodiments, N−1 copies of the expansion unit 1905 can be added to the 2/D converter 1900 using the method described above. In the hybrid dual-phase step-down power converter 1910 with a step down ratio 2N/D, there are (4N+2) power switches, (4N−2) flying capacitors, two output inductors, one input filtering capacitor, and one output filtering capacitor.

The operating principle of the hybrid dual-phase step-down power converter 1910 in FIG. 19 is similar to that of the hybrid dual-phase step-down power converter 1900. In some embodiments, there are four time intervals in each switching cycle. During the first time interval T1, the power switches Q1B, Q3B, Q2A and expansion switches Qe1B, Qe2A of each expansion unit 1905 are on, and the rest of the power switches are off. Power is transferred from the input power source Vin to the output capacitor Co and the system load at Vout through the power switch Q3B, the flying capacitor Ce2B of the expansion unit 1905 adjacent to power switch Q3B and the output inductor LA. Power is also transferred between the flying capacitor C1A and the output through the power switches Q1B, Q2A and the output inductor LA. In addition, through the power switch Q1B and the output inductor LA, power is also transferred between the series-connected flying capacitor pairs formed by the flying capacitor C1B and the rest of the flying capacitors of each of the expansion units 1905, and the capacitor Co and the system load at Vout. The energy stored in the output inductor LB is discharged to the output capacitor Co and the system load at Vout through the power switch Q1B.

During the second time interval T2, the power switch Q1A is turned on, and the power switch Q1B remains on. The rest of the power switches are off. The energy stored in the output inductors LA and LB is discharged to the output capacitor Co and the system load at Vout through the power switches Q1A and Q1B, respectively. No power is transferred either between the input power source Vin and the output or between the flying capacitors and the output.

During the third time interval T3, the power switches Q1A, Q3A, Q2B and expansion switches Qe1A, Qe2B of each expansion unit 1905 are on, and the rest of the power switches are off. Power is transferred from the input power source Vin to the output capacitor Co and the system load at Vout through the power switch Q3A, the flying capacitor Ce2A of the expansion unit 1905 adjacent to power switch Q3A and the output inductor LB. Power is also transferred between the flying capacitor C1B and the output through the power switch Q1A, Q2B and the output inductor LB. In addition, through the power switch Q1A and the output inductor LB, power is also transferred between the series-connected flying capacitor pairs formed by flying capacitor C1A and the rest of the flying capacitors of each of the expansion units 1905, and the capacitor Co and the system load at Vout. The energy stored in the output inductor LA is discharged to the output capacitor Co and the system load at Vout through the power switch Q1A.

During the fourth time interval T4, the power switch Q1B is turned on, and the power switch Q1A remains on. The rest of the power switches are off. The energy stored in the output inductors LA and LB is discharged to the output capacitor Co and the system load at Vout through the power switches Q1A and Q1B, respectively. No power is transferred between the input power source Vin and the output as well as between the flying capacitors and the output.

The operation cycle repeats once again at the end of the fourth time interval T4. Under the operation described above, the output voltage regulation of the hybrid dual-phase step-down power converter 1910 is Vin×D/(2N). It should be noted the D is in a range from 0 to 0.5. In other words, the output voltage of the hybrid dual-phase step-down power converter 1910 is in a range from 0 V to Vin/(4N).

It should be noted that the expansion method described above with respect to FIG. 19 is applicable to all hybrid dual-phase step-down power converters having a step down ratio of 2N/D. That is, the step down ratio is an even number multiplied by (1/D). For the cases of the step down ratio being an odd number multiplied by (1/D), the circuit expansion can be obtained based on the hybrid dual-phase step-down power converter with a step down ratio of 3/D illustrated in FIG. 14.

Figure 20:
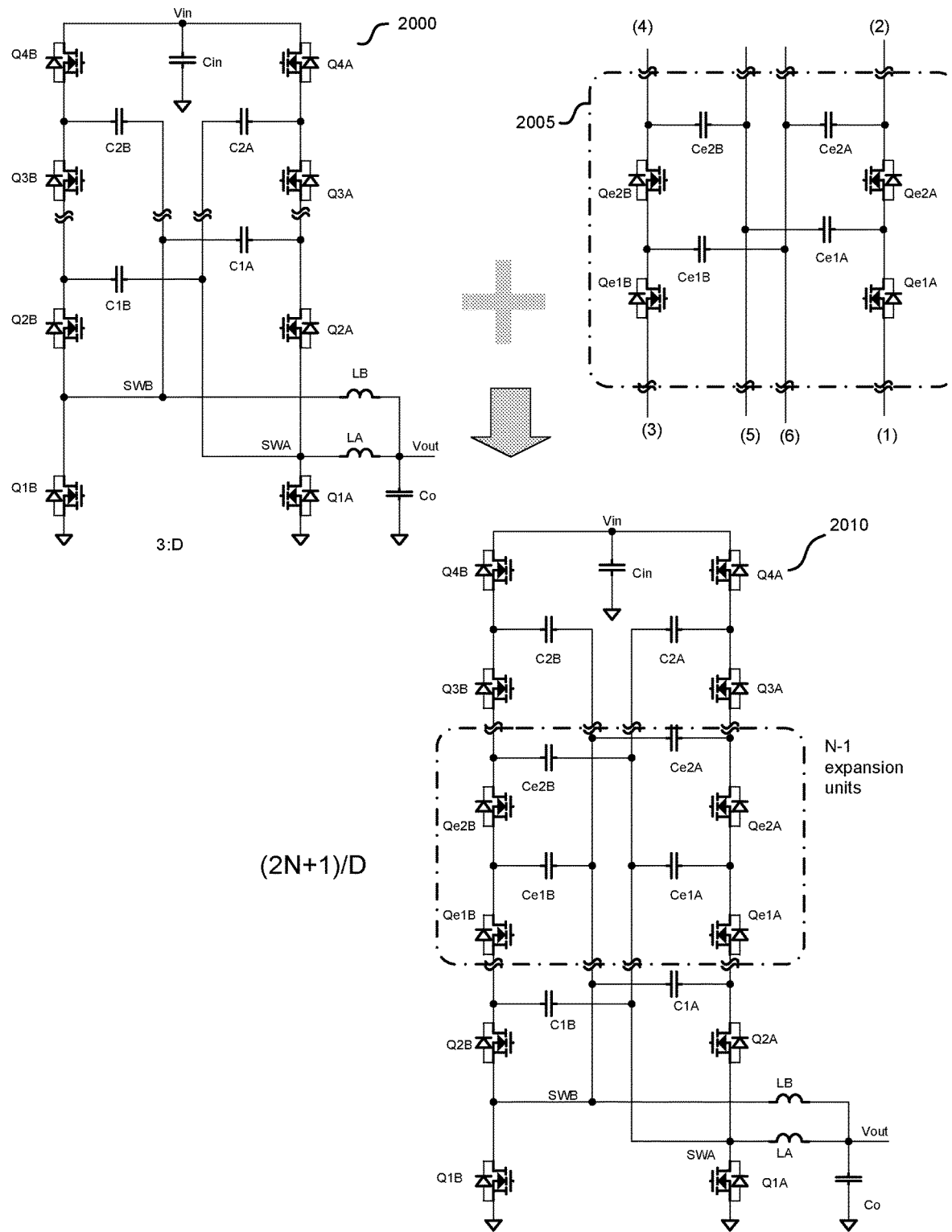
FIG. 20 illustrates a simplified schematic diagram of a hybrid dual-phase step-down power converter based on a combination of the hybrid dual-phase step-down power converter shown in FIG. 14 and an expansion circuit in accordance with various embodiments of the present disclosure.

FIG. 20 illustrates a simplified schematic diagram of a hybrid dual-phase step-down power converter based on a combination of the hybrid dual-phase step-down power converter shown in FIG. 14 and an expansion circuit in accordance with various embodiments of the present disclosure. The hybrid dual-phase step-down power converter shown in FIG. 14 has a voltage step down ratio of 3/D. This converter shown in FIG. 14 is depicted as a 3/D converter 2000. An expansion unit 2005 is also shown in FIG. 20.

As shown in FIG. 20, the hybrid dual-phase step-down power converter 2000 also can be expanded to achieve a higher voltage step-down ratio by inserting the expansion unit 2005 between the second and third power switches from the bottom of each phase leg (e.g., between Q2B and Q3B and between Q2A and Q3A).

A first terminal (1) of the expansion unit 2005 is connected to the common node of the power switch Q2A and the flying capacitor C1A. A second terminal (2) of the expansion unit 2005 is connected to the power switch Q3A. A fifth terminal (5) of the expansion unit 2005 is connected the switching node SWA. A third terminal (3) of the expansion unit 2005 is connected to the common node of the power switch Q2B and the flying capacitor C1B. The fourth terminal (4) of expansion unit 2005 is connected to the power switch Q3B. A sixth terminal (6) of the expansion unit 2005 is connected to the switching node SWB. In some embodiments, when N−1 expansion units are inserted into the hybrid dual-phase step-down power converter 2000, the second terminal and the fourth terminal of the expansion unit 2005 shown in FIG. 20 are coupled to the power switch Q3A and the power switch Q3B, respectively through the other N−2 expansion units.

FIG. 20 also illustrates the expansion result based on the 3/D converter 2000 and expansion unit 2005. As shown in FIG. 20, a converter having a step down ratio of (2N+1)/D is depicted as a hybrid dual-phase step-down power converter 2010. N is a positive integer number (e.g., 1, 2, 3 . . . ). In some embodiments, N−1 copies of the expansion unit 2005 can be added to the 3/D converter 2000 using the method described above to achieve a voltage step-down ratio of (2N+1)/D. In the hybrid dual-phase step-down power converter 2010 with a step down ratio (2N+1)/D, there are a total 4(N+1) power switches, 4×N flying capacitors, two output inductors, one input filtering capacitor, and one output filtering capacitor.

The operating principle of the hybrid dual-phase step-down power converter 2010 in FIG. 20 is similar to that of the hybrid dual-phase step-down power converter 2000. In some embodiments, there are four time intervals in each switching cycle.

During the first time interval T1, the power switches Q1A, Q2B, Q3A, Q4B and expansion switches Qe1A, Qe2B of each expansion unit 2005 are on, and the rest of the power switches are off. Power is transferred from the input power source Vin to the output capacitor Co and the system load at Vout through the power switch Q4B, the flying capacitor C2B and the output inductor LB. Power is also transferred between the flying capacitor C1B and the output through the power switch Q1A, Q2B and the output inductor LB. In addition, through the power switch Q1A and the output inductor LB, power is transferred between the multiple pairs of series-connected flying capacitors formed by the flying capacitors C1A, C2A and all of the flying capacitors of each of the expansion units 2005, and the capacitor Co and the system load at Vout. The energy stored in the output inductor LA is discharged to the output capacitor Co and the system load at Vout through the power switch Q1A.

During the second time interval T2, the power switch Q1B is turned on, and the power switch Q1A remains on. The rest of the power switches are off. The energy stored in the output inductors LA and LB is discharged to the output capacitor Co and the system load at Vout through the power switches Q1A and Q1B, respectively. No power is transferred either between the input power source Vin and the output or between the flying capacitors and the output.

During the third time interval T3, the power switches Q1B, Q2A, Q3B, Q4A and expansion switches Qe1B, Qe2A of each expansion unit 2005 are on, and the rest of the power switches are off. Power is transferred from the input power source Vin to the output capacitor Co and the system load at Vout through the power switch Q4A, the flying capacitor C2A and the output inductor LA. Power is also transferred between the flying capacitor C1A and the output through the power switch Q1B, Q2A and the output inductor LA. In addition, through the power switch Q1B and the output inductor LA, power is transferred between the multiple pairs of series-connected flying capacitors formed by the flying capacitors C1B, C2B and all of the flying capacitors of each of the expansion units 2005, and the capacitor Co and the system load at Vout. The energy stored in the output inductor LB is discharged to the output capacitor Co and the system load at Vout through the power switch Q1B.

During the fourth time interval T4, the power switch Q1A is turned on, and the power switch Q1B remains on. The rest of the power switches are off. The energy stored in the output inductors LA and LB are discharged to the output capacitor Co and the system load at Vout through the power switches Q1A and Q1B, respectively. No power is transferred between the input power source Vin and the output as well as between the flying capacitors and the output.

The operation cycle repeats once again at end of the fourth time interval T4. Under the operation described above, the output voltage regulation of the hybrid dual-phase step-down power converter 2010 is (Vin×D)/(2N+1). It should be noted the D is in a range from 0 to 0.5. In other words, the output voltage of the hybrid dual-phase step-down power converter 2010 is in a range from 0 V to Vin/(4N+2).

In some implementations, in order to avoid excessive charge sharing losses due to uneven distribution of the voltages among different current paths, similar method of delaying the discharging of the current paths with only one flying capacitor can be applied to the expanded hybrid dual-phase step down converters such as the converter 1910 shown in FIG. 19 and the converter 2010 shown in FIG. 20. Basically, two additional states can be added in between time intervals T4 and T1, or T2 and T3, where only the current paths with two flying capacitors connected in series are discharged to the output, while the discharging of the current paths with only one flying capacitor is delayed to the start of time intervals T1 and T3. In the case of converters with a step-down ratio equal to an even number multiplied by 1/D (e.g., converter 1910), the power switch pairs configured with the delayed turn on time is the top power switch of one phase leg and the second from bottom power switch of the other phase leg, that is Q3B and Q2A, or Q3A and Q2B shown in FIG. 19. In the case of converters with a step-down ratio equal to an odd number multiplied by 1/D (e.g., converter 2010), the power switch pairs configured with a delayed turn on time is the top power switch and the second from bottom power switch of the same phase leg, that is Q4B and Q2B, or Q4A and Q2A shown in FIG. 20.

The hybrid dual-phase step-down power converter 2000 and the expanded hybrid dual-phase step-down power converters 2010 and 1910 can also be configured to operate as a hybrid dual-phase step-up power converter, where the Vout terminal is configured as an input terminal, and Vin terminal is configured as an output. With the same power switch control schemes described, when a DC voltage is applied to Vout terminal, at Vin terminal, an output voltage of 3/D, 2N/D and (2N+1)/D times the DC voltage can be achieved at the Vin terminal.

In accordance with an embodiment, a hybrid dual-phase step-down power converter comprises a first phase comprising a plurality of first phase switches connected in series between an input power source and ground, a second phase comprising a plurality of second phase switches connected in series between the input power source and ground, and a first flying capacitor of the first phase and a first flying capacitor of the second phase cross-coupled between the first phase and the second phase, wherein switches of the first phase and switches of the second phase are configured such that a ratio of an input voltage of the hybrid dual-phase step-down power converter to an output voltage of the hybrid dual-phase step-down power converter is equal to N/D, and wherein N is an integer, and D is a duty cycle of the hybrid dual-phase step-down power converter.

In accordance with another embodiment, a method comprises providing a hybrid dual-phase step-down power converter comprising a first phase comprising a plurality of first phase switches connected in series between an input power source and ground, a second phase comprising a plurality of second phase switches connected in series between the input power source and ground, and a first flying capacitor of the first phase and a first flying capacitor of the second phase cross-coupled between the first phase and the second phase, and configuring switches of the first phase and switches of the second phase such that a ratio of an input voltage of the hybrid dual-phase step-down power converter to an output voltage of the hybrid dual-phase step-down power converter is equal to N/D, and wherein N is an integer, and D is a duty cycle of the hybrid dual-phase step-down power converter.

When N is equal to 2, the hybrid dual-phase step-down power converter comprises a first switch, a second switch and a third switch connected in series between ground and the input power source, a fourth switch, a fifth switch and a sixth switch connected in series between ground and the input power source, a first flying capacitor connected to a common node of the first switch and the second switch, and a common node of the fifth switch and the sixth switch, a second flying capacitor connected to a common node of the fourth switch and the fifth switch, and a common node of the second switch and the third switch, a first inductor connected between the common node of the first switch and the second switch and an output terminal of the hybrid dual-phase step-down power converter, and a second inductor connected between the common node of the fourth switch and the fifth switch and the output terminal of the hybrid dual-phase step-down power converter.

The method further comprises configuring the hybrid dual-phase step-down power converter to operate in four different time intervals with the duty cycle in a range from 0% to 50%, in a first time interval, configuring the first switch, the third switch and the fifth switch to be turned on, and configuring the second switch, the fourth switch and the sixth switch to be turned off, in a second time interval, configuring the first switch and the fourth switch to be turned on, and configuring the third switch, the second switch, the sixth switch and the fifth switch to be turned off, in a third time interval, configuring the first switch, the third switch and the fifth switch to be turned off, and configuring the second switch, the fourth switch and the sixth switch to be turned on, and in a fourth time interval, configuring the first switch and the fourth switch to be turned on, and configuring the third switch, the second switch, the sixth switch and the fifth switch to be turned off.

When N is equal to 3, the hybrid dual-phase step-down power converter comprises the first phase comprising a first switch, a second switch, a third switch and a fourth switch connected in series between ground and the input power source, the second phase comprising a fifth switch, a sixth switch, a seventh switch and an eighth switch connected in series between ground and the input power source, a first flying capacitor of the first phase connected to a common node of the second switch and the third switch, and a common node of the fifth switch and the sixth switch, a second flying capacitor of the first phase connected to a common node of the first switch and the second switch, and a common node of the third switch and the fourth switch, a first flying capacitor of the second phase connected to a common node of the sixth switch and the seventh switch, and the common node of the first switch and the second switch, a second flying capacitor of the second phase connected to the common node of the fifth switch and the sixth switch, and a common node of the seventh switch and the eighth switch, a first inductor connected between the common node of the first switch and the second switch and an output terminal of the hybrid dual-phase step-down power converter and a second inductor connected between the common node of the fifth switch and the sixth switch and the output terminal of the hybrid dual-phase step-down power converter.

The method further comprises configuring the hybrid dual-phase step-down power converter to operate in four different time intervals with the duty cycle in a range from 0% to 50%, in a first time interval, configuring the first switch, the third switch, the sixth switch and the eighth switch to be turned on, and configuring the second switch, the fourth switch, the fifth switch and the seventh switch to be turned off, in a second time interval, configuring the fifth switch and the first switch to be turned on, and configuring the seventh switch, the second switch, the third switch, the fourth switch, the sixth switch and the eighth switch to be turned off, in a third time interval, configuring the first switch, the third switch, the sixth switch and the eighth switch to be turned off, and configuring the second switch, the fourth switch, the fifth switch and the seventh switch to be turned on, and in a fourth time interval, configuring the first switch and the fifth switch to be turned on, and configuring the third switch, the second switch, the seventh switch, the fourth switch, the sixth switch and the eighth switch to be turned off.

The method further comprises configuring a current path having two flying capacitors connected in series to be discharged to a voltage level equal to a voltage of two current paths having one flying capacitor before configuring the two current paths to start discharging in parallel with the current path having two flying capacitors connected in series to prevent charge transferring between flying capacitors from occurring.

The method further comprises applying an input voltage to an output terminal of the hybrid dual-phase step-down power converter, coupling a load to an input terminal of the hybrid dual-phase step-down power converter, and configuring the switches of the first phase and the switches of the second phase such that the hybrid dual-phase step-down power converter is configured to operate a step-up operation mode, and a ratio of a voltage across the load to the input voltage is equal to N/D.

Now referring back to FIG. 14, the dual-phase hybrid converter with a 3:D voltage dividing ratio. As described previously in FIGS. 17-18, in order to avoid the sudden transfer of charges among the flying capacitors and eliminate the charge sharing losses from the flying capacitors, the converter can be configured to operate with six operation intervals over one switching cycles. These six operation intervals are T1, T1B, T3A, T3, T3B, and T1A as shown in FIG. 18. In some embodiments, T1 is equal to T3. T1B is equal to T3B. T1A is equal to T3A. The durations of T3A and T3B intervals can be derived based on the operating principle of the dual-phase hybrid converter. Assuming that the converter reaches the steady state operation and all flying capacitors (C1A, C1B, C2A and C2B) have the same value of capacitance, the voltage on the node SWB at the end of the time interval T1A or the start of time interval T1 can be expressed as:

$$V_{SWBT1} = \frac{Vin}{3} + \Delta V_1 \quad (12)$$

Based on Equation (12), the voltages on the flying capacitors at this moment can be expressed as:

$$V_{C2B} = \frac{2 \times Vin}{3} - \Delta V_1 \quad (13)$$

$$V_{C1B} = \frac{Vin}{3} + \Delta V_1 \quad (14)$$

Based on Kirchhoff's voltage law, the following equations can be obtained:

$$V_{C2A} = \frac{2 \times Vin}{3} + \frac{\Delta V_1}{2} \quad (15)$$

$$V_{C1A} = \frac{Vin}{3} - \frac{\Delta V_1}{2} \quad (16)$$

During the time interval T1, all three capacitor paths discharge together in parallel. Assuming that after the T1 time interval, at the beginning of the T1B time interval, the voltage on the node SWB dropped by $DV_2$, then the following equations can be obtained:

$$V_{C2B} = \frac{2 \times Vin}{3} - \Delta V_1 + \Delta V_2 \quad (17)$$

$$V_{C1B} = \frac{Vin}{3} + \Delta V_1 - \Delta V_2 \quad (18)$$

$$V_{C2A} = \frac{2 \times Vin}{3} + \frac{\Delta V_1}{2} - \frac{\Delta V_2}{2} \quad (19)$$

$$V_{C1A} = \frac{Vin}{3} - \frac{\Delta V_1}{2} + \frac{\Delta V_2}{2} \quad (20)$$

As described earlier, during the T1B time interval, no flying capacitor is discharged, and at the beginning of the time interval T3A, the capacitor path comprising the flying capacitors C1B and C2B has a higher voltage of $V_{SWAT3A}$. The following equation can be obtained:

$$V_{SWTA3A} = V_{C2B} - V_{C1B} = \frac{Vin}{3} - 2 \times \Delta V_1 + 2 \times \Delta V_2 \quad (21)$$

$V_{SWAT3A}$ is higher than the voltage on C1A. Therefore, the flying capacitor path comprising the flying capacitors C1B and C2B is configured to discharge during time the interval T3A until the voltage on the node SWA drops to the same value as the voltage across the flying capacitor C1A (that is Vin/3−DV$_1$/2+DV$_2$/2 in Equation (20)). At this moment, the time interval T3A ends and the time interval T3 starts. During the time interval T3, all three capacitor paths connected to SWA are configured to discharge to the load together. As a result, at the start of the time interval T3, the voltage on the node SWA is same as the voltage across the flying capacitor C1A at the end of the time interval T1. This voltage can be expressed as:

$$V_{SWAT3} = \frac{Vin}{3} - \frac{\Delta V_1}{2} + \frac{\Delta V_2}{2} \quad (22)$$

Since the circuit reached the steady state operation, at the start of T1 and T3, the state of the circuit should be symmetric. In other words, VSWAT3 is equal to VSWBT1. The following equation can be obtained:

$$V_{SWAT3} = \frac{Vin}{3} - \frac{\Delta V_1}{2} + \frac{\Delta V_2}{2} = V_{SWBT1} = \frac{Vin}{3} + \Delta V_1 \quad (23)$$

Based on Equation (22), the following voltage relationship can be obtained:

$$\Delta V_2 = 3 \times \Delta V_1 \quad (24)$$

The voltage on the node SWA at the beginning of T3A, T3 and T3B can be expressed as following:

$$V_{SWAT3A} = \frac{Vin}{3} + 4 \times \Delta V_1 \quad (25)$$

$$V_{SWAT3} = \frac{Vin}{3} + \Delta V_1 \quad (26)$$

$$V_{SWAT3B} = \frac{Vin}{3} - 2 \times \Delta V_1 \quad (27)$$

The total charge changes in T3A and T3 time intervals can be expressed as the product of the total capacitance of the flying capacitors connected to the node SWA and the voltage drop during the time intervals:

$$Q_{T3A} = 3 \times \Delta V_1 \times \frac{C}{2} = I_{LA} \times T3A \quad (28)$$

$$Q_{T3} = 3 \times \Delta V_1 \times 5 \times \frac{C}{2} = I_{LA} \times T3 \quad (29)$$

Theoretically, assuming that the inductor current ripple is small, the change in the charge can also be expressed in terms of the product of average inductor current $I_{LA}$ and the duration of the time intervals. By taking the ratio of Equations (28) and (29), it can be derived that, in order to eliminate the charge sharing losses between the flying capacitors, the ratio of the duration of time interval T3A to T3 in the steady state operation is 1:5. Similarly, the ratio of the duration of time interval T3B to T1 is also 1:5.

Now, referring back to FIG. 17, during the T1 time interval, the ratio of the currents flowing through the three flying capacitor paths is 2:2:1. The single capacitor paths (e.g., path including C1B and path including C2B) may carry twice as much current as the paths with two capacitors in series (e.g., path including C1A and C2A). During the T3A time interval, all inductor currents are carried by the flying capacitor path formed by C1B and C2B. Similarly, during the T3 time interval, the ratio of current flowing through the three flying capacitor paths is 2:2:1, with the path with two flying capacitors in series carrying only one fifth (⅕) of the total inductor current.

In consideration with the total charge balance on a single flying capacitor (e.g., C1B) throughout an entire switching cycle, the total charge entering the C1B can be expressed as:

$$Q^-_{C1B} = \frac{2}{5} \times I_{LB} \times T1 \quad (30)$$

The total charge discharged from C1B can be expressed as:

$$Q^+_{C1B} = I_{LA} \times T3A + \frac{1}{5} \times I_{LA} \times T3 \quad (31)$$

Since in the steady state the total charge entering and leaving any flying capacitor in one switching cycle is the same, and T3 is equal to 5×T3A, and equal to T1, the following equations can be obtained:

$$Q^+_{C1B} - Q^-_{C1B} = I_{LA} \times T3A + \frac{1}{5} \times I_{LA} \times T3 - \frac{2}{5} \times I_{LB} \times T1 \quad (32)$$

$$Q^+_{C1B} - Q^-_{C1B} == \frac{2}{5} \times (I_{LA} - I_{LB}) \times T1 = 0 \quad (33)$$

As indicated by Equation (33), the only way to satisfy the charge balance is to have the following current relationship: $I_{LA}$ is equal to $I_{LB}$. This following current relationship means the average inductor currents flowing through inductors LA and LB are the same.

Similarly, the total charge entering and leaving the other flying capacitors in one switching cycle can be expressed as:

$$Q^+_{C1A} - Q^-_{C1A} = Q^+_{C2B} - Q^-_{C2B} = \frac{2}{5} \times (I_{LB} - I_{LA}) \times T1 \quad (34)$$

$$Q^+_{C1B} - Q^-_{C1B} = Q^+_{C2A} - Q^-_{C2A} = \frac{2}{5} \times (I_{LA} - I_{LB}) \times T1 \quad (35)$$

In operation, for some reasons, the imbalanced inductor currents may occur. For example, $I_{LA}$ is less that $I_{LB}$. Then, according to the above expressions of the total charge balance of the flying capacitors in one cycle, the voltage across C1A and C2B will increase, and voltages across C1B and C2A will decrease. Consequently, during the time intervals T1A and T1, the voltage on switch node SWB will decrease, causing the inductor current $I_{LB}$ to decrease. During the time interval T3A and T3, the voltage on switch node SWA will increase, causing the inductor current $I_{LA}$ to increase, until the average values of the two inductor currents are equal.

Similarly, the equal inductor current and inductor current self-balancing features can also be derived for more general control schemes such as the control scheme shown in FIG. 15. The only difference is that the charge sharing occurring at the beginning of T1 and T3 will cause instantaneous energy losses, and the energy balanced can be used instead of the charge balance. It shows that the average inductor currents need to be the same. For simplicity, the proof is not discussed herein.

In summary, the dual phase hybrid power converter with cross coupled flying capacitors shown in FIG. 14 not only guarantees equal current sharing between two output inductors at the steady state, it also naturally allows the currents of the inductors LA and LB to be self-balanced as long as T1 is equal to T3, and T1A is equal to T3A.

Figure 21:
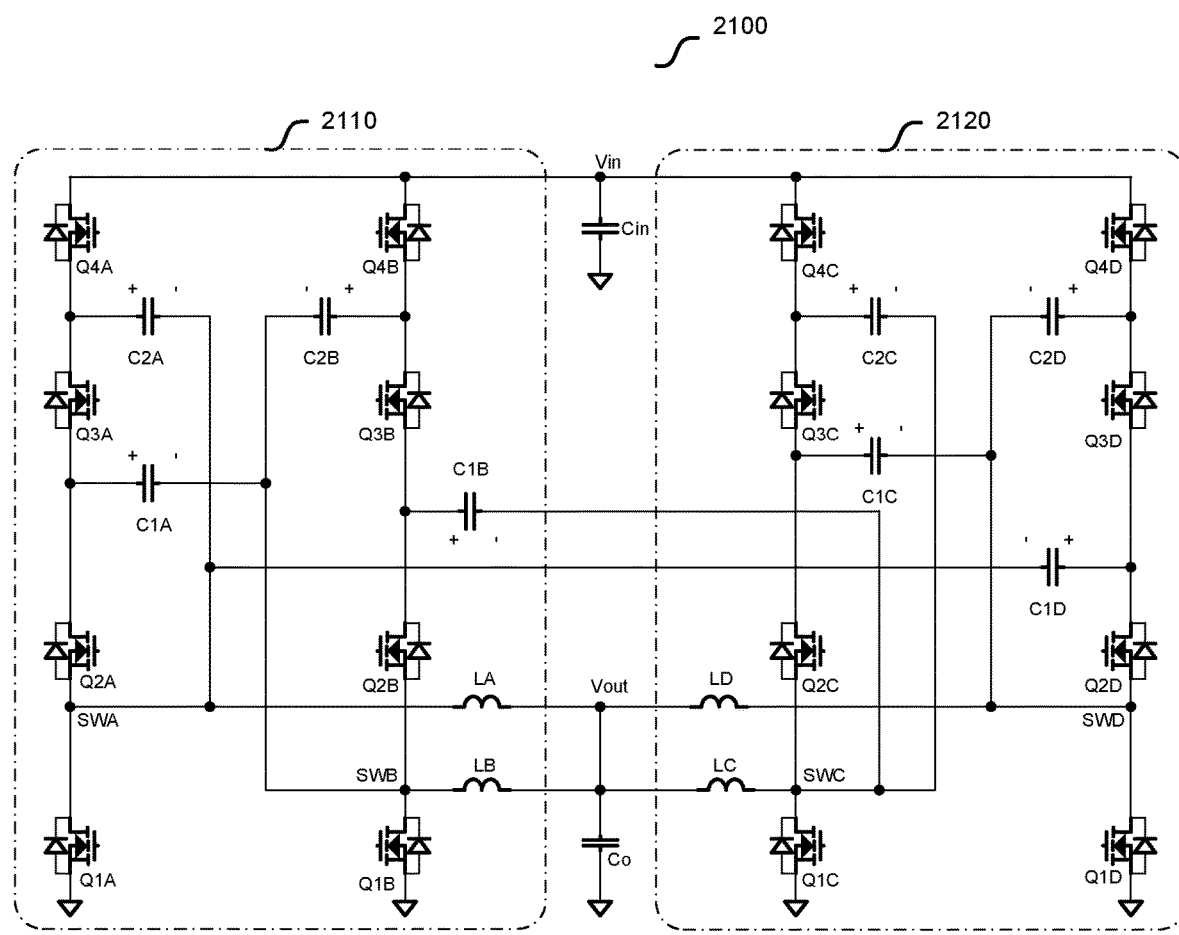
FIG. 21 illustrates a schematic diagram of a hybrid power converter including two converters connected in parallel in accordance with various embodiments of the present disclosure.

To increase the output current, the hybrid converter shown in FIG. 14 can be connected in parallel. FIG. 21 illustrates a schematic diagram of a hybrid power converter including two converters connected in parallel in accordance with various embodiments of the present disclosure. FIG. 21 shows two of the hybrid converter shown in FIG. 14 connected in parallel with a daisy chain arrangement of the flying capacitors C1B and C1D.

The hybrid power converter 2100 comprises two subsystems 2110 and 2120. Each subsystem is identical to the hybrid converter shown in FIG. 14 except the connections of the flying capacitors C1B and C1D. The flying capacitor C1B of the subsystem 2110 is connected to the switching node SWC of the subsystem 2120. In comparison, the flying capacitor C1B is connected to the switching node SWA as shown in FIG. 14. The flying capacitor C1D of the subsystem 2120 is connected the switching node SWA of the subsystem 2110.

Figure 22:
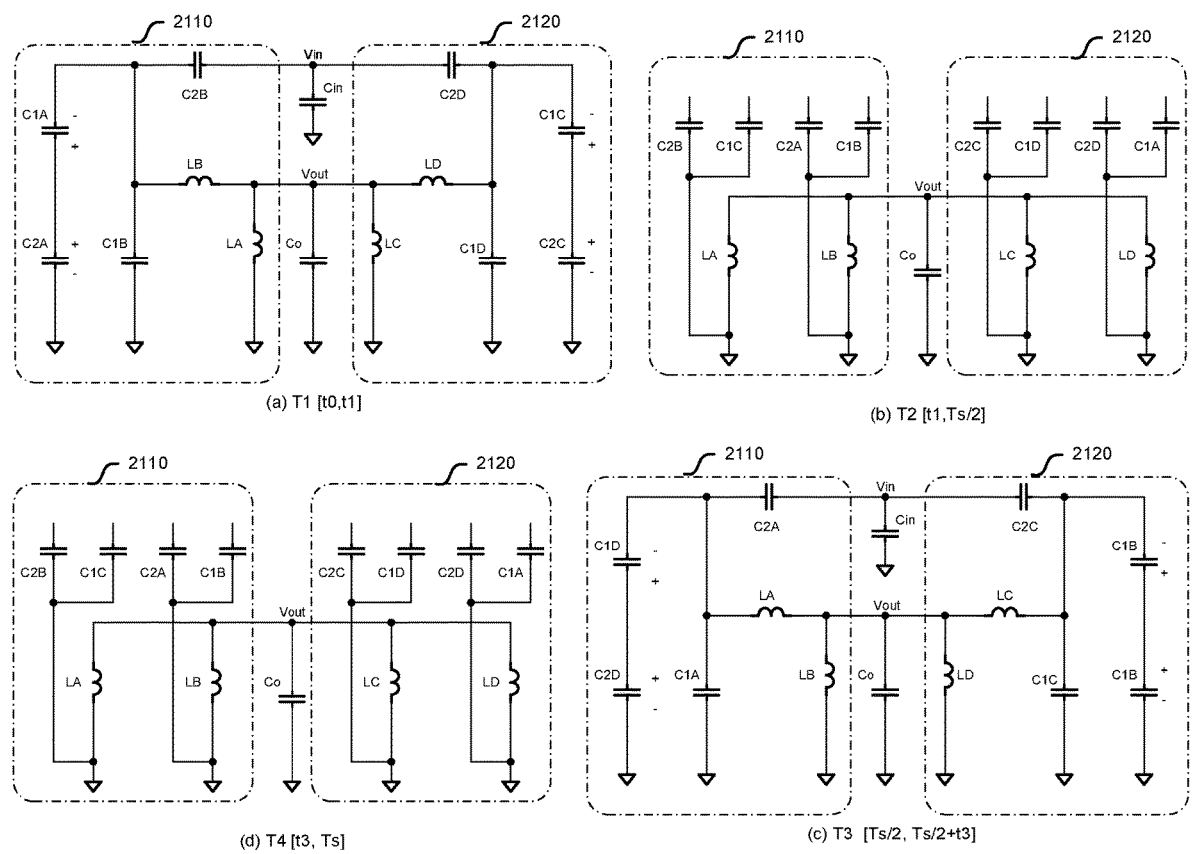
FIG. 22 illustrates four equivalent circuit diagrams for operating the hybrid power converter shown in FIG. 21 in accordance with various embodiments of the present disclosure.

FIG. 22 illustrates four equivalent circuit diagrams for operating the hybrid power converter shown in FIG. 21 in accordance with various embodiments of the present disclosure. There are four intervals over one switching cycle for both hybrid converters. As shown in FIG. 22, T1 is from t0 to t1 (T1, [t0, t1]). T2 is from t1 to Ts/2 (T2, [t1, Ts/2]). T3 is from Ts/2 to Ts/2+t3 (T3=[Ts/2, Ts/2+t3]). T4 is from t3 to Ts (T4=[t3, Ts]), Ts is the switching period. In order to keep the power converter shown in FIG. 21 to operate properly, the conditions that T1=T3 and T2=T4 must be met.

During the interval T1, the switches Q1A, Q1C, Q2B, Q2D, Q3A, Q3C, Q4B, and Q4D are turned on, and the rest of the switches are off. Power is delivered from the input to the output capacitor Co. For the subsystem 2110, the input power is delivered to the output capacitor Co through the switch Q4B, the flying capacitor C2B, and the inductor LB. Both the flying capacitor C2B and the inductor LB are charged. Energy stored in the flying capacitor C2A is discharged to the output capacitor Co through the switch Q3A, the flying capacitor C1A, and the inductor LB. The flying capacitor C1A is charged. The energy stored in flying capacitor C1B is discharged to the output capacitor Co through the switch Q2B, the inductor LB, and the switch Q1C of the subsystem 2120. For the subsystem 2120, the input power is delivered to the output capacitor Co through the switch Q4D, the flying capacitor C2D, and the inductor LD. Both the flying capacitor C2D and the inductor LD are charged. Energy stored in flying capacitor C2C is discharged to the output capacitor Co through the switch Q3C, the flying capacitor C1C, and the inductor LD. The flying capacitor C1C is charged. The energy stored in flying capacitor C1D is discharged to the output capacitor Co through the switch Q1A, the inductor LD, and the switch Q2D of the subsystem 2110. Energy stored in the inductors LA and LC are discharged to the output capacitor Co through the switches Q1A and Q1C. The system load connected to the output node Vout draws energy from the output capacitor Co.

During the interval T2, the switches Q1A, Q1B, Q1C, and Q1D are on, and the rest of the switches are off. Neither the energy from the input nor the energy from the flying capacitors is transferred to the output. The energy stored in inductors LA, LB, LC, and LD is discharged to the output capacitor Co through switches Q1A, Q1B, Q1C, and Q1D. The energy stored in all flying capacitors C1A, C1B, C1C, C1D, C2A, C2B, C2C, C2D remains unchanged. The system load connected to Vout node draws power from the output capacitor Co.

During the interval T3, the energy is transferred from the input to the output capacitor Co. For the subsystem 2110, the energy is transferred from the input to the output capacitor Co through the switch Q1B, the flying capacitor C2A, and the output inductor LA. Both the flying capacitor C2A and the output inductor LA are charged. The energy stored in the flying capacitor C2B is discharged to the output capacitor Co through the switches Q3B, Q1B, the flying capacitor C1B and the inductor LC. The flying capacitor C1B is charged. The energy stored in the flying capacitor C1A is discharged to the output capacitor Co through the switches Q2A, Q1B, and the inductor LA. For subsystem 2120, the energy is delivered from the input to the output capacitor Co through the switch Q4C, the flying capacitor C2C, and the inductor LC. Both the flying capacitor C2C and the inductor LC are charged. The energy stored in the flying capacitor C2D is discharged to the output capacitor Co through the switches Q3D, Q1D, the flying capacitor C1D, and the inductor LA of the subsystem 2110. The flying capacitor C1D is charged. The energy stored in the flying capacitor C1C is discharged to the output capacitor Co through the switches Q2C, Q1D, and the inductor LC. The energy stored in the inductor LB and LD is discharged to the output capacitor Co through the switches Q1B and Q1D. The system load connected to the Vout node draws power from the output capacitor Co.

During the interval T4, the switches Q1B, Q1A, Q1C, and Q1D are on, and the rest of the switches are off. Neither the energy from the input nor the energy from the flying capacitors is transferred to the output. Energy stored in inductors LB, LA, LD, and LC is discharged to the output capacitor Co and the energy stored in all flying capacitors C2B, C2A, C1C, C1D, C1A, C1B, C2C, C2D remains unchanged. At the end of the interval T4, the switching cycle repeats. The modes associated with the four intervals above are pictured in FIG. 22. The voltages on the switching node SWA, SWB, SWC, and SWD are either 0V (when the low side switch shorts the switching node to ground) or Vin/3 (when the low side switch is open) during the steady state operation.

Figure 23:
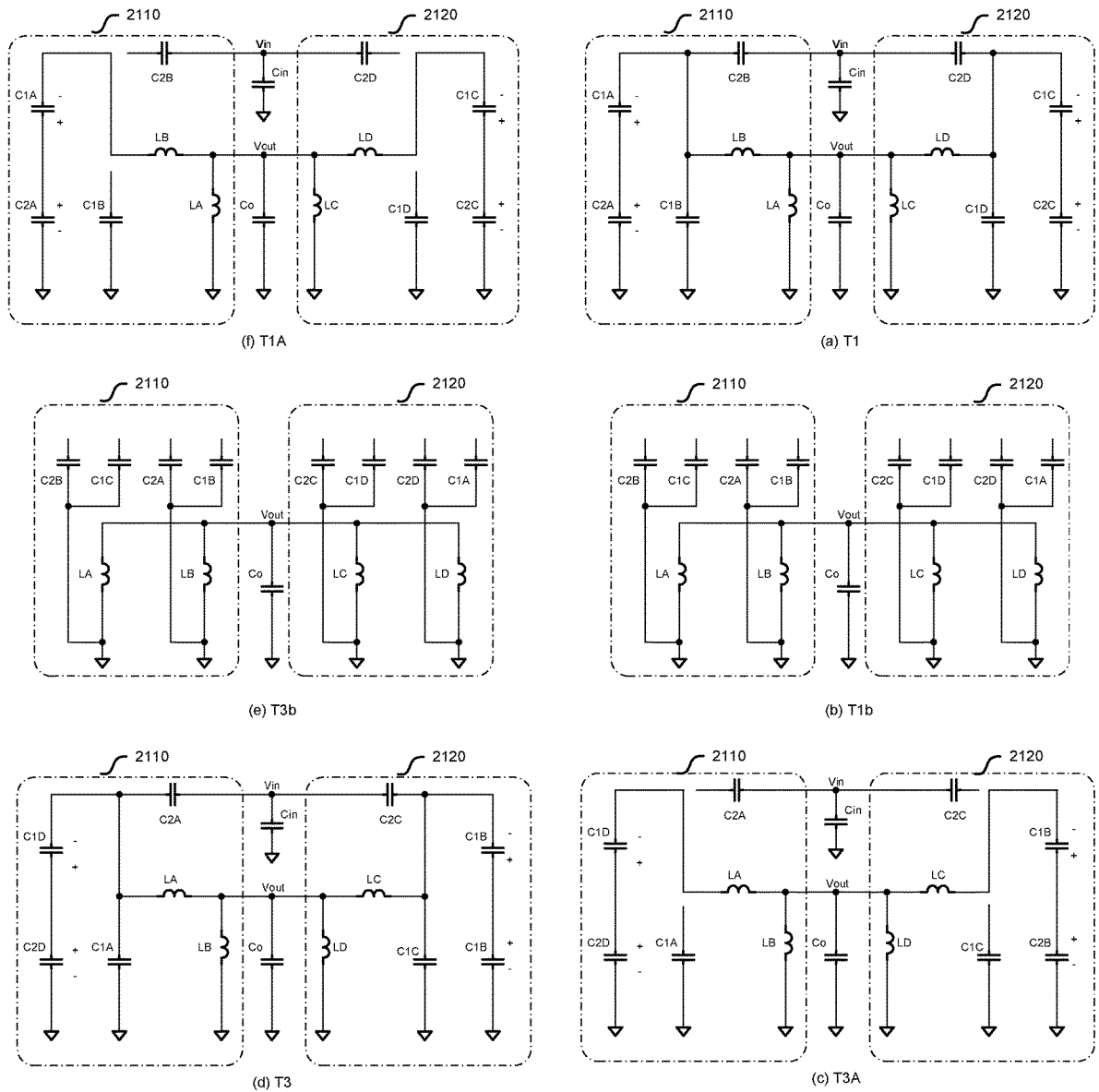
FIG. 23 illustrates six equivalent circuit diagrams for operating the hybrid power converter shown in FIG. 21 in accordance with various embodiments of the present disclosure.

FIG. 23 illustrates six equivalent circuit diagrams for operating the hybrid power converter shown in FIG. 21 in accordance with various embodiments of the present disclosure. Similar to the single dual phase power converter shown in FIG. 14, when two of the dual phase modules are daisy-chained effectively into a 4-phase hybrid power converter with cross coupled flying capacitors as shown in FIG. 21, the power converter shown in FIG. 21 can also be controlled to operate with six time intervals per switching cycle to minimize the voltage difference between multiple flying capacitor paths and avoid in-rush current, thereby reducing the associated power losses.

FIG. 23 shows the equivalent circuit diagram of the 4-phase hybrid power converter in each time interval. The operating principle is similar to that shown in FIG. 17 for the power converter in FIG. 14, and hence are not discussed herein. The waveforms associated with FIG. 23 are similar to those shown in FIG. 18, and hence are not discussed herein.

It should be noted that the control scheme of operating the power converter with an extra state and time interval (e.g., T1A of FIG. 23) before each time multiple flying capacitor paths are connected together (e.g., at beginning of T1 of FIG. 23) to minimize the voltage difference between multiple flying capacitor paths and avoid in-rush current is applicable to all embodiments of the present disclosure. For example, for all embodiments that are described to operate with four time intervals per switch cycle, it can also be configured to operate with six time intervals per switching cycle. For all embodiments that are described to operate with six time intervals per switch cycle, it can also be configured to operate with nine time intervals per switching cycle. In general, for all embodiments that are described to operate with 2×P time intervals per switch cycle, it can also be configured to operate with 3×P time intervals per switching cycle to implement the control scheme to minimize the voltage difference between multiple flying capacitor paths and avoid in-rush current. P is an integer greater than 1.

Based on the previous analysis, at the steady state, the total charge entering and leaving any flying capacitor in one switching cycle is the same. T3 is equal to 5×T3A. T1 is equal to 5×T1A. T3 is equal to T1. The following equations can be obtained:

$$Q^+_{C1B} - Q^-_{C1B} = I_{LC} \times T3A + \frac{1}{5} \times I_{LC} \times T3 - \frac{2}{5} \times I_{LB} \times T1 \quad (36)$$

$$Q^+_{C1B} - Q^-_{C1B} = \frac{2}{5} \times (I_{LC} - I_{LB}) \times T1 = 0 \quad (37)$$

$$Q^+_{C1A} - Q^-_{C1A} = I_{LB} \times T1A + \frac{1}{5} \times I_{LB} \times T1 - \frac{2}{5} \times I_{LA} \times T3 \quad (38)$$

$$Q^+_{C1A} - Q^-_{C1A} = \frac{2}{5} \times (I_{LB} - I_{LA}) \times T1 = 0 \quad (39)$$

$$Q^+_{C1C} - Q^-_{C1C} = I_{LD} \times T1A + \frac{1}{5} \times I_{LD} \times T1 - \frac{2}{5} \times I_{LC} \times T3 \quad (40)$$

$$Q^+_{C1C} - Q^-_{C1C} = \frac{2}{5} \times (I_{LD} - I_{LC}) \times T1 = 0 \quad (41)$$

$$Q^+_{C1D} - Q^-_{C1D} = I_{LA} \times T3A + \frac{1}{5} \times I_{LA} \times T3 - \frac{2}{5} \times I_{LD} \times T1 \quad (42)$$

$$Q^+_{C1D} - Q^-_{C1D} = \frac{2}{5} \times (I_{LA} - I_{LD}) \times T1 = 0 \quad (43)$$

The only way to satisfy the charge balance is to have the following current relationships. $I_{LA}$ is equal to $I_{LB}$. $I_{LB}$ is equal to $I_{LC}$. $I_{LC}$ is equal to $I_{LD}$. In other words, the average inductor currents flowing through LA, LB, LC and LD are the same. Similarly, the equal inductor current and inductor current self-balancing conclusions can also be derived for more general control schemes as shown in FIG. 22.

In contrast, the conventional approach of paralleling a plurality of power converter modules (e.g., connecting only at the power inputs and outputs) does not offer any inductor current balancing. The conventional approach could cause additional losses due to an uneven distribution of the current among inductors of different power converter modules. When the dual phase hybrid power converters are daisy-chained with cross coupled flying capacitors as shown in FIG. 21, the equal current distribution among all output inductors is guaranteed at the steady state. It also inherently allows the currents of the inductors LA, LB, LC and LD to be self-balanced as long as T1 is equal to T3, and T1A is equal to T3A.

Figure 24:
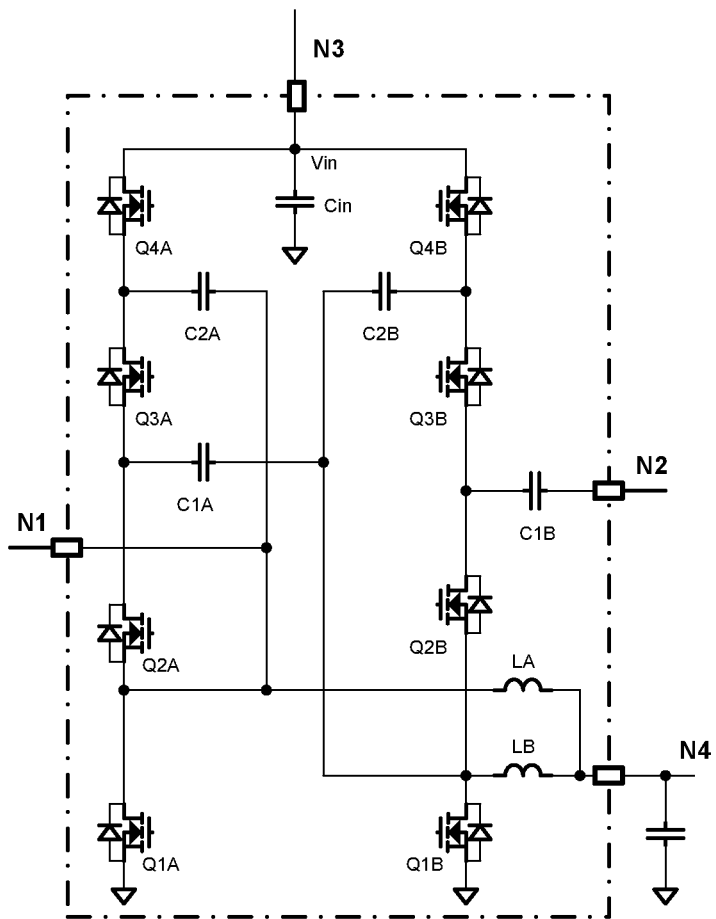
FIG. 24 illustrates a schematic diagram of a hybrid dual-phase step-down power converter module in accordance with various embodiments of the present disclosure.

FIG. 24 illustrates a schematic diagram of a hybrid dual-phase step-down power converter module in accordance with various embodiments of the present disclosure. The module has four nodes, namely a first node N1, a second node N2, a third node N3 and a fourth node N4 as shown in FIG. 24. The module comprises two phases. Each phase comprises a phase leg and two flying capacitors. A first phase leg comprises switches Q1A, Q2A, Q3A and Q4A connected in series between ground and the input power source Vin. The input power source Vin is connected to the third node N3. A second phase leg comprises switches Q1B, Q2B, Q3B and Q4B connected in series between ground and the input power source Vin. The first phase comprises flying capacitors C1A and C2A. The second phase comprises flying capacitors C1B and C2B.

As shown in FIG. 24, C1A is connected between a common node of Q2A and Q3A, and a common node of Q1B and Q2B. C2A is connected between a common node of Q4A and Q3A, and a common node of Q1A and Q2A. The first node N1 is connected to the common node of Q1A and Q2A. C1B is connected between a common node of Q3B and Q2B, and the second node N2. C2B is connected between a common node of Q4B and Q3B, and a common node of Q1B and Q2B.

The hybrid dual-phase step-down power converter module further comprises inductors LA and LB. LA is connected between the common node of Q1A and Q2A, and the output terminal of the hybrid dual-phase step-down power converter module. LB is connected between a common node of Q1B and Q2B, and the module. The output of the hybrid dual-phase step-down power converter module is the fourth node N4.

Figure 25:
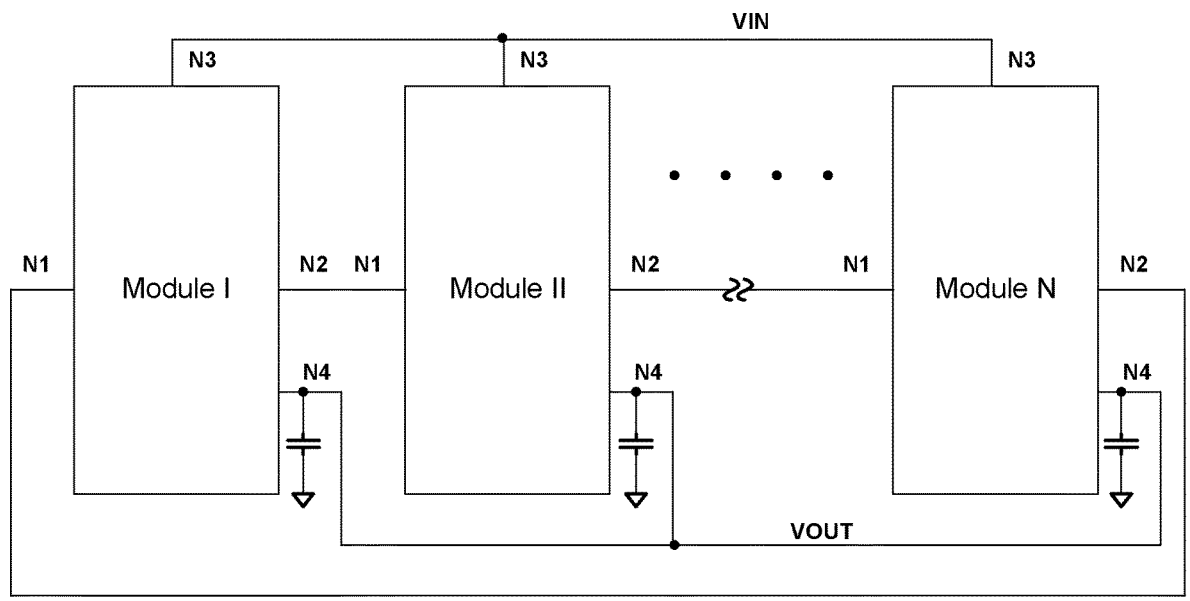
FIG. 25 illustrates a block diagram of a hybrid multi-phase step-down power converter having N modules in accordance with various embodiments of the present disclosure.

FIG. 25 illustrates a block diagram of a hybrid multi-phase step-down power converter having N modules in accordance with various embodiments of the present disclosure. Each module shown in FIG. 25 has a structure similar to that shown in FIG. 24. Each module includes two phases. The total number of phases is L. L is equal to 2×N. L is an even number. As shown in FIG. 25, the third nodes N3 of the N modules are connected to Vin. The fourth nodes N4 of the N modules are connected together as the output terminal of the hybrid multi-phase step-down power converter. The second node N2 of a module (e.g., Module I) is connected to the first node N1 of a subsequently adjacent module (e.g., Module II). The second node N2 of Module N is connected to the first node N1 of Module I.

In operation, the inherent inductor current balancing can be achieved through the coupled flying capacitors. Under this configuration, the power converter can operate with a duty cycle D in a range from 0% to 50%. Correspondingly the power conversion ratio of VIN to VOUT is 3:D.

The power converter shown in FIG. 25 is configured to operate in four different time intervals. The power converter is configured to operate with a duty cycle D in a range from 0% to 50%. As a result of having the duty cycle, an output voltage of the power converter is regulated in a range from 0 V to one sixth (⅙) of an input voltage applied to the power converter. The operating principle of the four different time intervals will be described below with respect to FIGS.

26-29. In FIGS. 26-29, the arrows on the components indicate the corresponding switches have been turned off.

Figure 26:
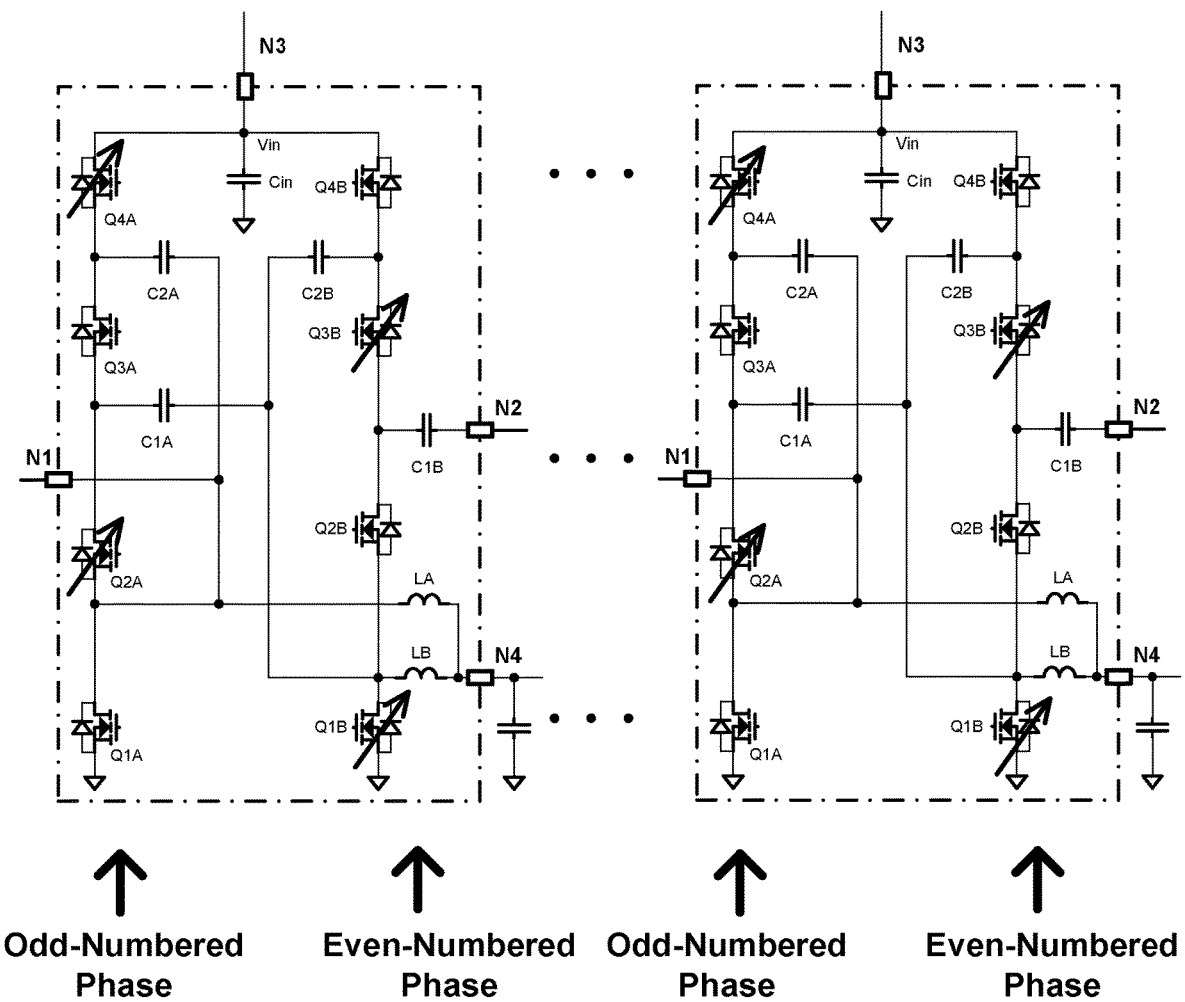
FIG. 26 illustrates the operating principle of the hybrid multi-phase step-down power converter configured to operate in a first time interval in accordance with various embodiments of the present disclosure.

FIG. 26 illustrates the operating principle of the hybrid multi-phase step-down power converter configured to operate in a first time interval in accordance with various embodiments of the present disclosure. In the first time interval, first switches and third switches of odd-numbered phase legs, and second switches and fourth switches of even-numbered phase legs are configured to be turned on. Second switches and fourth switches of the odd-numbered phase legs, and first switches, and third switches of the even-numbered phase legs are configured to be turned off. In the first time interval, the inductors of the odd-numbered phase legs are discharged, and the inductors of the even-numbered phase legs are charged.

Figure 27:
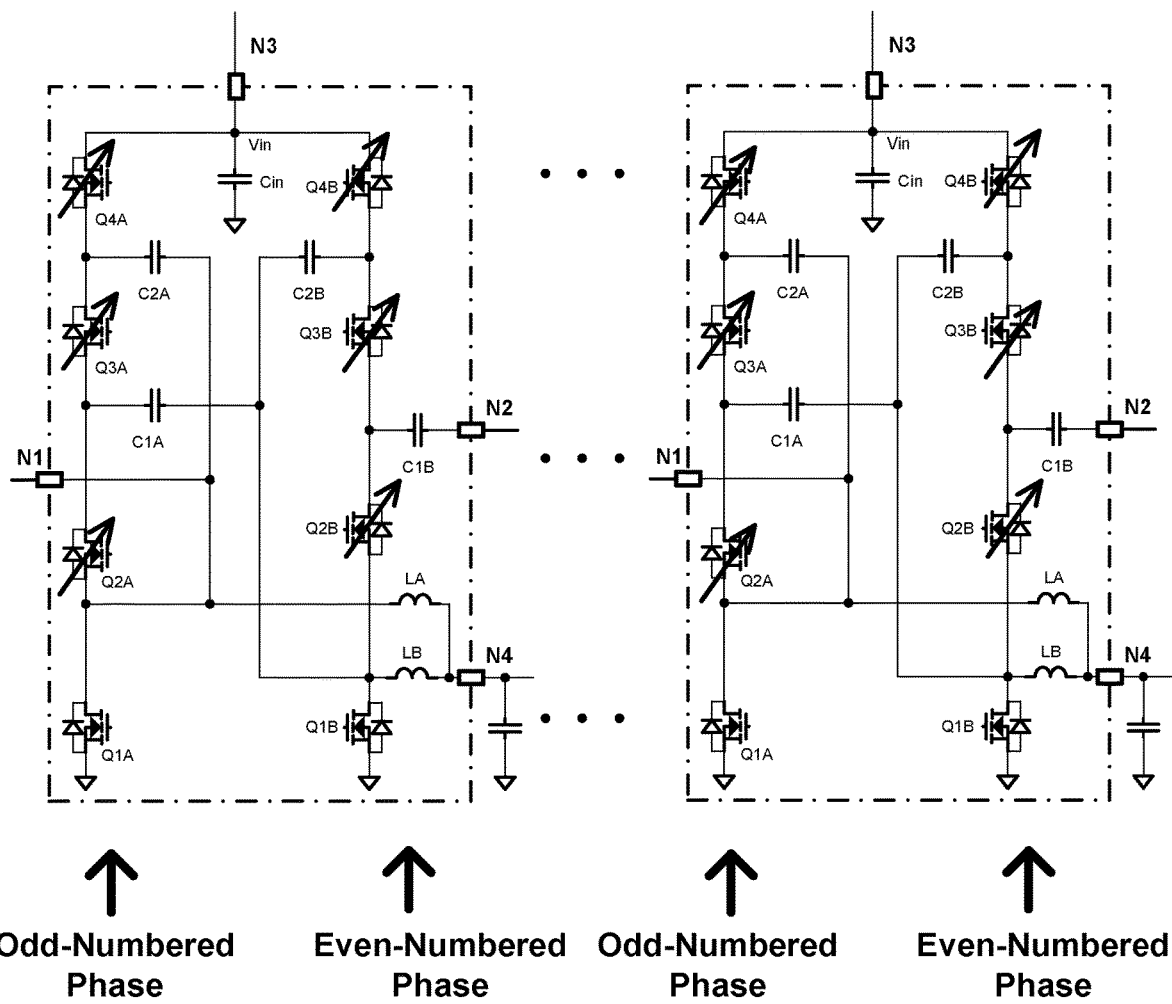
FIG. 27 illustrates the operating principle of the hybrid multi-phase step-down power converter configured to operate in a second time interval in accordance with various embodiments of the present disclosure.

FIG. 27 illustrates the operating principle of the hybrid multi-phase step-down power converter configured to operate in a second time interval in accordance with various embodiments of the present disclosure. In the second time interval, the first switches of the L phase legs are configured to be turned on. The fourth switches, the third switches, the second switches of the L phase legs are configured to be turned off. In the second time interval, the L inductors are discharged.

Figure 28:
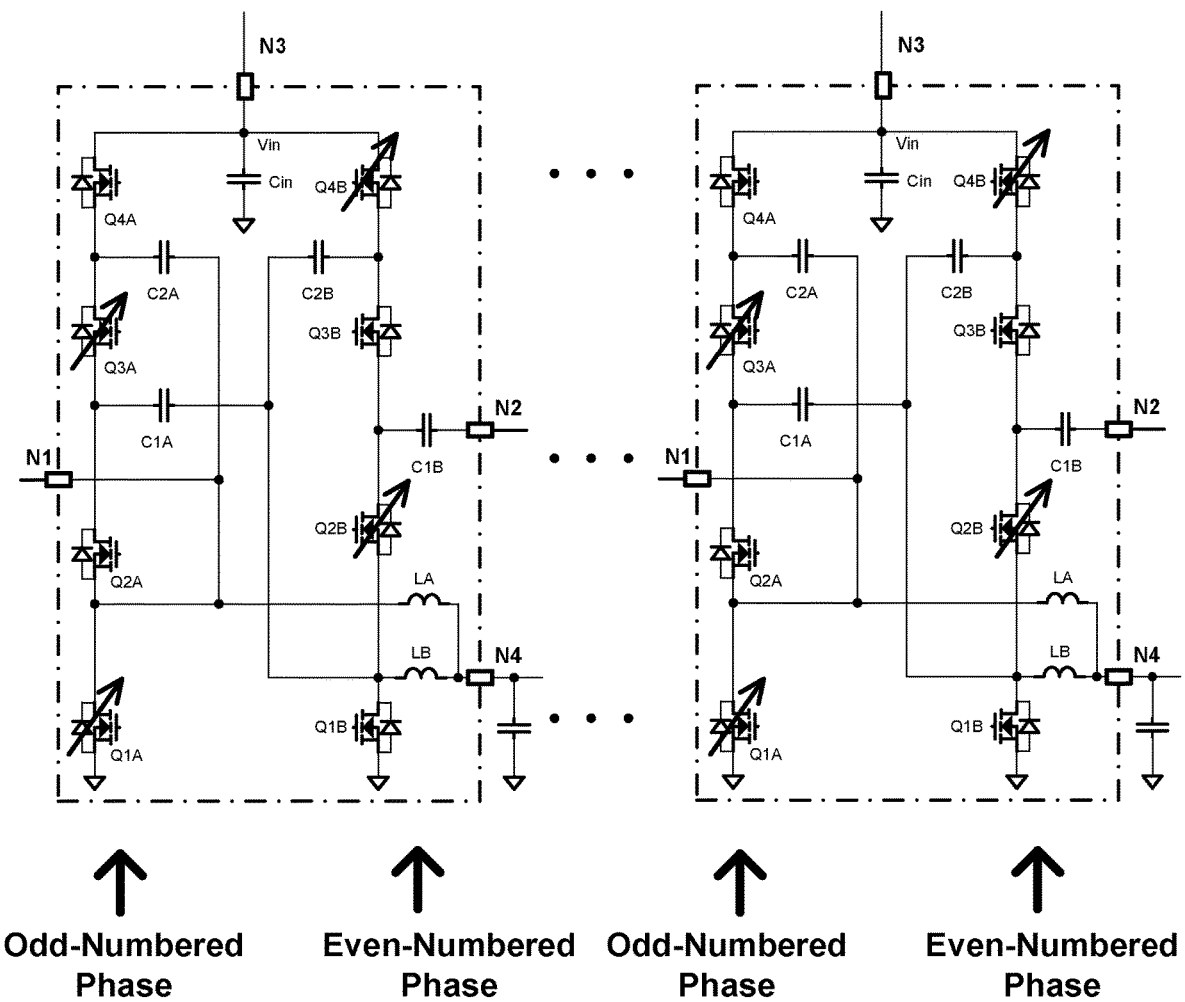
FIG. 28 illustrates the operating principle of the hybrid multi-phase step-down power converter configured to operate in a third time interval in accordance with various embodiments of the present disclosure.

FIG. 28 illustrates the operating principle of the hybrid multi-phase step-down power converter configured to operate in a third time interval in accordance with various embodiments of the present disclosure. In the third time interval, the first switches and the third switches of the odd-numbered phase legs, and the second switches and fourth switches of the even-numbered phase legs are configured to be turned off. The second switches and fourth switches of the odd-numbered phase legs, and the first switches and the third switches of the even-numbered phase legs are configured to be turned on. In the third time interval, the inductors of the odd-numbered phase legs are charged, and the inductors of the even-numbered phase legs are discharged.

Figure 29:
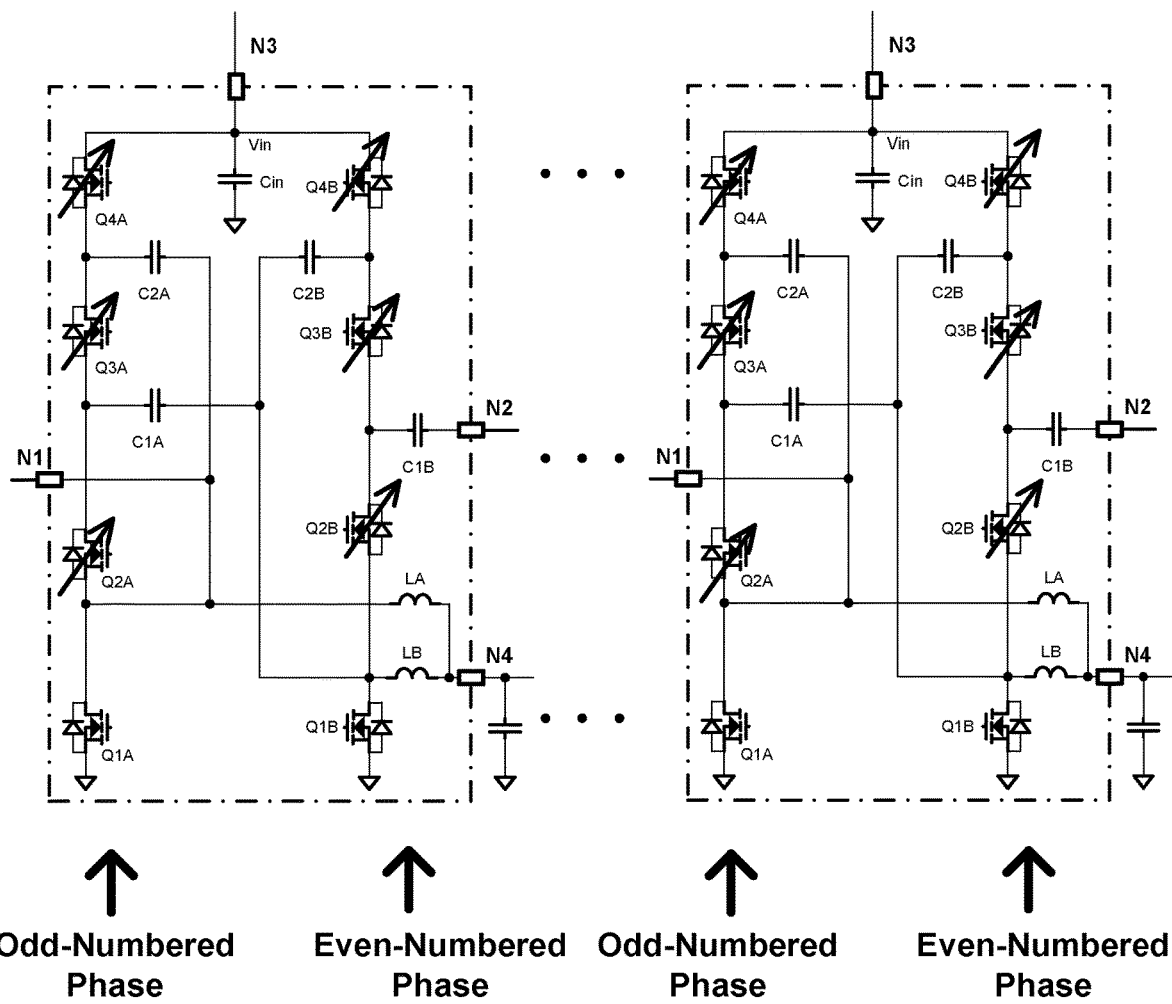
FIG. 29 illustrates the operating principle of the hybrid multi-phase step-down power converter configured to operate in a fourth time interval in accordance with various embodiments of the present disclosure.

FIG. 29 illustrates the operating principle of the hybrid multi-phase step-down power converter configured to operate in a fourth time interval in accordance with various embodiments of the present disclosure. In the fourth time interval, the first switches of the L phase legs are configured to be turned on. The fourth switches, the third switches, the second switches of the L phase legs are configured to be turned off. In the fourth time interval, the L inductors are discharged.

Figure 30:
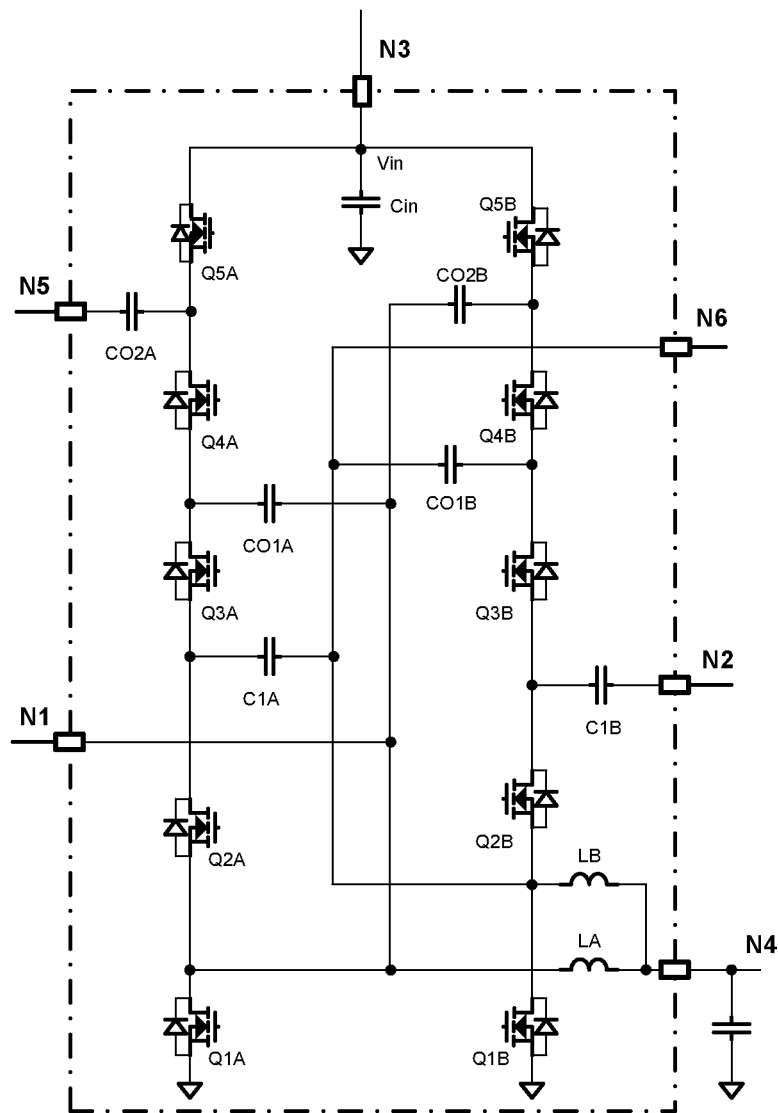
FIG. 30 illustrates a schematic diagram of a module of a hybrid multi-phase step-down power converter in accordance with various embodiments of the present disclosure.

FIG. 30 illustrates a schematic diagram of a module of a hybrid multi-phase step-down power converter in accordance with various embodiments of the present disclosure. The module has six nodes, namely a first node N1, a second node N2, a third node N3, a fourth node N4 and a fifth node N5 and a sixth node N6 as shown in FIG. 30. The module comprises two phases. Each phase comprises a phase leg and three flying capacitors. A first phase leg comprises switches Q1A, Q2A, Q3A, Q4A and Q5A connected in series between ground and the input power source Vin. The input power source Vin is connected to the third node N3. A second phase leg comprises switches Q1B, Q2B, Q3B, Q4B and Q5B connected in series between ground and the input power source Vin. As shown in FIG. 30, the first phase comprises flying capacitors C1A, CO1A and CO2A. The second phase comprises flying capacitors C1B, CO1B and CO2B.

As shown in FIG. 30, C1A is connected between a common node of Q2A and Q3A, and a common node of Q1B and Q2B. CO1A is connected between a common node of Q3A and Q4A, and a common node of Q1A and Q2A. The first node N1 is connected to the common node of Q1A and Q2A. CO2A is connected between a common node of Q4A and Q5A, and the fifth node N5.

As shown in FIG. 30, C1B is connected between a common node of Q2B and Q3B, and the second node N2. CO1B is connected between a common node of Q3B and Q4B, and a common node of Q1B and Q2B. The sixth node N6 is connected to the common node of Q1B and Q2B. CO2B is connected between a common node of Q4B and Q5B, and a common node of Q1A and Q2A.

The module further comprises inductors LA and LB. As shown in FIG. 30, LA is connected between the common node of Q1A and Q2A, and the output terminal of the hybrid multi-phase step-down power converter. LB is connected between the common node of Q1B and Q2B, and the output terminal of the hybrid multi-phase step-down power converter. The output terminal of the hybrid multi-phase step-down power converter is the fourth node N4.

Figure 31:
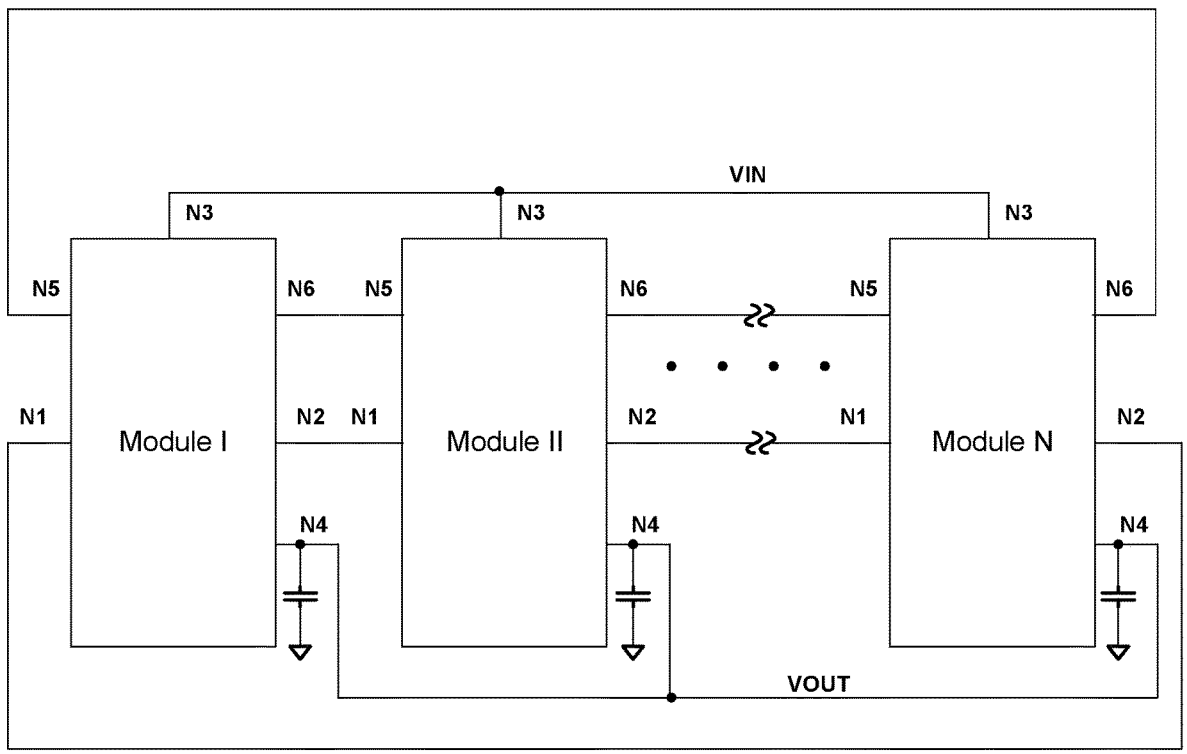
FIG. 31 illustrates a block diagram of a hybrid multi-phase step-down power converter having N modules in accordance with various embodiments of the present disclosure.

FIG. 31 illustrates a block diagram of a hybrid multi-phase step-down power converter having N modules in accordance with various embodiments of the present disclosure. Each module shown in FIG. 31 has a structure similar to that shown in FIG. 30. Each module includes two phases. The total number of phases is L equal to 2×N. L is an even number. As shown in FIG. 31, the third nodes N3 of the N modules are connected to Vin. The fourth nodes N4 of the N modules are connected together as the output terminal of the hybrid multi-phase step-down power converter. The sixth node N6 of a module (e.g., Module I) is connected to the fifth node N5 of a subsequently adjacent module (e.g., Module II). The second node N2 of a module (e.g., Module I) is connected to the first node N1 of a subsequently adjacent module (e.g., Module II). The sixth node N6 of Module N is connected to the fifth node N5 of Module I. The second node N2 of Module N is connected to the first node N1 of Module I.

The hybrid multi-phase step-down power converter comprises L phase legs, 3×L flying capacitors and L inductors. M is a predetermined integer. L is greater than M. J is a predetermined integer. J is greater than 1. Each phase leg comprises a first switch, a second switch, a third switch, a fourth switch and a fifth switch connected in series between ground and the input power source Vin. The first flying capacitor of an Mth phase leg is connected between a common node of the second switch and the third switch of the Mth phase leg, and a common node of the first switch and the second switch of the (M+1)th phase leg. The first flying capacitor of the Lth phase leg is connected between a common node of the third switch and the second switch of the Lth phase leg, and a common node of the first switch and the second switch of the first phase leg. The second flying capacitor of each phase leg is connected between a common node of the fourth switch and the third switch, and a common node of the first switch and the second switch of the same phase leg. The third flying capacitor of a Jth phase leg is connected between a common node of the fourth switch and the fifth switch of the Jth phase leg, and a common node of the first switch and the second switch of a (J−1)th phase leg. The third flying capacitor of the first phase leg is connected to a common node of the fourth switch and the fifth switch of the first phase leg, and a common node of the first switch and the second switch of the Lth phase leg.

The hybrid multi-phase step-down power converter comprises L inductors. Each inductor is connected between a common node of the first switch and the second switch of a phase leg of the L phase legs, and the output terminal of the hybrid multi-phase step-down power converter.

In operation, the first switches, the second switches, the third switches, the fourth switches and the fifth switches of the L phase legs, the first flying capacitors, the second flying capacitors and the third flying capacitors of the L phase legs and the L inductors form a power converter having a ratio of an input voltage to an output voltage equal to 4/D. D is the duty cycle of the power converter The power converter shown in FIG. 31 is configured to operate in four different time intervals. The power converter is configured to operate with a duty cycle D in a range from 0% to 50%. As a result of having the duty cycle, an output voltage of the power converter is regulated in a range from 0 V to one eighth (⅛) of an input voltage applied to the power converter. The operating principle of the four different time intervals will be described below with respect to FIGS. 32-35. In FIGS. 32-35, the arrows on the components indicate the corresponding switches have been turned off.

Figure 32:
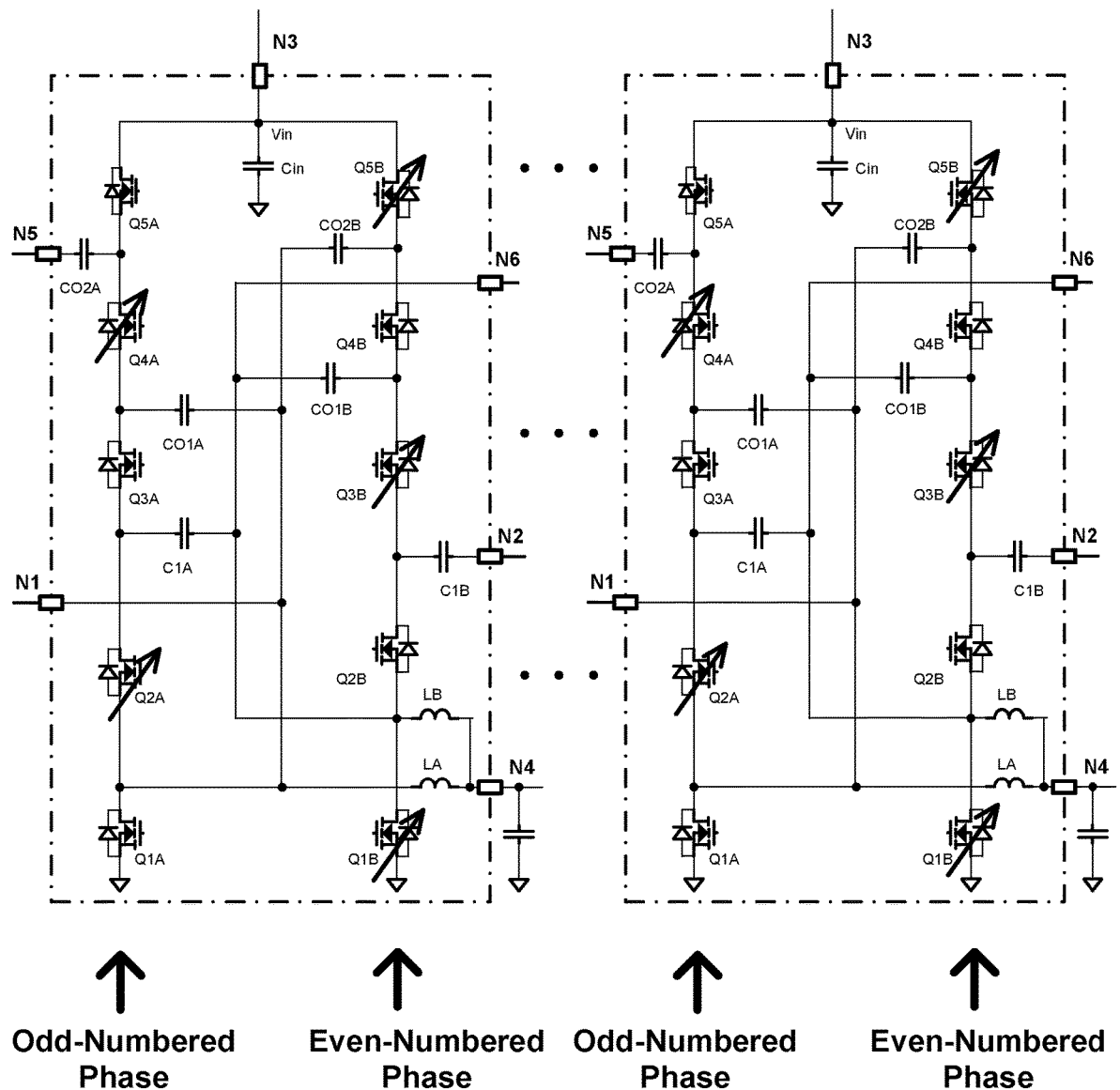
FIG. 32 the operating principle of the hybrid multi-phase step-down power converter configured to operate in a first time interval in accordance with various embodiments of the present disclosure.

FIG. 32 illustrates the operating principle of the hybrid multi-phase step-down power converter configured to operate in a first time interval in accordance with various embodiments of the present disclosure. In the first time interval, first switches, third switches and fifth switches of the odd-numbered phase legs, and second switches and fourth switches of the even-numbered phase legs are configured to be turned on, and second switches and fourth switches of the odd-numbered phase legs, and first switches, third switches and fifth switches of the even-numbered phase legs are configured to be turned off. The inductors of the odd-numbered phase legs are discharged. The inductors of the even-numbered phase legs are charged.

Figure 33:
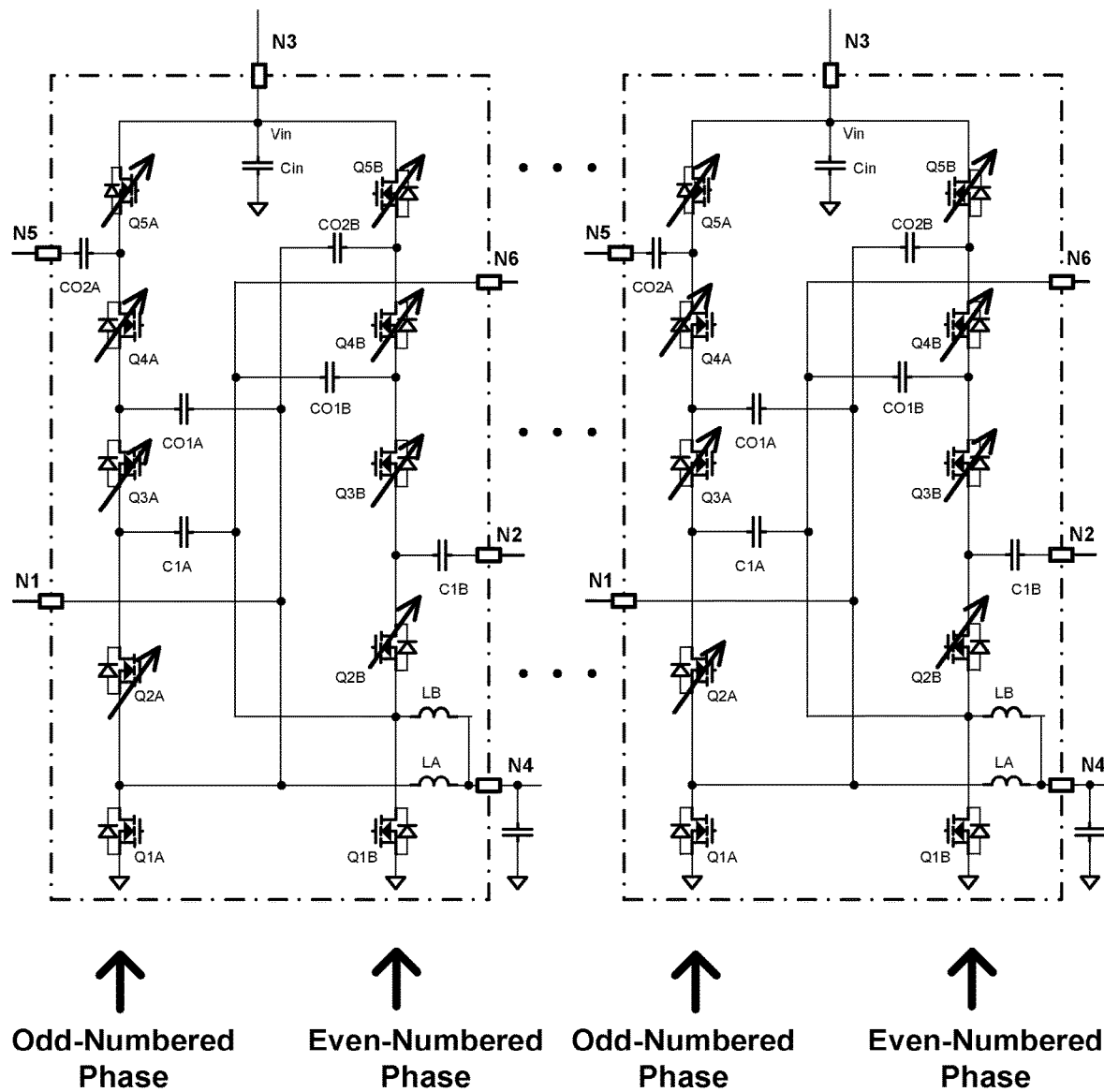
FIG. 33 illustrates the operating principle of the hybrid multi-phase step-down power converter configured to operate in a second time interval in accordance with various embodiments of the present disclosure.

FIG. 33 illustrates the operating principle of the hybrid multi-phase step-down power converter configured to operate in a second time interval in accordance with various embodiments of the present disclosure. In the second time interval, the first switches of the L phase legs are configured to be turned on. The fifth switches, the fourth switches, the third switches, and the second switches of the L phase legs are configured to be turned off. In the second time interval, the L inductors are discharged.

Figure 34:
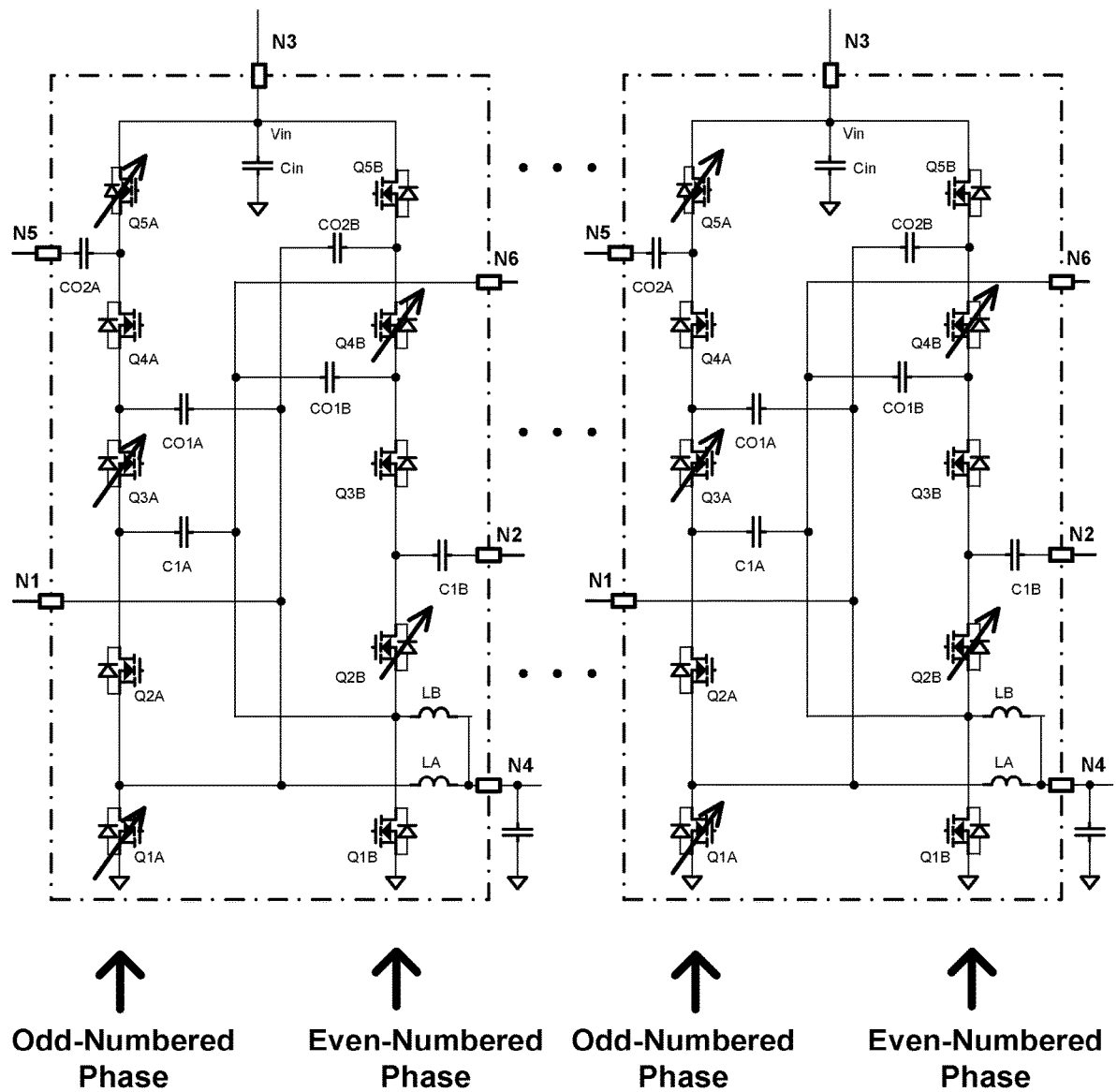
FIG. 34 illustrates the operating principle of the hybrid multi-phase step-down power converter configured to operate in a third time interval in accordance with various embodiments of the present disclosure.

FIG. 34 illustrates the operating principle of the hybrid multi-phase step-down power converter configured to operate in a third time interval in accordance with various embodiments of the present disclosure. In the third time interval, the first switches, the third switches and the fifth switches of the odd-numbered phase legs, and the second switches and fourth switches of the even-numbered phase legs are configured to be turned off. The second switches and fourth switches of the odd-numbered phase legs, and the first switches, the third switches and the fifth switches of the even-numbered phase legs are configured to be turned on. In the third time interval, the inductors of the odd-numbered phase legs are charged, and the inductors of the even-numbered phase legs are discharged.

Figure 35:
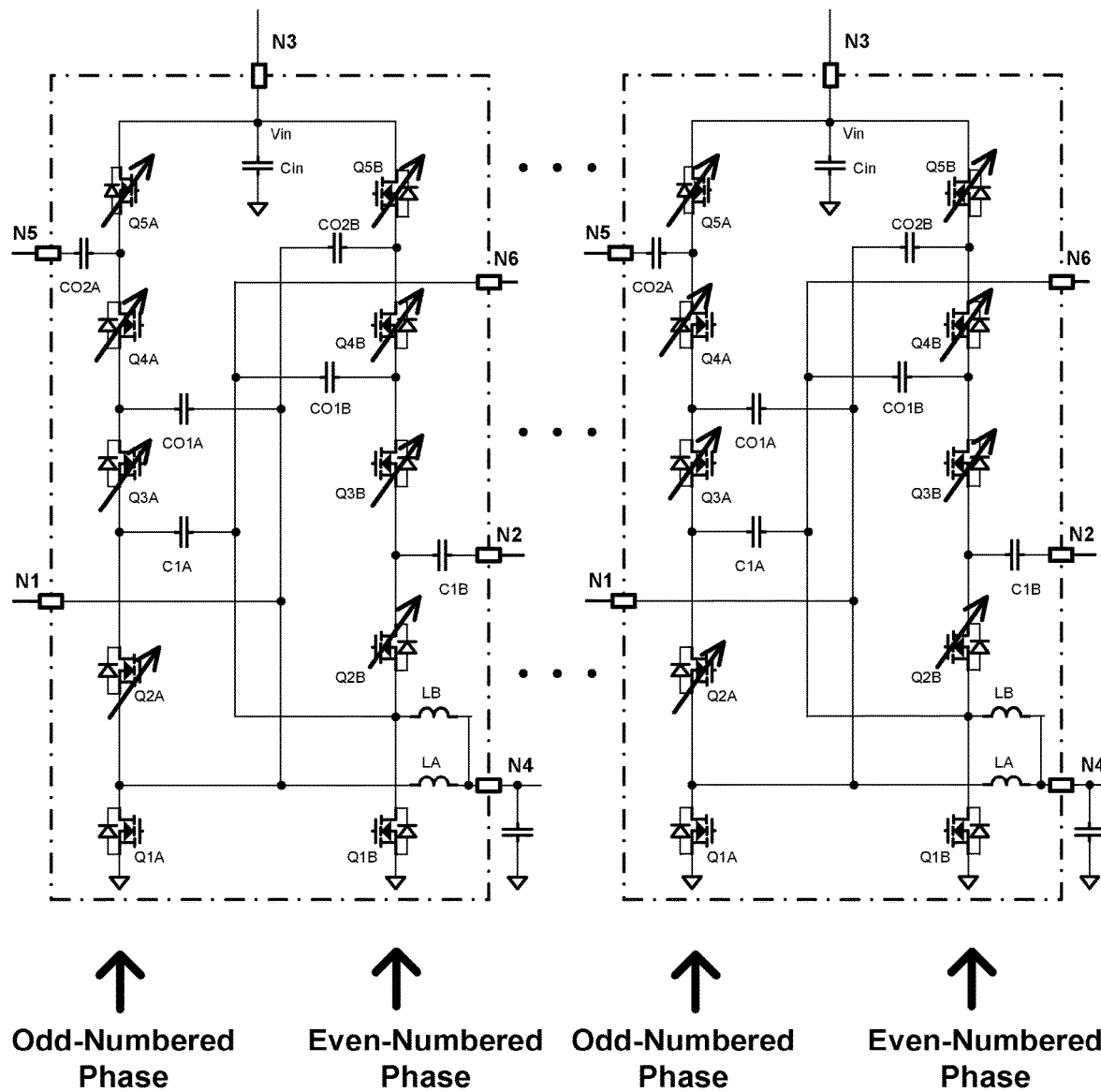
FIG. 35 illustrates the operating principle of the hybrid multi-phase step-down power converter configured to operate in a fourth time interval in accordance with various embodiments of the present disclosure.

FIG. 35 illustrates the operating principle of the hybrid multi-phase step-down power converter configured to operate in a fourth time interval in accordance with various embodiments of the present disclosure. In the fourth time interval, the first switches of the L phase legs are configured to be turned on. The fifth switches, the fourth switches, the third switches, the second switches of the L phase legs are configured to be turned off. In the fourth time interval, the L inductors are discharged.

Similarly, the dual-phase 2:D hybrid converter can be daisy-chained into multi-phase converter with an even number of phases. The flying capacitor of each phase is cross-connected to the switch node of the next phase. The hybrid converter can operate with up a duty cycle up to 50%. This is similar to that shown in FIG. 13. As long as T1 is equal to T3, due to the cross-coupling of the flying capacitors, the inductor currents are naturally balanced among all output inductors.

Figure 36:
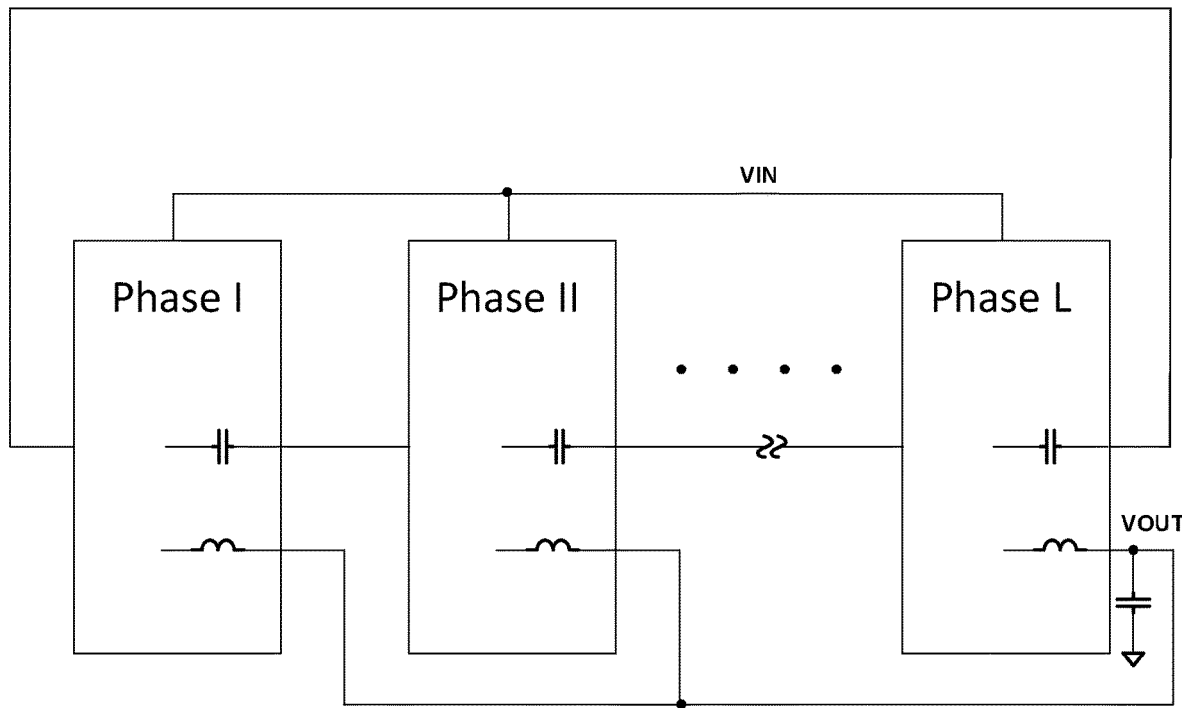
FIG. 36 illustrates a block diagram of a hybrid multi-phase 2:D power converter having an even number of phases in accordance with various embodiments of the present disclosure.

FIG. 36 illustrates a block diagram of a hybrid multi-phase 2:D power converter having an even number of phases in accordance with various embodiments of the present disclosure. The hybrid multi-phase step-down power converter comprises L phases. Each phase comprises a phase leg. In other words, the hybrid multi-phase step-down power converter comprises L phase legs. Each phase leg of the L phase legs comprises a plurality of switches connected in series between an input power source and ground. Each phase may comprise a plurality of flying capacitors.

A first flying capacitor of an Mth phase is cross-coupled between an Mth phase leg and an (M+1)th phase leg as shown in FIG. 36. More particularly, the first flying capacitor of the Mth phase is connected between the Mth phase leg and the lowest switch common node of the plurality of switches of the (M+1)th phase leg. A first flying capacitor of an Lth phase is cross-coupled between an Lth phase leg and a first phase leg. More particularly, the first flying capacitor of the Lth phase is connected between the Lth phase leg and the lowest switch common node of the plurality of switches of the first phase leg.

The hybrid multi-phase step-down power converter comprises L inductors. Each inductor of the L inductors connected between a lowest switch common node of the plurality of switches of a corresponding phase leg and an output terminal VOUT of the hybrid multi-phase step-down power converter.

In operation, the switches of the L phase legs are configured such that a ratio of an input voltage of the hybrid multi-phase step-down power converter to an output voltage of the hybrid multi-phase step-down power converter is equal to N/D. L, M, N are positive integers. L is greater than M. L is greater than 2. D is a duty cycle of the hybrid multi-phase step-down power converter.

In some embodiments, the hybrid multi-phase step-down power converter is a 2:D power converter as shown in FIG. 36. Under this configuration, each of the L phase legs comprises a third switch, a second switch and a first switch connected in series between the input power source VIN and ground. A common node of the second switch and the first switch is the lowest switch common node of the plurality of switches of a corresponding phase leg.

The first flying capacitor of the Mth phase is connected between a common node of the third switch and the second switch of the Mth phase leg, and a common node of the second switch and the first switch of the (M+1)th phase leg. The first flying capacitor of the Lth phase is connected between a common node of the third switch and the second switch of the Lth phase leg, and a common node of the second switch and the first switch of the first phase leg.

A first inductor of the L inductors is connected between the common node of the second switch and the first switch of the first phase leg and the output terminal of the hybrid multi-phase step-down power converter. An Mth inductor of the L inductors is connected between a common node of the second switch and the first switch of the Mth phase leg and the output terminal of the hybrid multi-phase step-down power converter. An Lth inductor of the L inductors is connected between the common node of the second switch and the first switch of the Lth phase leg and the output terminal of the hybrid multi-phase step-down power converter.

Figure 37:
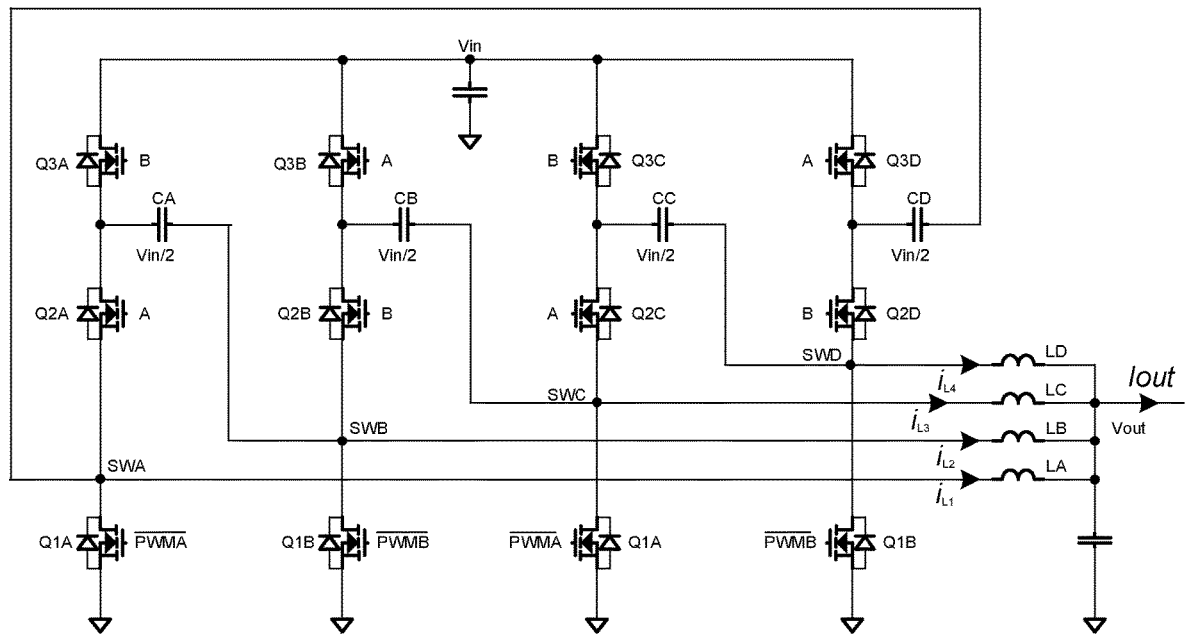
FIG. 37 illustrates a schematic diagram of a hybrid 4-phase 2:D power converter in accordance with various embodiments of the present disclosure.

FIG. 37 illustrates a schematic diagram of a hybrid 4-phase 2:D power converter in accordance with various embodiments of the present disclosure. Each phase comprises a phase leg and a flying capacitor. The average voltage across the flying capacitor is equal to one half of Vin as shown in FIG. 37.

A first phase leg comprises a third switch Q3A, a second switch Q2A and a first switch Q1A connected in series between the input power source Vin and ground. A common node of the second switch Q2A and the first switch Q1A is the lowest switch common node of the first phase leg.

A second phase leg comprises a third switch Q3B, a second switch Q2B and a first switch Q1B connected in series between the input power source Vin and ground. A common node of the second switch Q2B and the first switch Q1B is the lowest switch common node of the second phase leg.

A third phase leg comprises a third switch Q3C, a second switch Q2C and a first switch Q1C connected in series between the input power source Vin and ground. A common node of the second switch Q2C and the first switch Q1C is the lowest switch common node of the third phase leg.

A fourth phase leg comprises a third switch Q3D, a second switch Q2D and a first switch Q1D connected in series between the input power source Vin and ground. A common node of the second switch Q2D and the first switch Q1D is the lowest switch common node of the fourth phase leg.

The first flying capacitor CA of the first phase is connected between a common node of the third switch Q3A and the second switch Q2A of the first phase leg, and a common node of the second switch Q2B and the first switch Q1B of the second phase leg.

The first flying capacitor CB of the second phase is connected between a common node of the third switch Q3B and the second switch Q2B of the second phase leg, and a common node of the second switch Q2C and the first switch Q1C of the third phase leg.

The first flying capacitor CC of the third phase is connected between a common node of the third switch Q3C and the second switch Q2C of the third phase leg, and a common node of the second switch Q2D and the first switch Q1D of the fourth phase leg.

The first flying capacitor CD of the fourth phase is connected between a common node of the third switch Q3D and the second switch Q2D of the fourth phase leg, and a common node of the second switch Q2A and the first switch Q1A of the first phase leg.

A first inductor LA is connected between the common node of the second switch Q2A and the first switch Q1A of the first phase leg and the output terminal of the hybrid multi-phase step-down power converter. A second inductor LB is connected between the common node of the second switch Q2B and the first switch Q1B of the second phase leg and the output terminal of the hybrid multi-phase step-down power converter. A third inductor LC is connected between the common node of the second switch Q2C and the first switch Q1C of the third phase leg and the output terminal of the hybrid multi-phase step-down power converter. A fourth inductor LD is connected between the common node of the second switch Q2D and the first switch Q1D of the fourth phase leg and the output terminal of the hybrid multi-phase step-down power converter.

The power converter shown in FIG. 37 is configured to operate in four different time intervals. The operating principle of the four different time intervals will be described below with respect to FIGS. 38-41. In FIGS. 38-41, the arrows on the components indicate the corresponding switches have been turned off.

Figure 38:
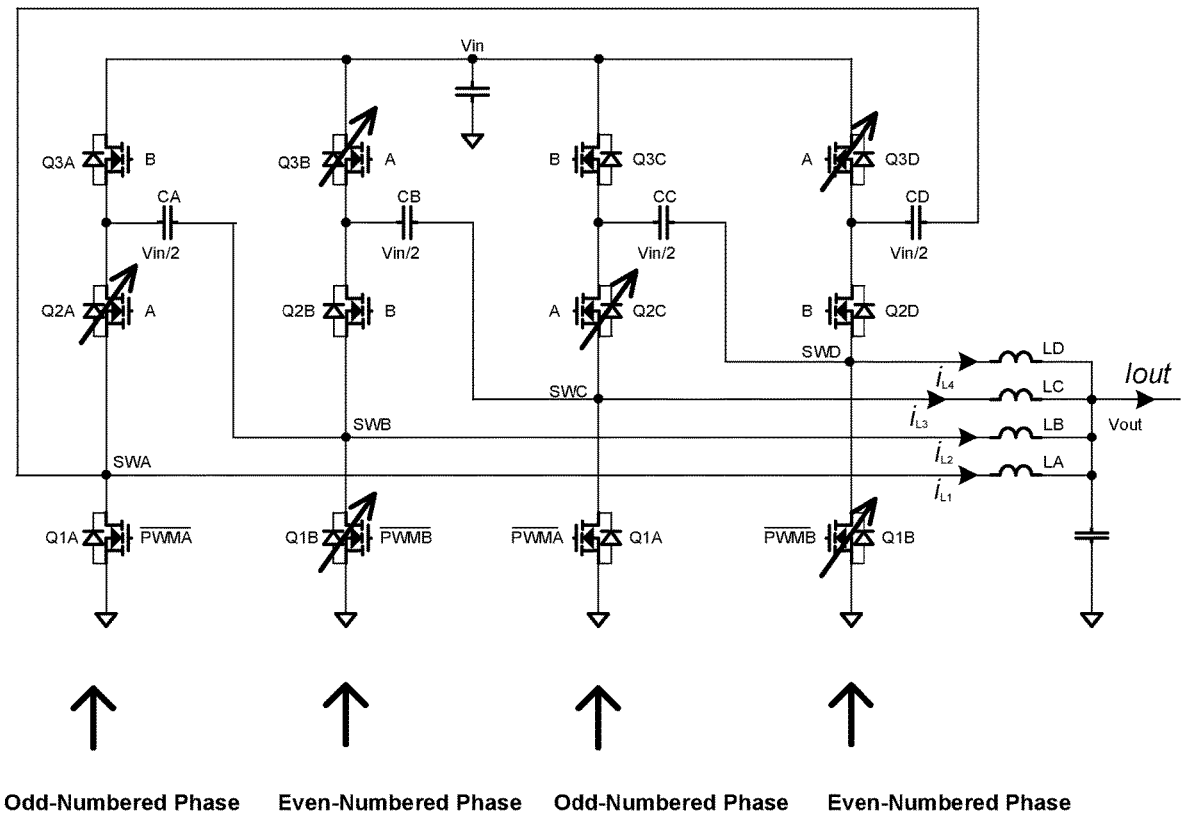
FIG. 38 illustrates the operating principle of the hybrid 4-phase step-down power converter configured to operate in a first time interval in accordance with various embodiments of the present disclosure.

FIG. 38 illustrates the operating principle of the hybrid 4-phase step-down power converter configured to operate in a first time interval in accordance with various embodiments of the present disclosure. In the first time interval of the four different time intervals, the first switches, the third switches of odd-numbered phase legs and the second switches of even-numbered phase legs are configured to be turned on. The second switches of the odd-numbered phase legs, and the first switches and the third switches of the even-numbered phase legs are configured to be turned off. In the first time interval, the inductors connected to the odd-numbered phase legs are discharged, and the inductors connected to the even-numbered phase legs are charged.

Figure 39:
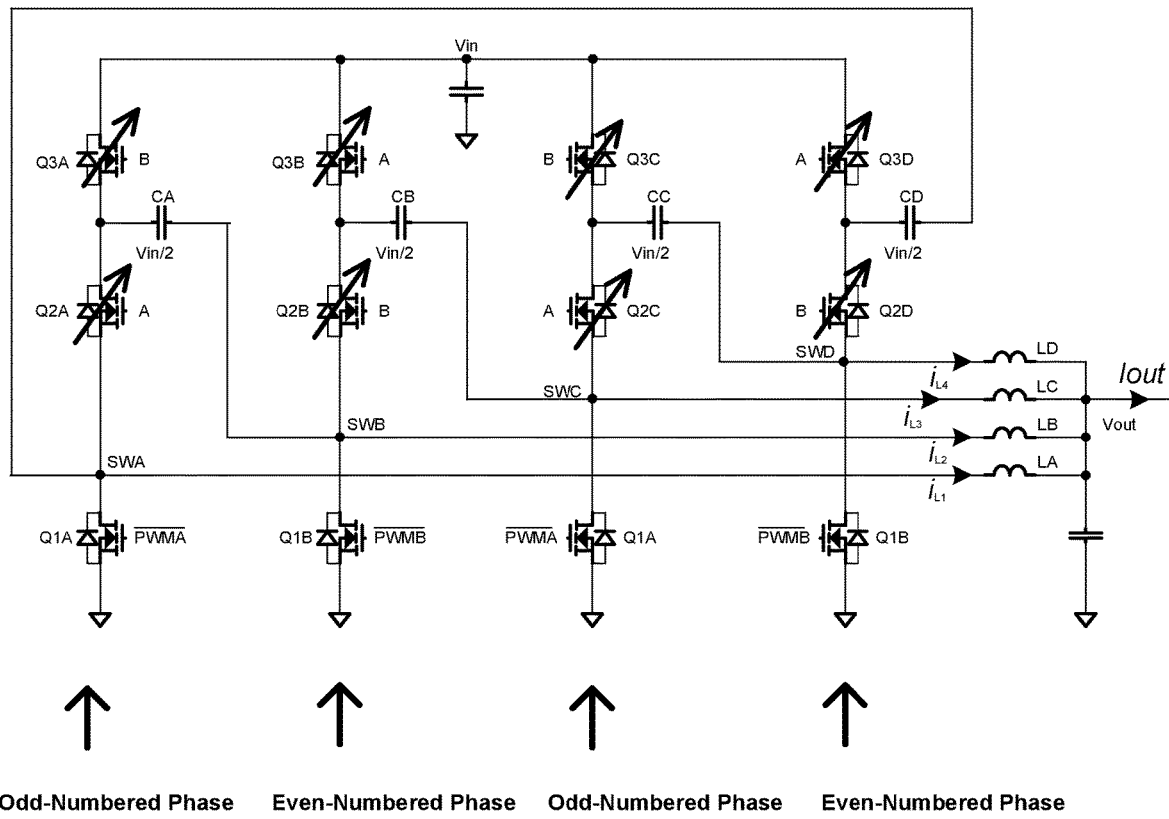
FIG. 39 illustrates the operating principle of the hybrid 4-phase step-down power converter configured to operate in a second time interval in accordance with various embodiments of the present disclosure.

FIG. 39 illustrates the operating principle of the hybrid 4-phase step-down power converter configured to operate in a second time interval in accordance with various embodiments of the present disclosure. In the second time interval of the four different time intervals, the first switches of the L phase legs are configured to be turned on. The third switches, the second switches of the L phase legs are configured to be turned off. In the first time interval, the L inductors are discharged.

Figure 40:
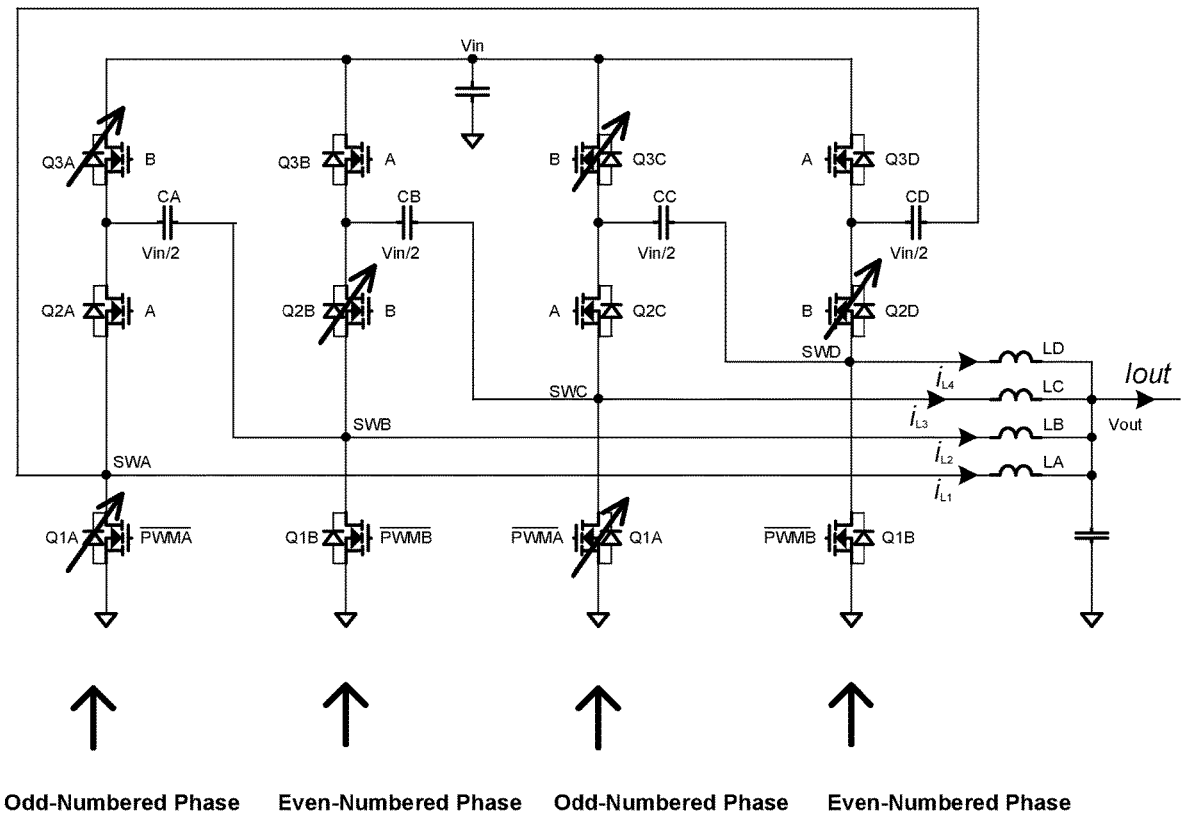
FIG. 40 illustrates the operating principle of the hybrid 4-phase step-down power converter configured to operate in a third time interval in accordance with various embodiments of the present disclosure.

FIG. 40 illustrates the operating principle of the hybrid 4-phase step-down power converter configured to operate in a third time interval in accordance with various embodiments of the present disclosure. In the third time interval of the four different time intervals, the first switches, the third switches of the odd-numbered phase legs and the second switches of the even-numbered phase legs are configured to be turned off. The second switches of the odd-numbered phase legs, and the first switches and the third switches of the even-numbered phase legs are configured to be turned on. In the third time interval, the inductors of the odd-numbered phase legs are charged, and the inductors of the even-numbered phase legs are discharged.

Figure 41:
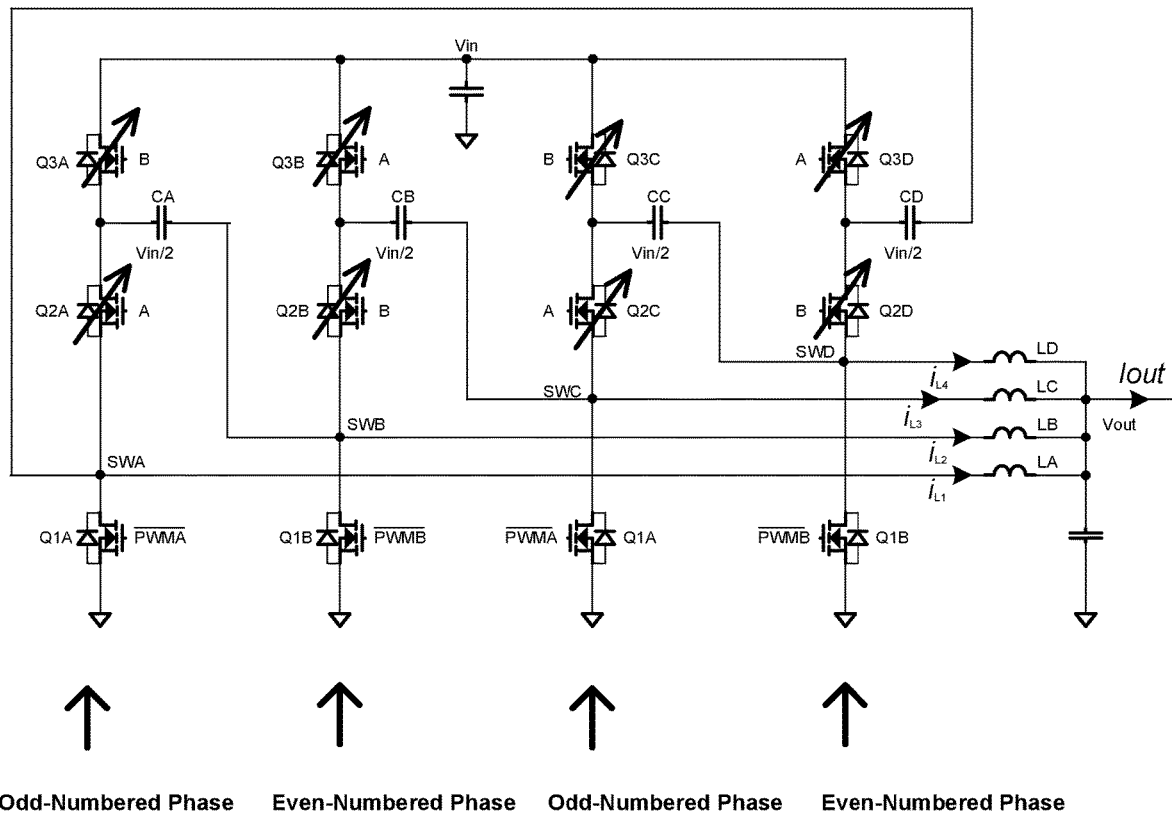
FIG. 41 illustrates the operating principle of the hybrid 4-phase step-down power converter configured to operate in a fourth time interval in accordance with various embodiments of the present disclosure.

FIG. 41 illustrates the operating principle of the hybrid 4-phase step-down power converter configured to operate in a fourth time interval in accordance with various embodiments of the present disclosure. In the fourth time interval of the four different time intervals, the first switches of the L phase legs are configured to be turned on. The third switches and the second switches of all phase legs are configured to be turned off. In the fourth time interval, the L inductors are discharged.

Figure 42:
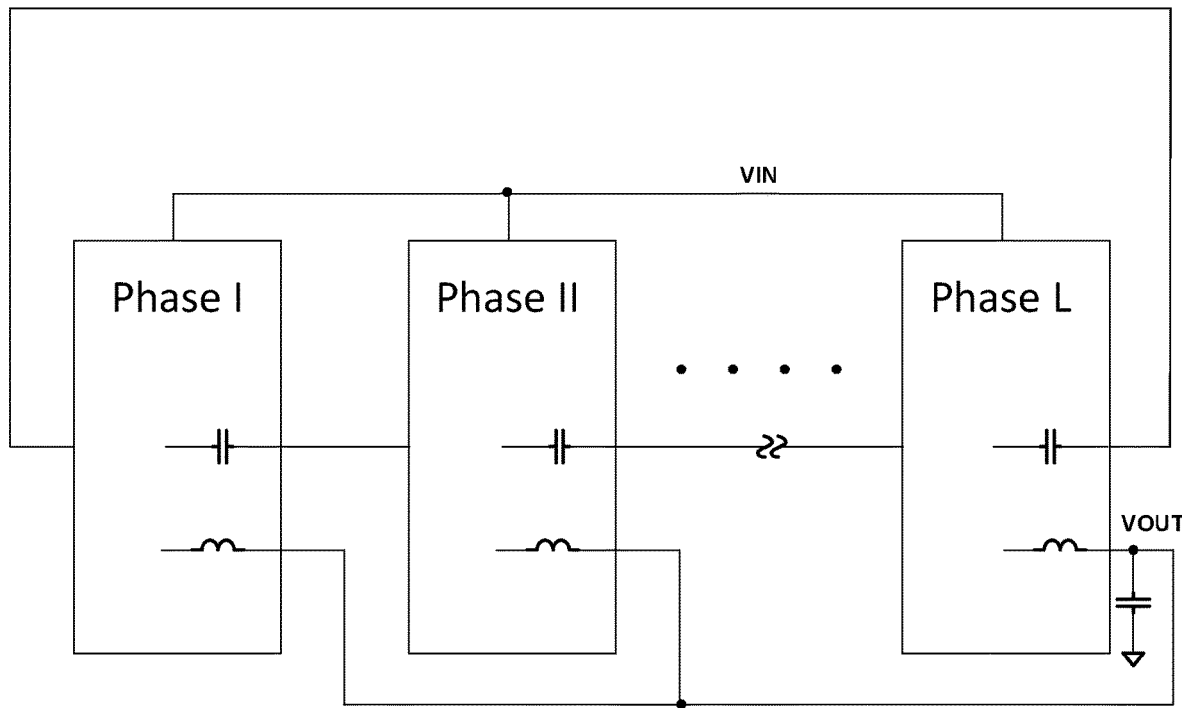
FIG. 42 illustrates a block diagram of a hybrid multi-phase 2:D power converter having an odd number of phases in accordance with various embodiments of the present disclosure.
Figure 43:
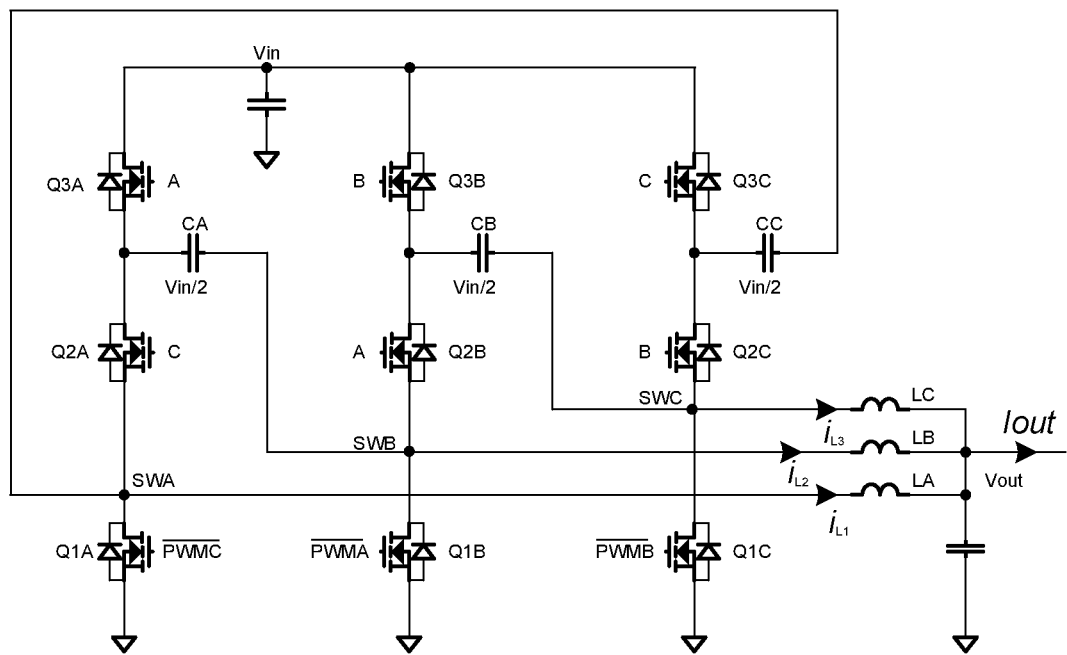
FIG. 43 illustrates a schematic diagram of a hybrid 3-phase 2:D power converter in accordance with various embodiments of the present disclosure.

In a more general case, the cross-coupled capacitors technique is not limited to hybrid converters with an even number of phase legs. For example, the three phase 2:D hybrid converter can leverage the cross-coupled capacitor technique to achieve inherent current balancing. As shown in FIGS. 42-43, the flying capacitor of each phase is connected to the switch node of the next phase leg. The flying capacitor of the last phase leg (e.g., the third phase leg) is connected to the switch node of the first phase leg.

During normal operation, according to the operating principle shown in FIGS. 44-47, inherent current balancing can be guaranteed as long as the conduction times of the first time interval, the third time interval and the fifth time interval are the same.

FIG. 42 illustrates a block diagram of a hybrid multi-phase 2:D power converter having an odd number of phases in accordance with various embodiments of the present disclosure. The hybrid multi-phase 2:D power converter comprises L phases. L is an odd integer. Each phase comprises a phase leg. In other words, the hybrid multi-phase step-down power converter comprises L phase legs. Each phase leg of the L phase legs comprises a plurality of switches connected in series between an input power source and ground. Each phase may comprise a plurality of flying capacitors.

A first flying capacitor of an Mth phase is cross-coupled between an Mth phase leg and an (M+1)th phase leg. More particularly, the first flying capacitor of the Mth phase is connected between the Mth phase leg and the lowest switch common node of the plurality of switches of the (M+1)th phase leg. A first flying capacitor of an Lth phase is cross-coupled between an Lth phase leg and a first phase leg. More particularly, the first flying capacitor of the Lth phase is connected between the Lth phase leg and the lowest switch common node of the plurality of switches of the first phase leg.

The hybrid multi-phase step-down power converter shown in FIG. 42 comprises L inductors. Each inductor of the L inductors is connected between a lowest switch common node of the plurality of switches of a corresponding phase leg and an output terminal of the hybrid multi-phase step-down power converter.

In some embodiments, the hybrid multi-phase step-down power converter is a 2:D converter. Under this configuration, each of the L phase legs comprises a third switch, a second switch and a first switch connected in series between the input power source VIN and ground. A common node of the second switch and the first switch is the lowest switch common node of the plurality of switches of a corresponding phase leg.

The first flying capacitor of the Mth phase is connected between a common node of the third switch and the second switch of the Mth phase leg, and the common node of the second switch and the first switch of the (M+1)th phase leg. The first flying capacitor of the Lth phase is connected between a common node of the third switch and the second switch of the Lth phase leg, and a common node of the second switch and the first switch of the first phase leg.

A first inductor of the L inductors is connected between the common node of the second switch and the first switch of the first phase leg and the output terminal of the hybrid multi-phase step-down power converter. An Mth inductor of the L inductors is connected between a common node of the second switch and the first switch of the Mth phase leg and the output terminal of the hybrid multi-phase step-down power converter. An Lth inductor of the L inductors is connected between the common node of the second switch and the first switch of the Lth phase leg and the output terminal of the hybrid multi-phase step-down power converter.

In operation, the second switch and the third switch of each phase leg are configured to operate with a same duty cycle D. The third switch of each phase leg conducts sequentially with a phase shift equal to (360/L) degrees.

In operation, the third switch of the Mth phase leg turns on and off together with the second switch of the (M+1)th phase leg. The third switch of the Lth phase leg turns on and off together with the second switch of the first phase leg. The first switch of each phase leg is turned on and off complementary to the second switch of the same phase leg.

In operation, the first switches, the second switches and the third switches of the L phase legs, the first flying capacitors of the L phase legs and the L inductors form a power converter having a ratio of an input voltage to an output voltage equal to 2/D. the hybrid multi-phase step-down power converter is configured to operate with a duty cycle D in a range from 0 to (1/L). As a result of having the duty cycle, the output voltage of the hybrid multi-phase step-down power converter is regulated in a range from 0 V to (1/(2L)) of the input voltage applied to the hybrid multi-phase step-down power converter.

FIG. 43 illustrates a schematic diagram of a hybrid 3-phase 2:D power converter in accordance with various embodiments of the present disclosure. Each phase comprises a phase leg and a flying capacitor. A first phase leg comprises a third switch Q3A, a second switch Q2A and a first switch Q1A connected in series between the input power source Vin and ground. A common node SWA of the second switch Q2A and the first switch Q1A is the lowest switch common node of the first phase leg.

A second phase leg comprises a third switch Q3B, a second switch Q2B and a first switch Q1B connected in series between the input power source Vin and ground. A common node SWB of the second switch Q2B and the first switch Q1B is the lowest switch common node of the second phase leg.

A third phase leg comprises a third switch Q3C, a second switch Q2C and a first switch Q1C connected in series between the input power source Vin and ground. A common node SWC of the second switch Q2C and the first switch Q1C is the lowest switch common node of the third phase leg.

The first flying capacitor CA of the first phase is connected between a common node of the third switch Q3A and the second switch Q2A of the first phase leg, and a common node of the second switch Q2B and the first switch Q1B of the second phase leg.

The first flying capacitor CB of the second phase is connected between a common node of the third switch Q3B and the second switch Q2B of the second phase leg, and a common node of the second switch Q2C and the first switch Q1C of the third phase leg.

The first flying capacitor CC of the third phase is connected between a common node of the third switch Q3C and the second switch Q2C of the third phase leg, and a common node of the second switch Q2D and the first switch Q1D of the fourth phase leg.

A first inductor LA is connected between the common node of the second switch Q2A and the first switch Q1A of the first phase leg and the output terminal of the hybrid multi-phase step-down power converter. A second inductor LB is connected between the common node of the second switch Q2B and the first switch Q1B of the second phase leg and the output terminal of the hybrid multi-phase step-down power converter. A third inductor LC is connected between the common node of the second switch Q2C and the first switch Q1C of the third phase leg and the output terminal of the hybrid multi-phase step-down power converter.

Figure 44:
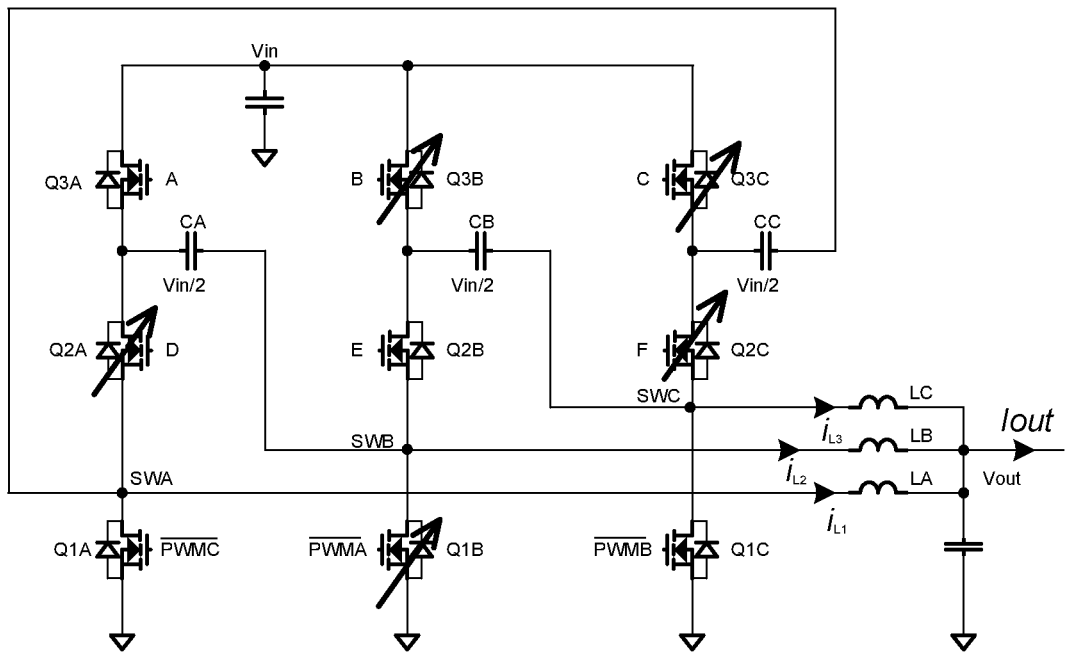
FIG. 44 illustrates the operating principle of the hybrid 3-phase 2:D power converter configured to operate in a first time interval in accordance with various embodiments of the present disclosure.
Figure 45:
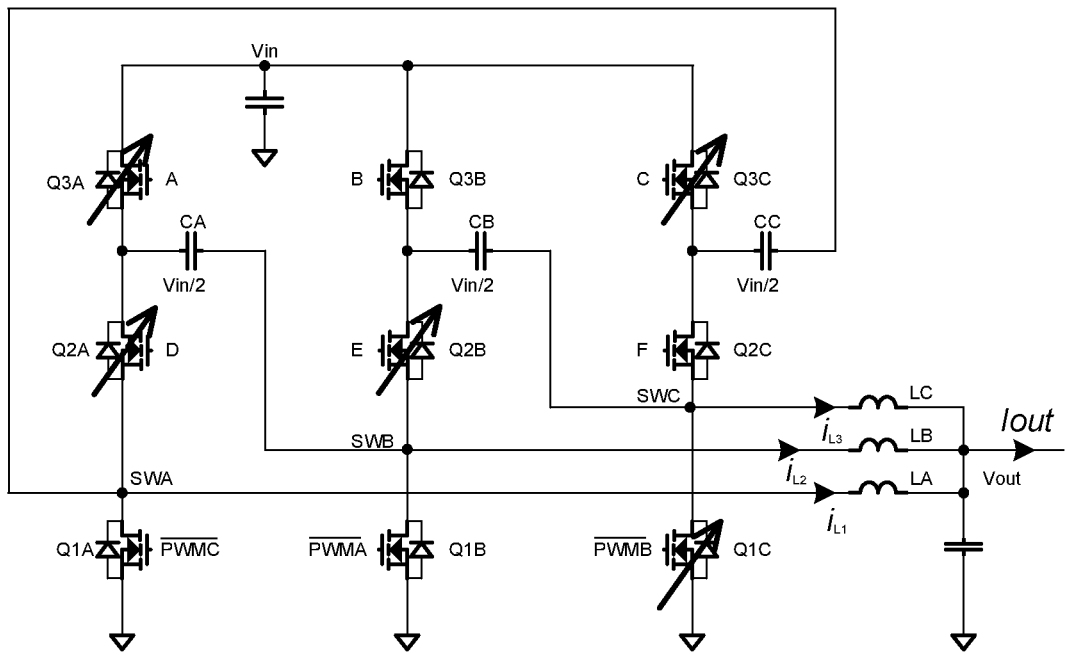
FIG. 45 illustrates the operating principle of the hybrid 3-phase 2:D power converter configured to operate in a third time interval in accordance with various embodiments of the present disclosure.
Figure 46:
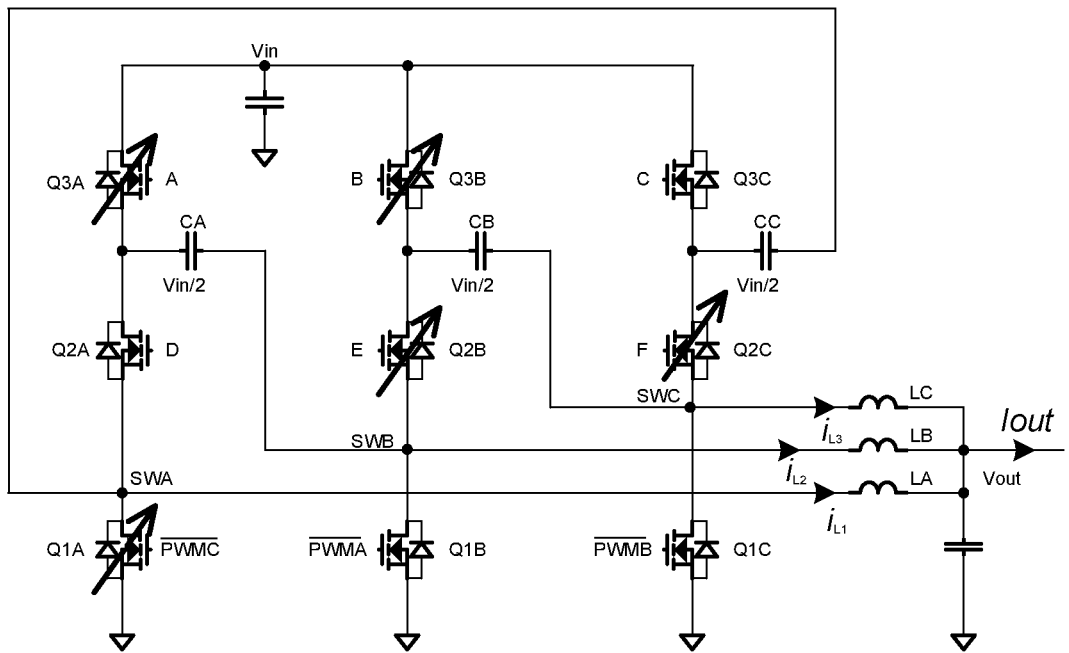
FIG. 46 illustrates the operating principle of the hybrid 3-phase 2:D power converter configured to operate in the fifth time interval in accordance with various embodiments of the present disclosure.

The power converter shown in FIG. 43 is configured to operate in six different time intervals. The operating principle of the three different time intervals will be described below with respect to FIGS. 44-46. In FIGS. 44-46, the arrows on the components indicate the corresponding switches have been turned off.

FIG. 44 illustrates the operating principle of the hybrid 3-phase 2:D power converter configured to operate in a first time interval in accordance with various embodiments of the present disclosure. In the first time interval of the six different time intervals, the third switch Q3A of the first phase leg turns on together with the second switch Q2B of the second phase leg. The third switch Q3B of the second phase leg turns off together with the second switch Q2C of the third phase leg. The third switch Q3C of the third phase leg turns off together with the second switch Q2A of the first phase leg. The first switch Q1A of the first phase leg is turned on. The second switch Q2A of the first phase leg is turned off. The first switch Q1B of the second phase leg is turned off. The second switch Q2B of the second phase leg is turned on. The first switch Q1C of the third phase leg is turned on. The second switch Q2C of the third phase leg is turned off. The operation of the first switch of each phase leg is complementary to that of the second switch of the same phase leg as shown in FIG. 44.

FIG. 45 illustrates the operating principle of the hybrid 3-phase 2:D power converter configured to operate in a third time interval in accordance with various embodiments of the present disclosure. In the third time interval of the six different time intervals, the third switch Q3A of the first phase leg turns off together with the second switch Q2B of the second phase leg. The third switch Q3B of the second phase leg turns on together with the second switch Q2C of the third phase leg. The third switch Q3C of the third phase leg turns off together with the second switch Q2A of the first phase leg. The first switch Q1A of the first phase leg is turned on. The second switch Q2A of the first phase leg is turned off. The first switch Q1B of the second phase leg is turned on. The second switch Q2B of the second phase leg is turned off. The first switch Q1C of the third phase leg is turned off. The second switch Q2C of the third phase leg is turned on. The operation of the first switch of each phase leg is complementary to that of the second switch of the same phase leg as shown in FIG. 45.

FIG. 46 illustrates the operating principle of the hybrid 3-phase 2:D power converter configured to operate in the fifth time interval in accordance with various embodiments of the present disclosure. In the fifth time interval of the six different time intervals, the third switch Q3A of the first phase leg turns off together with the second switch Q2B of the second phase leg. The third switch Q3B of the second phase leg turns off together with the second switch Q2C of the third phase leg. The third switch Q3C of the third phase leg turns on together with the second switch Q2A of the first phase leg. The first switch Q1A of the first phase leg is turned off. The second switch Q2A of the first phase leg is turned on. The first switch Q1B of the second phase leg is turned on. The second switch Q2B of the second phase leg is turned off. The first switch Q1C of the third phase leg is turned on. The second switch Q2C of the third phase leg is turned off. The operation of the first switch of each phase leg is complementary to that of the second switch of the same phase leg as shown in FIG. 46.

Figure 47:
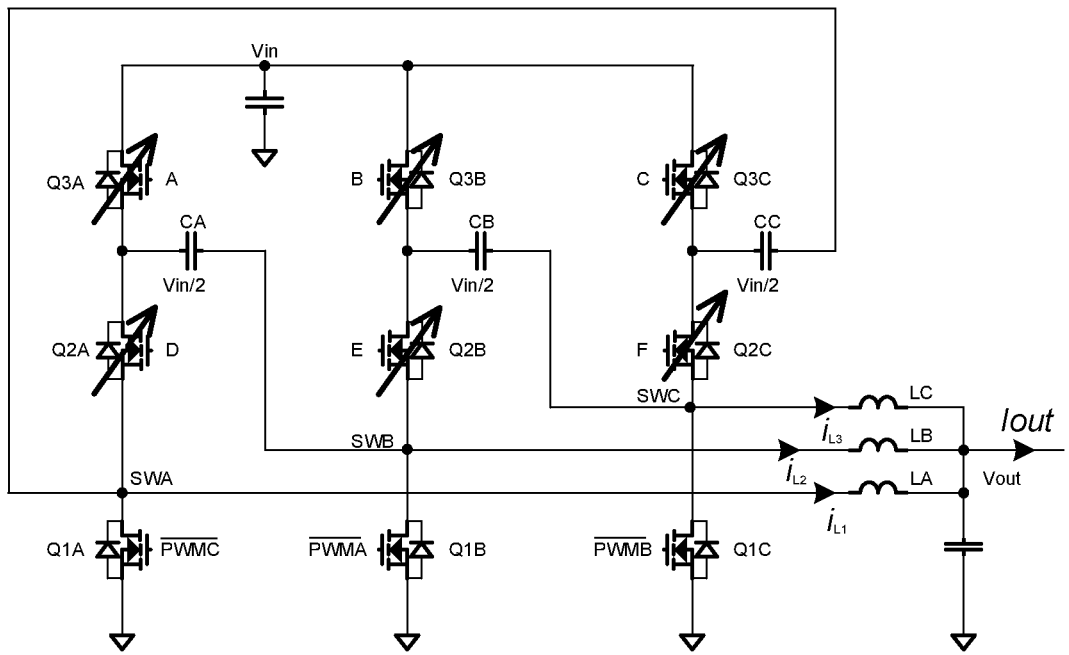
FIG. 47 illustrates the operating principle of the hybrid 3-phase 2:D power converter configured to operate in the second, fourth and sixth time intervals in accordance with various embodiments of the present disclosure.

FIG. 47 illustrates the operating principle of the hybrid 3-phase 2:D power converter configured to operate in the second, fourth and sixth time intervals in accordance with various embodiments of the present disclosure. In the second, fourth and sixth time intervals of the six different time intervals, the first switch of each phase leg is turned on. The rest of the switches are turned off as shown in FIG. 47.

Figure 48:
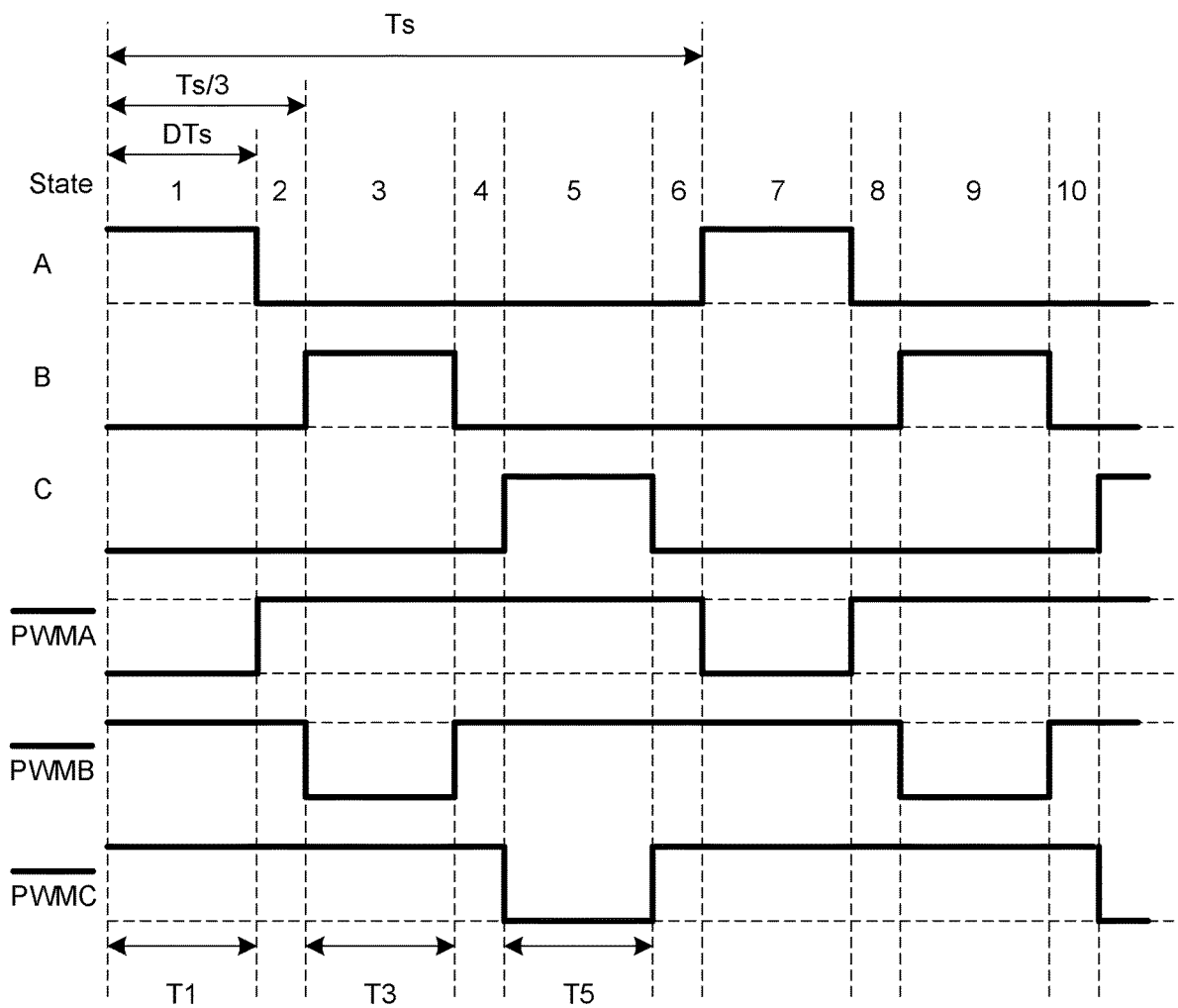
FIG. 48 illustrates various waveforms associated with the hybrid 3-phase 2:D power converter shown in FIG. 43 in accordance with various embodiments of the present disclosure.

FIG. 48 illustrates various waveforms associated with the hybrid 3-phase 2:D power converter shown in FIG. 43 in accordance with various embodiments of the present disclosure. The horizontal axis of FIG. 48 represents intervals of time. There may be six rows in FIG. 48. The first row represents the gate drive signal (A) of the third switch Q3A and the second switch Q2B. The second row represents the gate drive signal (B) of the third switch Q3B and the second switch Q2C. The third row represents the gate drive signal (C) of the third switch Q3C and the second switch Q2A. The fourth row represents the gate drive signal ($\overline{PWMC}$) of the first switch Q1A. The fifth row represents the gate drive signal ($\overline{PWMA}$) of the second switch Q1B. The sixth row represents the gate drive signal ($\overline{PWMB}$) of the first switch Q1C.

As shown in FIG. 48, the three different duty cycle time intervals are T1, T3 and T5. As shown in FIG. 48, the second switch (e.g., gate drive signal D for Q2A) and the third switch (e.g., gate drive signal A for Q3A) of each phase leg (e.g., first phase leg) are configured to operate with a same duty cycle D. The third switch (e.g., gate drive signal A for Q3A) of each phase leg (e.g., first phase leg) conducts sequentially with a phase shift equal to (360/L) degrees.

Figure 49:
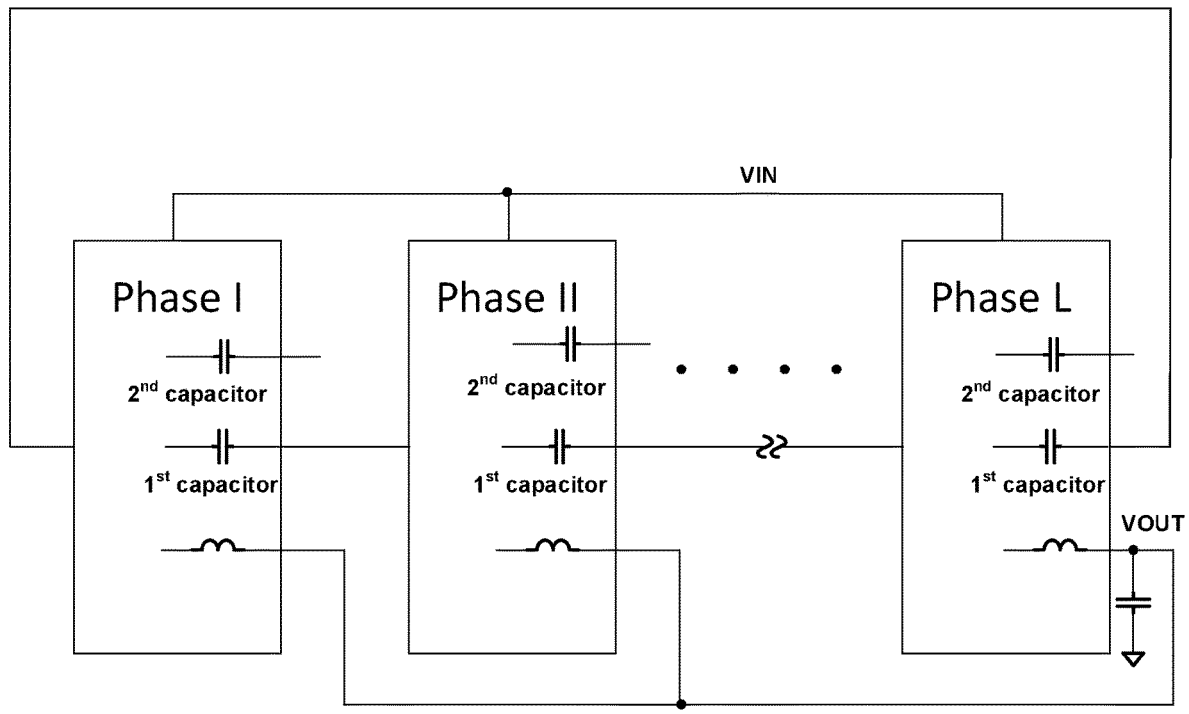
FIG. 49 illustrates a block diagram of a hybrid multi-phase 3:D power converter in accordance with various embodiments of the present disclosure.

FIG. 49 illustrates a block diagram of a hybrid multi-phase 3:D power converter in accordance with various embodiments of the present disclosure. The hybrid multi-phase 3:D power converter comprises L phases. Each phase comprises a phase leg. In other words, the hybrid multi-phase 3:D power converter comprises L phase legs. Each phase leg of the L phase legs comprises a plurality of switches connected in series between an input power source VIN and ground. Each phase may comprise a plurality of flying capacitors.

A first flying capacitor of the Mth phase leg is connected between a common node of the second switch and the third switch of the Mth phase leg, and the common node of the first switch and the second switch of the (M+1)th phase leg. A first flying capacitor of the Lth phase leg is connected between a common node of the third switch and the second switch of the Lth phase leg, and a common node of the first switch and the second switch of the first phase leg.

A second flying capacitor of the Mth phase leg is connected between a common node of the fourth switch and the third switch of the Mth phase leg, and a common node of the first switch and the second switch of a phase leg other than the (M+1)th phase leg. A second flying capacitor of the Lth phase leg is connected between a common node of the third switch and the fourth switch of the Lth phase leg, and a common node of the first switch and the second switch of a phase leg other than the first phase leg.

The hybrid multi-phase 3:D power converter further comprises L inductors. Each of the L inductors is connected between a common node of the first switch and the second switch of a phase leg of the L phase legs and an output terminal of the hybrid multi-phase 3:D power converter.

In operation, the first switches, the second switches, the third switches and the fourth switches of the L phase legs, the first flying capacitors and the second flying capacitors of the L phase legs and the L inductors form a power converter having a ratio of an input voltage to an output voltage equal to 3/D. D is the duty cycle of the power converter.

In operation, the second switch, the third switch and the fourth switch of each phase leg are configured to operate with a same duty cycle D. The fourth switch of each phase leg conducts sequentially with a phase shift equal to (360/L) degrees. The first switch of each phase leg is turned on and off complementary to the second switch of the same phase leg. The power converter is configured to operate with a duty cycle in a range from 0 to (1/L). As a result of having the duty cycle, an output voltage of the power converter is regulated in a range from 0 V to (1/(3L)) of an input voltage Vin applied to the power converter.

Figure 50:
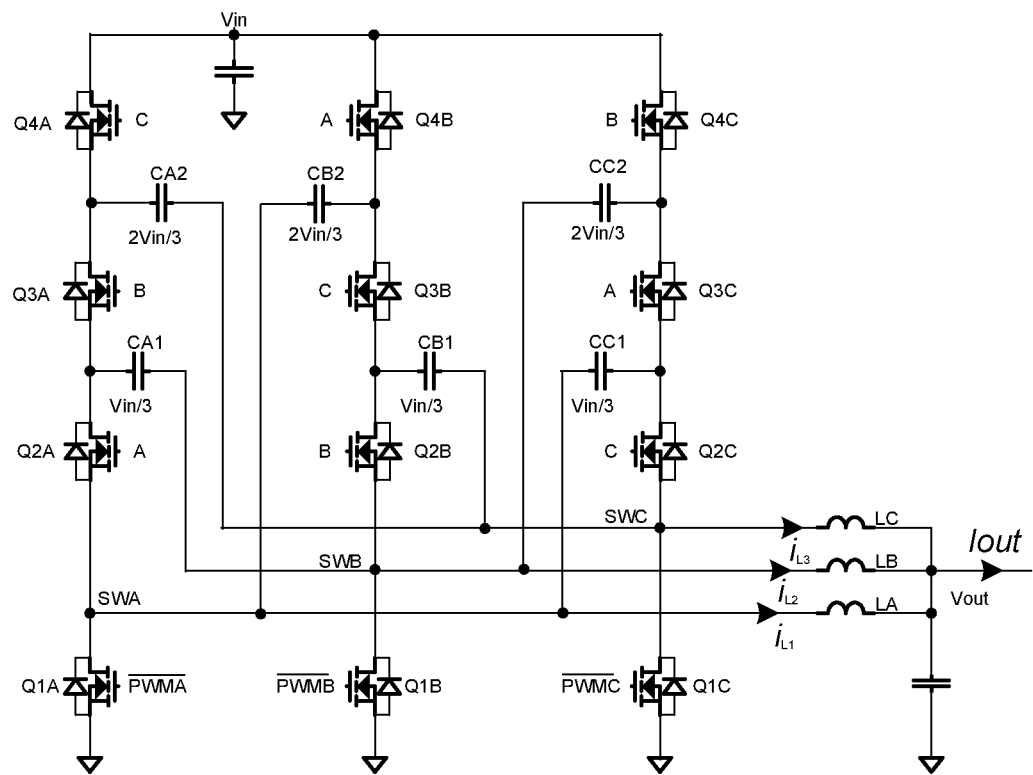
FIG. 50 illustrates a schematic diagram of a first implementation of the hybrid multi-phase 3:D power converter shown in FIG. 49 in accordance with various embodiments of the present disclosure.

FIG. 50 illustrates a schematic diagram of a first implementation of the hybrid multi-phase 3:D power converter shown in FIG. 49 in accordance with various embodiments of the present disclosure. Each phase comprises a phase leg and two flying capacitors. The average voltage across the first flying capacitor (e.g., CA1) is equal to one third of the input voltage Vin. The average voltage across the second flying capacitor (e.g., CA2) is equal to two thirds of the input voltage Vin. Each phase leg comprise four switches connected in series as shown in FIG. 50. The hybrid multi-phase 3:D power converter further comprises three inductors LA, LB and LC.

A first phase leg comprises a fourth switch Q4A, a third switch Q3A, a second switch Q2A and a first switch Q1A connected in series between the input power source Vin and ground. A common node SWA of the second switch Q2A and the first switch Q1A is the lowest switch common node of the first phase leg.

A second phase leg comprises a fourth switch Q4B, a third switch Q3B, a second switch Q2B and a first switch Q1B connected in series between the input power source Vin and ground. A common node SWB of the second switch Q2B and the first switch Q1B is the lowest switch common node of the second phase leg.

A third phase leg comprises a fourth switch Q4C, a third switch Q3C, a second switch Q2C and a first switch Q1C connected in series between the input power source Vin and ground. A common node SWC of the second switch Q2C and the first switch Q1C is the lowest switch common node of the third phase leg.

The first flying capacitor CA1 of the first phase is connected between a common node of the third switch Q3A and the second switch Q2A of the first phase leg, and a common node of the second switch Q2B and the first switch Q1B of the second phase leg. The second flying capacitor CA2 of the first phase is connected between a common node of the fourth switch Q4A and the third switch Q3A of the first phase leg, and a common node of the second switch Q2C and the first switch Q1C of the third phase leg.

The first flying capacitor CB1 of the second phase is connected between a common node of the third switch Q3B and the second switch Q2B of the second phase leg, and a common node of the second switch Q2C and the first switch Q1C of the third phase leg. The second flying capacitor CB2 of the second phase is connected between a common node of the fourth switch Q4B and the third switch Q3B of the second phase leg, and a common node of the second switch Q2A and the first switch Q1A of the first phase leg.

The first flying capacitor CC1 of the third phase is connected between a common node of the third switch Q3C and the second switch Q2C of the third phase leg, and a common node of the second switch Q2A and the first switch Q1A of the first phase leg. The second flying capacitor CC2 of the third phase is connected between a common node of the fourth switch Q4C and the third switch Q3C of the third phase leg, and a common node of the second switch Q2B and the first switch Q1B of the second phase leg.

A first inductor LA is connected between the common node of the second switch Q2A and the first switch Q1A of the first phase leg and the output terminal of the hybrid multi-phase step-down power converter. A second inductor LB is connected between the common node of the second switch Q2B and the first switch Q1B of the second phase leg and the output terminal of the hybrid multi-phase step-down power converter. A third inductor LC is connected between the common node of the second switch Q2C and the first switch Q1C of the third phase leg and the output terminal of the hybrid multi-phase step-down power converter.

In operation, the hybrid multi-phase step-down power converter shown in FIG. 50 is controlled by gate drive signals similar to those shown in FIG. 48, and hence is not discussed again herein. The hybrid multi-phase step-down power converter shown in FIG. 50 is able to achieve inherent current balancing because the cross-coupled capacitor technique described above is employed.

Figure 51:
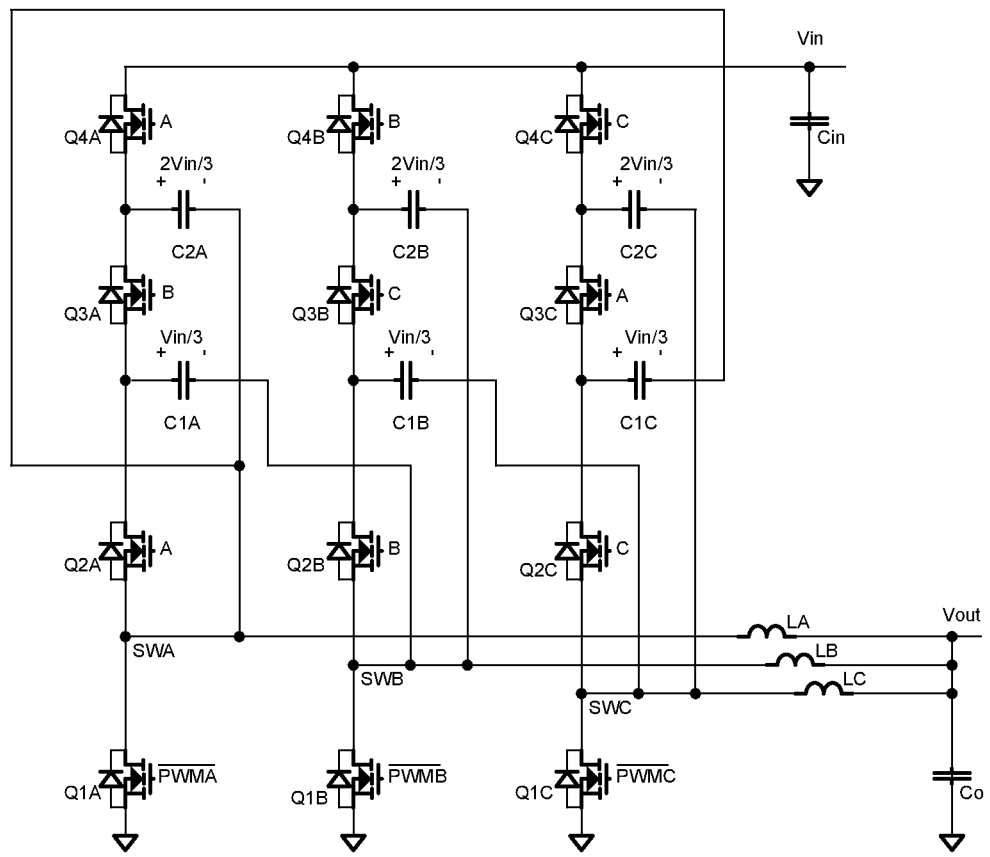
FIG. 51 illustrates a schematic diagram of a second implementation of the hybrid multi-phase 3:D power converter shown in FIG. 49 in accordance with various embodiments of the present disclosure.

FIG. 51 illustrates a schematic diagram of a second implementation of the hybrid multi-phase 3:D power converter shown in FIG. 49 in accordance with various embodiments of the present disclosure. Each phase comprises a phase leg and two flying capacitors. The average voltage across the first flying capacitor (e.g., CA1) is equal to one third of the input voltage Vin. The average voltage across the second flying capacitor (e.g., CA2) is equal to two thirds of the input voltage Vin. Each phase leg comprise four switches connected in series as shown in FIG. 51. The hybrid multi-phase 3:D power converter further comprises three inductors LA, LB and LC.

A first phase leg comprises a fourth switch Q4A, a third switch Q3A, a second switch Q2A and a first switch Q1A connected in series between the input power source Vin and ground. A common node SWA of the second switch Q2A and the first switch Q1A is the lowest switch common node of the first phase leg.

A second phase leg comprises a fourth switch Q4B, a third switch Q3B, a second switch Q2B and a first switch Q1B connected in series between the input power source Vin and ground. A common node SWB of the second switch Q2B and the first switch Q1B is the lowest switch common node of the second phase leg.

A third phase leg comprises a fourth switch Q4C, a third switch Q3C, a second switch Q2C and a first switch Q1C connected in series between the input power source Vin and ground. A common node SWC of the second switch Q2C and the first switch Q1C is the lowest switch common node of the third phase leg.

The first flying capacitor CA1 of the first phase is connected between a common node of the third switch Q3A and the second switch Q2A of the first phase leg, and a common node of the second switch Q2B and the first switch Q1B of the second phase leg. The second flying capacitor CA2 of the first phase is connected between a common node of the fourth switch Q4A and the third switch Q3A of the first phase leg, and a common node of the second switch Q2A and the first switch Q1A of the first phase leg.

The first flying capacitor CB1 of the second phase is connected between a common node of the third switch Q3B and the second switch Q2B of the second phase leg, and a common node of the second switch Q2C and the first switch Q1C of the third phase leg. The second flying capacitor CB2 of the second phase is connected between a common node of the fourth switch Q4B and the third switch Q3B of the second phase leg, and a common node of the second switch Q2B and the first switch Q1B of the second phase leg.

The first flying capacitor CC1 of the third phase is connected between a common node of the third switch Q3C and the second switch Q2C of the third phase leg, and a common node of the second switch Q2A and the first switch Q1A of the first phase leg. The second flying capacitor CC2 of the third phase is connected between a common node of the fourth switch Q4C and the third switch Q3C of the third phase leg, and a common node of the second switch Q2C and the first switch Q1C of the third phase leg.

A first inductor LA is connected between the common node of the second switch Q2A and the first switch Q1A of the first phase leg and the output terminal of the hybrid multi-phase step-down power converter. A second inductor LB is connected between the common node of the second switch Q2B and the first switch Q1B of the second phase leg and the output terminal of the hybrid multi-phase step-down power converter. A third inductor LC is connected between the common node of the second switch Q2C and the first switch Q1C of the third phase leg and the output terminal of the hybrid multi-phase step-down power converter.

In operation, the hybrid multi-phase step-down power converter shown in FIG. 51 is controlled by gate drive signals similar to those shown in FIG. 48, and hence is not discussed again herein. The hybrid multi-phase step-down power converter shown in FIG. 51 is able to achieve inherent current balancing because the cross-coupled capacitor technique described above is employed.

Figure 52:
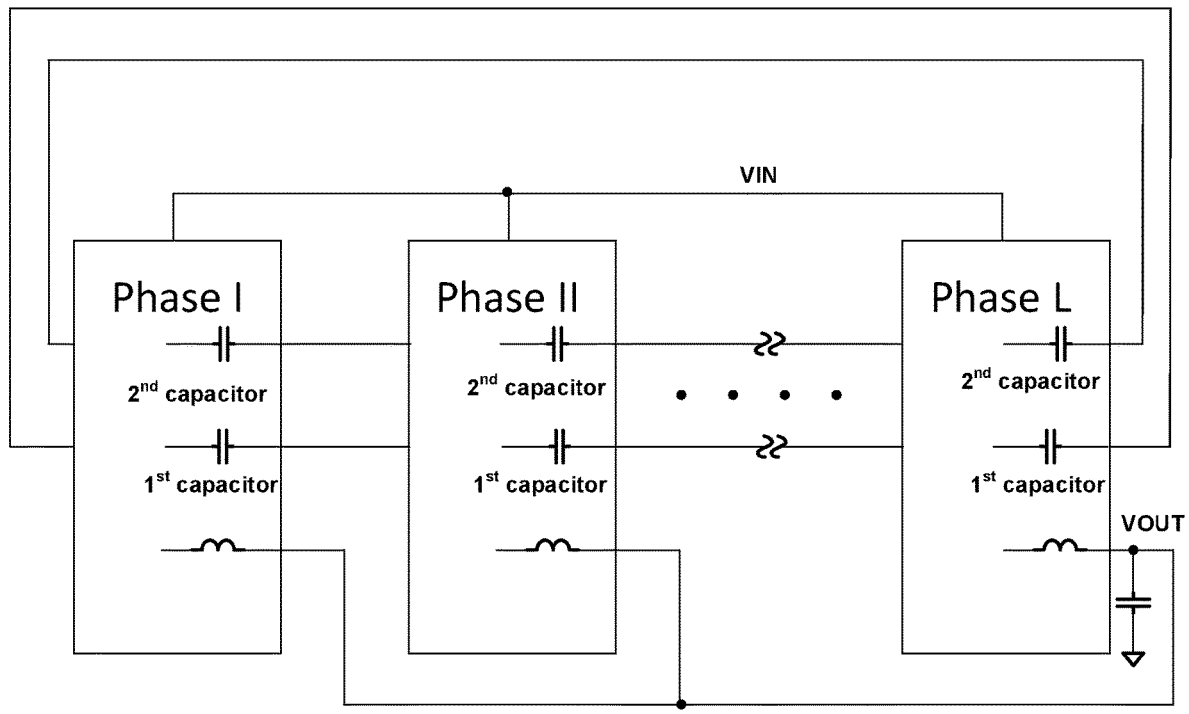
FIG. 52 illustrates a block diagram of another hybrid multi-phase 3:D power converter in accordance with various embodiments of the present disclosure.

FIG. 52 illustrates a block diagram of another hybrid multi-phase 3:D power converter in accordance with various embodiments of the present disclosure. The hybrid multi-phase 3:D power converter comprises L phases. Each phase comprises a phase leg. In other words, the hybrid multi-phase 3:D power converter comprises L phase legs. Each phase leg of the L phase legs comprises a plurality of switches connected in series between an input power source VIN and ground. Each phase may comprise a plurality of flying capacitors.

A first flying capacitor of the Mth phase leg is connected between a common node of the second switch and the third switch of the Mth phase leg, and the common node of the first switch and the second switch of the (M+1)th phase leg. A first flying capacitor of the Lth phase leg is connected between a common node of the third switch and the second switch of the Lth phase leg, and a common node of the first switch and the second switch of the first phase leg.

A second flying capacitor of the Mth phase leg is connected between a common node of the fourth switch and the third switch of the Mth phase leg, and a common node of the third switch and the second switch of the (M+1)th phase leg. A second flying capacitor of the Lth phase leg is connected between a common node of the third switch and the fourth switch of the Lth phase leg, and a common node of the third switch and the second switch of the first phase leg.

The hybrid multi-phase 3:D power converter further comprises L inductors. Each of the L inductors is connected between a common node of the first switch and the second switch of a phase leg of the L phase legs and an output terminal of the hybrid multi-phase step-down power converter.

In operation, the first switches, the second switches, the third switches and the fourth switches of the L phase legs, the first flying capacitors and the second flying capacitors of the L phase legs and the L inductors form a power converter having a ratio of an input voltage to an output voltage equal to 3/D.

Figure 53:
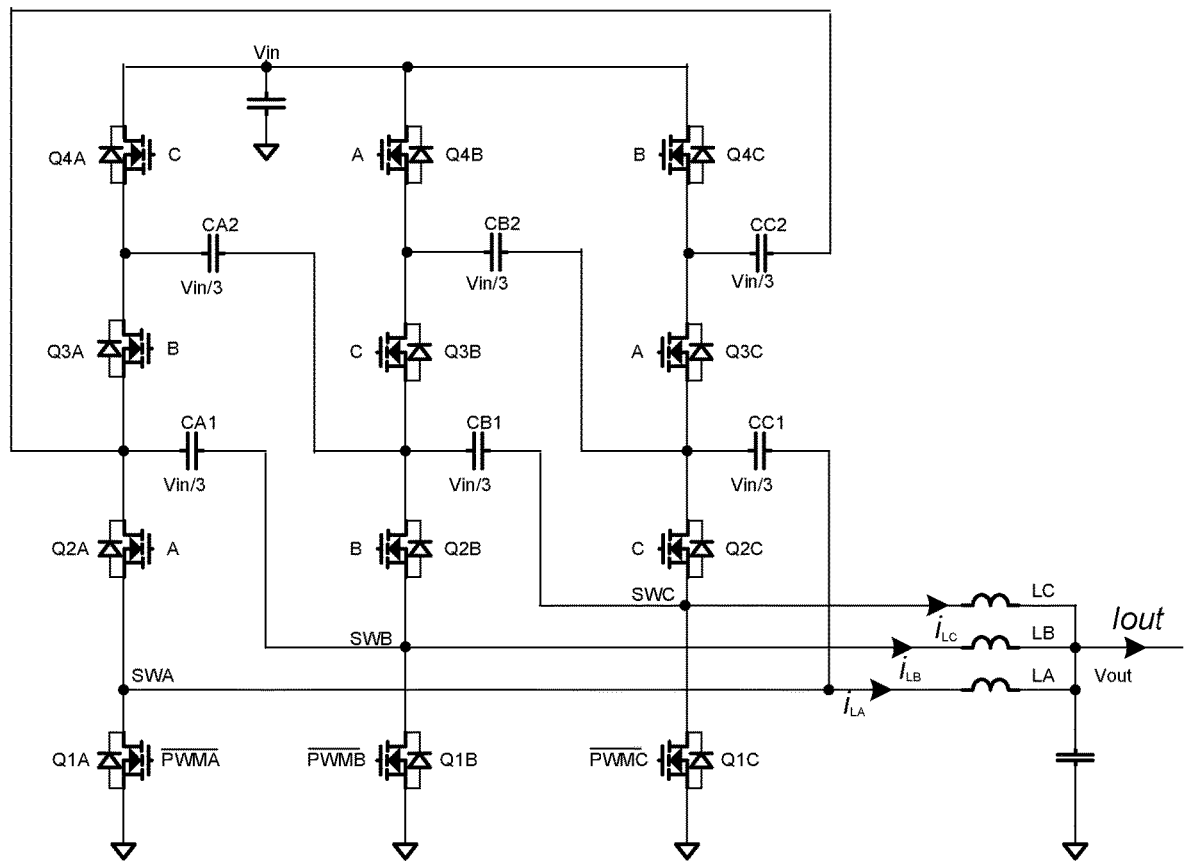
FIG. 53 illustrates a schematic diagram of the hybrid multi-phase 3:D power converter shown in FIG. 42 in accordance with various embodiments of the present disclosure.

In operation, the second switch, the third switch and the fourth switch of each phase leg are operating with a same duty cycle D. The fourth switch of each phase leg conducts sequentially with a phase shift equal to (360/L) degrees. The first switch of each phase leg is turned on and off complementary to the second switch of the same phase leg. The power converter is configured to operate with a duty cycle in a range from 0 to (1/L). As a result of having the duty cycle, an output voltage of the power converter is regulated in a range from 0 V to (1/(3L)) of an input voltage applied to the power converter FIG. 53 illustrates a schematic diagram of the hybrid multi-phase 3:D power converter shown in FIG. 52 in accordance with various embodiments of the present disclosure. Each phase comprises a phase leg and two flying capacitors. The average voltage across the first flying capacitor (e.g., CA1) is equal to one third of the input voltage Vin. The average voltage across the second flying capacitor (e.g., CA2) is equal to one third of the input voltage Vin. Each phase leg comprise four switches connected in series as shown in FIG. 53. The hybrid multi-phase 3:D power converter further comprises three inductors LA, LB and LC.

A first phase leg comprises a fourth switch Q4A, a third switch Q3A, a second switch Q2A and a first switch Q1A connected in series between the input power source Vin and ground. A common node SWA of the second switch Q2A and the first switch Q1A is the lowest switch common node of the first phase leg.

A second phase leg comprises a fourth switch Q4B, a third switch Q3B, a second switch Q2B and a first switch Q1B connected in series between the input power source Vin and ground. A common node SWB of the second switch Q2B and the first switch Q1B is the lowest switch common node of the second phase leg.

A third phase leg comprises a fourth switch Q4C, a third switch Q3C, a second switch Q2C and a first switch Q1C connected in series between the input power source Vin and ground. A common node SWC of the second switch Q2C and the first switch Q1C is the lowest switch common node of the third phase leg.

The first flying capacitor CA1 of the first phase is connected between a common node of the third switch Q3A and the second switch Q2A of the first phase leg, and a common node of the second switch Q2B and the first switch Q1B of the second phase leg. The second flying capacitor CA2 of the first phase is connected between a common node of the fourth switch Q4A and the third switch Q3A of the first phase leg, and a common node of the third switch Q3B and the second switch Q2B of the second phase leg.

The first flying capacitor CB1 of the second phase is connected between a common node of the third switch Q3B and the second switch Q2B of the second phase leg, and a common node of the second switch Q2C and the first switch Q1C of the third phase leg. The second flying capacitor CB2 of the second phase is connected between a common node of the fourth switch Q4B and the third switch Q3B of the second phase leg, and a common node of the third switch Q3C and the second switch Q2C of the third phase leg.

The first flying capacitor CC1 of the third phase is connected between a common node of the third switch Q3C and the second switch Q2C of the third phase leg, and a common node of the second switch Q2A and the first switch Q1A of the first phase leg. The second flying capacitor CC2 of the third phase is connected between a common node of the fourth switch Q4C and the third switch Q3C of the third phase leg, and a common node of the third switch Q3A and the second switch Q2A of the first phase leg.

A first inductor LA is connected between the common node of the second switch Q2A and the first switch Q1A of the first phase leg and the output terminal of the hybrid multi-phase step-down power converter. A second inductor LB is connected between the common node of the second switch Q2B and the first switch Q1B of the second phase leg and the output terminal of the hybrid multi-phase step-down power converter. A third inductor LC is connected between the common node of the second switch Q2C and the first switch Q1C of the third phase leg and the output terminal of the hybrid multi-phase step-down power converter.

In operation, the hybrid multi-phase step-down power converter shown in FIG. 53 is controlled by gate drive signals similar to those shown in FIG. 48, and hence is not discussed again herein. The hybrid multi-phase step-down power converter shown in FIG. 53 is able to achieve inherent current balancing because the cross-coupled capacitor technique described above is employed.

Figure 54:
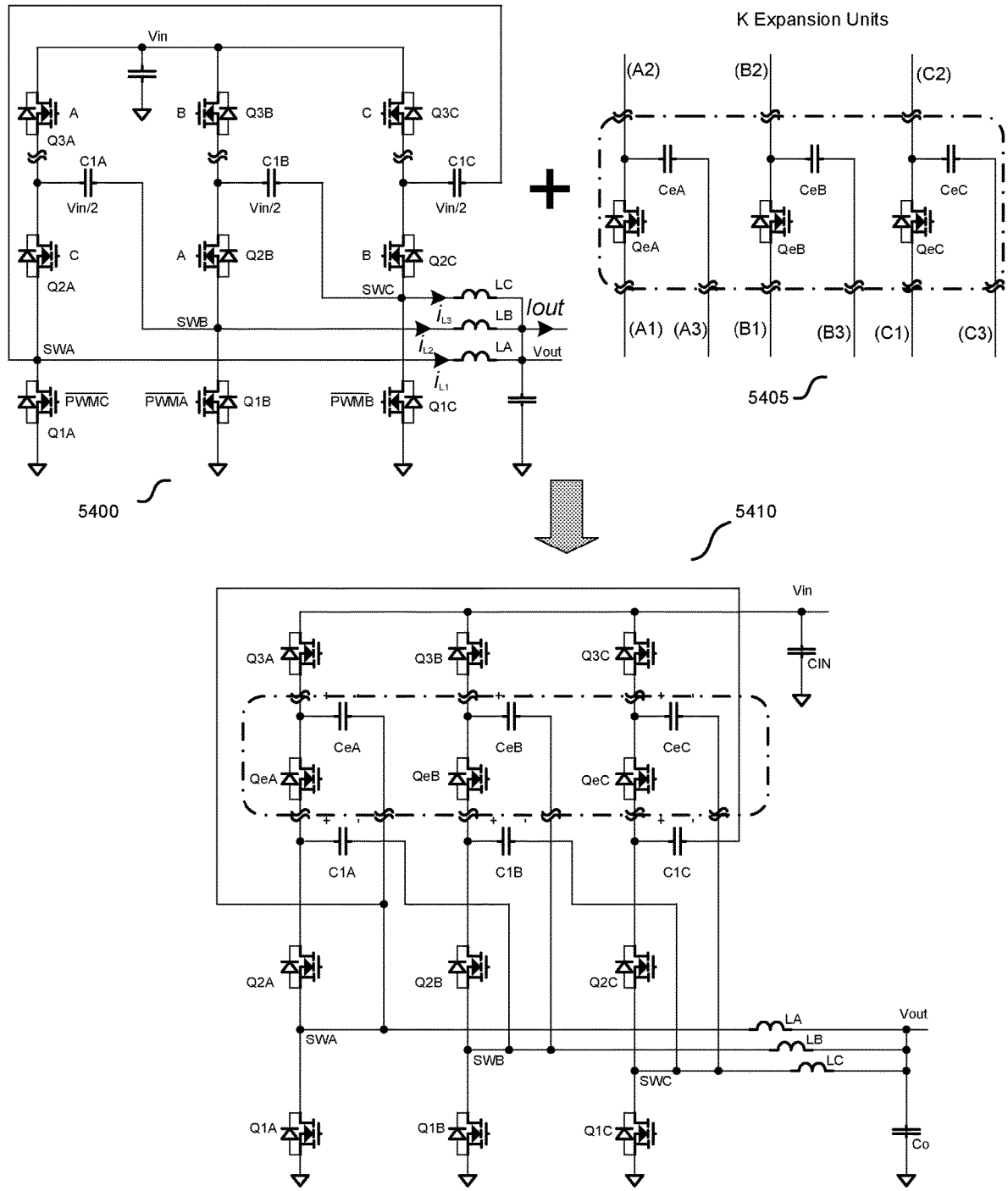
FIG. 54 illustrates a simplified schematic diagram of a hybrid 3-phase step-down power converter based on a combination of the hybrid 3-phase step-down power converter shown in FIG. 43 and K expansion units in accordance with various embodiments of the present disclosure.

FIG. 54 illustrates a simplified schematic diagram of a hybrid 3-phase step-down power converter based on a combination of the hybrid 3-phase step-down power converter shown in FIG. 43 and K expansion units in accordance with various embodiments of the present disclosure. The hybrid 3-phase step-down power converter shown in FIG. 54 is depicted as a power converter 5400 shown in FIG. 54. The K expansion units 5405 are also shown in FIG. 54. The hybrid 3-phase step-down power converter 5410 is based on the combination of the power converter 5400 and the K expansion units 5405.

As shown in FIG. 54, each of the K expansion units 5405 comprises three expansion cells. Each expansion cell comprises an expansion switch (e.g., QeA, QeB and QeC) connected between a first terminal (e.g., A1, B1 and C1) and a second terminal (e.g., A2, B2 and C2) of a corresponding expansion cell, and an expansion capacitor (e.g., CeA, CeB and CeC) connected between the second terminal and a third terminal (e.g., A3, B3 and C3) of the corresponding expansion cell.

The hybrid 3-phase step-down power converter 5410 comprises three inductors LA, LB and LC. Each inductor is connected between a common node of the first switch and the second switch of a phase leg of the three phase legs, and an output terminal of the hybrid multi-phase step-down power converter.

Each of the three phase legs comprises a third switch (e.g., Q3A, Q3B and Q3C), a second switch (e.g., Q2A, Q2B and Q2C) and a first switch (e.g., Q1A, Q1B and Q1C) coupled in series between the input power source Vin and ground. The first flying capacitor C1A of the first phase is connected between a common node of the second switch Q2A of the first phase leg and the K expansion units 5405, and a common node of the second switch Q2B and the first switch Q1B of the second phase leg.

The first flying capacitor C1B of the second phase is connected between a common node of the second switch Q2B of the second phase leg and the K expansion units 5405, and a common node of the second switch Q2C and the first switch Q1C of the third phase leg.

The first flying capacitor C1C of the third phase is connected between a common node of the second switch Q2C of the third phase leg and the K expansion units 5405, and a common node of the second switch Q2A and the first switch Q1A of the first phase leg.

The second terminal of the first expansion cell of a first expansion unit is coupled to the third switch Q3A of the first phase leg through (K−1) expansion units. The second terminal of the second expansion cell of a first expansion unit is coupled to the third switch Q3B of the second phase leg through (K−1) expansion units. The second terminal of the third expansion cell of a first expansion unit is coupled to the third switch Q3C of the third phase leg through (K−1) expansion units.

The third terminal of the first expansion cell of the first expansion unit is connected to a common node of the first switch Q1A and the second switch Q2A of the first phase leg, or a common node of the first switch Q1C and the second switch Q2C of the third phase leg. In other words, the third terminal of the first expansion cell of the first expansion unit is connected to a common node of the first switch and the second switch of a phase leg other than the second phase leg.

The third terminal of the second expansion cell of the first expansion unit is connected to a common node of the first switch Q1A and the second switch Q2A of the first phase leg, or a common node of the first switch Q1B and the second switch Q2B of the second phase leg. In other words, the third terminal of the second expansion cell of the first expansion unit is connected to a common node of the first switch and the second switch of a phase leg other than the third phase leg.

The third terminal of the third expansion cell of the first expansion unit is connected to a common node of the first switch Q1B and the second switch Q2B of the second phase leg, or a common node of the first switch Q1C and the second switch Q2C of the third phase leg. In other words, the third terminal of the third expansion cell of the first expansion unit is connected to a common node of the first switch and the second switch of a phase leg other than the first phase leg.

The first terminal of a first expansion cell of an Ith expansion unit is connected to the second terminal of a first expansion cell of an (I−1)th expansion unit. The first terminal of a second expansion cell of the Ith expansion unit is connected to the second terminal of a second expansion cell of the (I−1)th expansion unit. The first terminal of a third expansion cell of the Ith expansion unit is connected to the second terminal of a third expansion cell of the (I−1)th expansion unit. I is a positive integer. I is greater than 1, and K is greater than or equal to I.

The second terminal of a first expansion cell of a Kth expansion unit is connected to the third switch Q3A of the first phase leg. The second terminal of a second expansion cell of the Kth expansion unit is connected to the third switch Q3B of the second phase leg. The second terminal of a third expansion cell of the Kth expansion unit is connected to the third switch Q3C of the third phase leg.

The third terminal of the first expansion cell of the Ith expansion unit is connected to a common node of the first switch and the second switch of a phase leg other than the phase leg to which the third terminal of the first expansion cell of the (I−1)th expansion unit is connected.

The third terminal of the second expansion cell of the Ith expansion unit is connected to a common node of the first switch and the second switch of a phase leg other than the phase leg to which the third terminal of the second expansion cell of the (I−1)th expansion unit is connected.

The third terminal of the third expansion cell of the Ith expansion unit is connected to a common node of the first switch and the second switch of a phase leg other than the phase leg to which the third terminal of the third expansion cell of the (I−1)th expansion unit is connected.

In operation, after the K expansion units 5405 have been added into the hybrid multi-phase step-down power converter 5400, the ratio of the input voltage of the hybrid multi-phase step-down power converter to the output voltage of the hybrid multi-phase step-down power converter is equal to $(K+2)/D$. K is an integer, and D is the duty cycle of the hybrid multi-phase step-down power converter.

In operation, the second switch, the third switch of each phase leg, and switches of all expansion units are operating with a same duty cycle D. The third switch of each phase leg conducts sequentially with a phase shift equal to 120 degrees. The first switch of each phase leg is turned on and off complementary to the second switch of the same phase leg. The hybrid multi-phase step-down power converter is configured to operate with a duty cycle in a range from 0 to ⅓. As a result of having the duty cycle, the output voltage of the hybrid multi-phase step-down power converter is regulated in a range from 0 V to $1/((K+2)\times 3)$ of an input voltage applied to the hybrid multi-phase step-down power converter.

It should be recognized that while FIG. 54 illustrates the hybrid multi-phase step-down power converter with three phases, the hybrid multi-phase step-down power converter could accommodate any number of phases. For example, the hybrid multi-phase step-down power converter may include L phases. Under this configuration, each one of the expansion unit comprises L expansion cells. The hybrid multi-phase step-down power converter comprises L inductors. Each of the L inductors is connected between a common node of the first switch and the second switch of a phase leg of the L phase legs, and an output terminal of the hybrid multi-phase step-down power converter. Each of the L phase legs comprises a third switch, a second switch and a first switch coupled in series between the input power source and ground. The first flying capacitor of the Mth phase is connected between a common node of the second switch of the Mth phase leg and the K expansion units, and a common node of the second switch and the first switch of the (M+1)th phase leg. The first flying capacitor of the Lth phase is connected to a common node of the second switch of the Lth phase leg and the K expansion units, and a common node of the second switch and the first switch of the first phase leg. The second switch, the third switch of each phase leg, and switches of all expansion units are configured to operate with a same duty cycle D. The third switch of each phase leg conducts sequentially with a phase shift equal to (360/L) degrees. The first switch of each phase leg is turned on and off complementary to the second switch of the same phase leg. The hybrid multi-phase step-down power converter is configured to operate with a duty cycle in a range from 0 to 1/L. As a result of having the duty cycle, the output voltage of the hybrid multi-phase step-down power converter is regulated in a range from 0 V to $1/((K+2) \times L)$ of an input voltage applied to the hybrid multi-phase step-down power converter.

When L is an even number, the hybrid multi-phase step-down power converter can be configured to operate in four different time intervals. Under this configuration, the third terminal of the Hth expansion cell of an odd-numbered expansion unit is connected to a common node of the first switch and the second switch of the Hth phase leg. The third terminal of the Hth expansion cell of an even-numbered expansion unit is connected to a common node of the first switch and the second switch of a phase leg other than the Hth phase leg.

In operation, in a first time interval of the four different time intervals, first switches of the odd-numbered phase legs, odd-numbered switches of the odd-numbered expansion units, even-numbered switches of the even-numbered expansion units and second switches of the even-numbered phase legs are configured to be turned on. Second switches of the odd-numbered phase legs, even-numbered switches of the odd-numbered expansion units, odd-numbered switches of the even-numbered expansion units and first switches of the even-numbered phase legs are configured to be turned off. In the first time interval, inductors connected to the odd-numbered phase legs are discharged, and inductors connected to the even-numbered phase legs are charged.

In operation, in a second time interval of the four different time intervals, first switches of the L phase legs are configured to be turned on. Third switches, second switches of the L phase legs and switches of the K expansion units are configured to be turned off. In the second time interval, the L inductors are discharged.

In operation, in a third time interval of the four different time intervals, the first switches of the odd-numbered phase legs, the odd-numbered switches of the odd-numbered expansion units, the even-numbered switches of the even-numbered expansion units and the second switches of the even-numbered phase legs are configured to be turned off. The second switches of the odd-numbered phase legs, the even-numbered switches of the odd-numbered expansion units, the odd-numbered switches of the even-numbered expansion units and the first switches of the even-numbered phase legs are configured to be turned on. In the third time interval, the inductors connected to the odd-numbered phase legs are charged, and the inductors connected to the even-numbered phase legs are discharged.

In operation, in a fourth time interval of the four different time intervals, the first switches of the L phase legs are configured to be turned on. The third switches, the second switches of the L phase legs and the switches of the K expansion units are configured to be turned off. In the fourth time interval, the L inductors are discharged.

In operation, the power converter is configured to operate with a duty cycle in a range from 0% to 50%. As a result of having the duty cycle, an output voltage of the power converter is regulated in a range from 0 V to $1/(2 \times (2+K))$ of an input voltage applied to the power converter.

Figure 55:
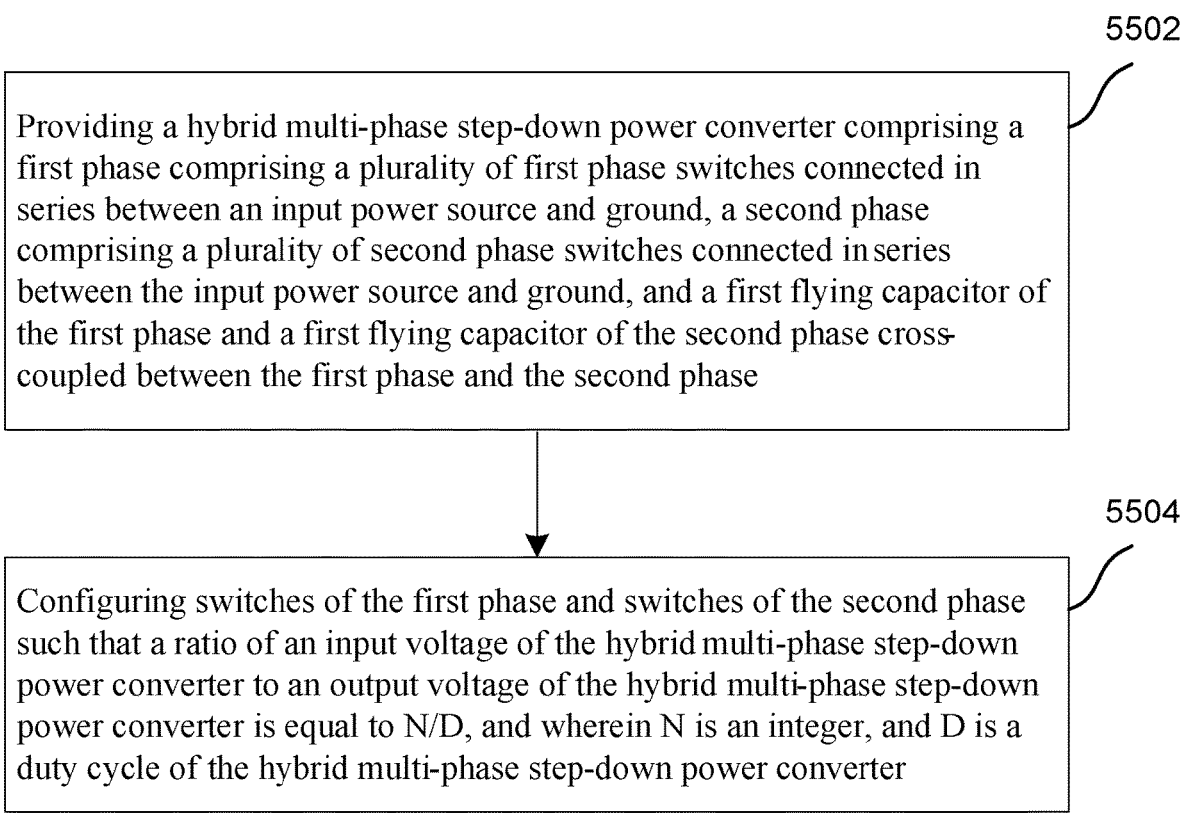
FIG. 55 illustrates a flow chart of a control method for the hybrid multi-phase step-down power converter shown in FIG. 37 in accordance with various embodiments of the present disclosure.

FIG. 55 illustrates a flow chart of a control method for the hybrid multi-phase step-down power converter shown in FIG. 37 in accordance with various embodiments of the present disclosure. This flowchart shown in FIG. 55 is merely an example, which should not unduly limit the scope of the claims. One of ordinary skill in the art would recognize many variations, alternatives, and modifications. For example, various steps illustrated in FIG. 55 may be added, removed, replaced, rearranged and repeated.

At step S502, a hybrid multi-phase step-down power converter comprising a first phase comprising a plurality of first phase switches connected in series between an input power source and ground, a second phase comprising a plurality of second phase switches connected in series between the input power source and ground, and a first flying capacitor of the first phase and a first flying capacitor of the second phase cross-coupled between the first phase and the second phase is provided.

At step S504, switches of the first phase and switches of the second phase are configured such that a ratio of an input voltage of the hybrid multi-phase step-down power converter to an output voltage of the hybrid multi-phase step-down power converter is equal to N/D, and wherein N is an integer, and D is a duty cycle of the hybrid multi-phase step-down power converter.

In some embodiments, N is equal to 2. The hybrid multi-phase step-down power converter comprises a first switch, a second switch and a third switch connected in series between ground and the input power source, a fourth switch, a fifth switch and a sixth switch connected in series between ground and the input power source, a first flying capacitor connected to a common node of the first switch and the second switch, and a common node of the fifth switch and the sixth switch, a second flying capacitor connected to a common node of the fourth switch and the fifth switch, and a common node of the second switch and the third switch, a first inductor connected between the common node of the first switch and the second switch and an output terminal of the hybrid multi-phase step-down power converter, and a second inductor connected between the common node of the fourth switch and the fifth switch and the output terminal of the hybrid multi-phase step-down power converter.

The method further comprises configuring the hybrid multi-phase step-down power converter to operate in four different time intervals with the duty cycle in a range from 0% to 50%, in a first time interval, configuring the first switch, the third switch and the fifth switch to be turned on, and configuring the second switch, the fourth switch and the sixth switch to be turned off, in a second time interval, configuring the first switch and the fourth switch to be turned on, and configuring the third switch, the second switch, the sixth switch and the fifth switch to be turned off, in a third time interval, configuring the first switch, the third switch and the fifth switch to be turned off, and configuring the second switch, the fourth switch and the sixth switch to be turned on, and in a fourth time interval, configuring the first switch and the fourth switch to be turned on, and configuring the third switch, the second switch, the sixth switch and the fifth switch to be turned off.

In some embodiments, N is equal to 3. The hybrid multi-phase step-down power converter comprises the first phase comprising a first switch, a second switch, a third switch and a fourth switch connected in series between ground and the input power source, the second phase comprising a fifth switch, a sixth switch, a seventh switch and an eighth switch connected in series between ground and the input power source, a first flying capacitor of the first phase connected to a common node of the second switch and the third switch, and a common node of the fifth switch and the sixth switch, a second flying capacitor of the first phase connected to a common node of the first switch and the second switch, and a common node of the third switch and the fourth switch, a first flying capacitor of the second phase connected to a common node of the sixth switch and the seventh switch, and the common node of the first switch and the second switch, a second flying capacitor of the second phase connected to the common node of the fifth switch and the sixth switch, and a common node of the seventh switch and the eighth switch, a first inductor connected between the common node of the first switch and the second switch and an output terminal of the hybrid multi-phase step-down power converter, and a second inductor connected between the common node of the fifth switch and the sixth switch and the output terminal of the hybrid multi-phase step-down power converter.

The method further comprises configuring the hybrid multi-phase step-down power converter to operate in four different time intervals with the duty cycle in a range from 0% to 50%, in a first time interval, configuring the first switch, the third switch, the sixth switch and the eighth switch to be turned on, and configuring the second switch, the fourth switch, the fifth switch and the seventh switch to be turned off, in a second time interval, configuring the fifth switch and the first switch to be turned on, and configuring the seventh switch, the second switch, the third switch, the fourth switch, the sixth switch and the eighth switch to be turned off, in a third time interval, configuring the first switch, the third switch, the sixth switch and the eighth switch to be turned off, and configuring the second switch, the fourth switch, the fifth switch and the seventh switch to be turned on, and in a fourth time interval, configuring the first switch and the fifth switch to be turned on, and configuring the third switch, the second switch, the seventh switch, the fourth switch, the sixth switch and the eighth switch to be turned off.

The method further comprises configuring a current path having two flying capacitors connected in series to be discharged to a voltage level equal to a voltage of two current paths having one flying capacitor before configuring the two current paths to start discharging in parallel with the current path having two flying capacitors connected in series, to prevent charge transferring between flying capacitors from occurring.

The method further comprises applying an input voltage to an output terminal of the hybrid multi-phase step-down power converter, coupling a load to an input terminal of the hybrid multi-phase step-down power converter, and configuring the switches of the first phase and the switches of the second phase such that the hybrid multi-phase step-down power converter is configured to operate a step-up operation mode, and a ratio of a voltage across the load to the input voltage is equal to N/D.

In accordance with an embodiment, a hybrid multi-phase step-down power converter comprises L phase legs, each phase leg of the L phase legs comprising a plurality of switches connected in series between an input power source and ground, wherein a first flying capacitor of an Mth phase is cross-coupled between an Mth phase leg and an (M+1)th phase leg, and a first flying capacitor of an Lth phase is cross-coupled between an Lth phase leg and a first phase leg, and wherein switches of the L phase legs are configured such that a ratio of an input voltage of the hybrid multi-phase step-down power converter to an output voltage of the hybrid multi-phase step-down power converter is equal to N/D, and wherein L, M, N are positive integers with M<L, L>2, and D is a duty cycle of the hybrid multi-phase step-down power converter.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A hybrid multi-phase step-down power converter comprising:
   L phase legs, each phase leg of the L phase legs comprising a plurality of switches connected in series between an input power source and ground, wherein:
   a first flying capacitor of an Mth phase is cross-coupled between an Mth phase leg and an (M+1)th phase leg; and
   a first flying capacitor of an Lth phase is cross-coupled between an Lth phase leg and a first phase leg, and wherein switches of the L phase legs are configured such that a ratio of an input voltage of the hybrid multi-phase step-down power converter to an output voltage of the hybrid multi-phase step-down power converter is equal to N/D, and wherein L, M, N are positive integers with M<L and L>2, and D is a duty cycle of the hybrid multi-phase step-down power converter.

2. The hybrid multi-phase step-down power converter of claim 1, further comprising:

L inductors, wherein each inductor of the L inductors is connected between a lowest switch common node of the plurality of switches of a corresponding phase leg and an output terminal of the hybrid multi-phase step-down power converter.

3. The hybrid dual-phase step-down power converter of claim 2, wherein:
the first flying capacitor of the Mth phase is connected between the Mth phase leg and the lowest switch common node of the plurality of switches of the (M+1)th phase leg; and
the first flying capacitor of the Lth phase is connected between the Lth phase leg and the lowest switch common node of the plurality of switches of the first phase leg.

4. The hybrid multi-phase step-down power converter of claim 2, wherein:
each of the L phase legs comprises a third switch, a second switch and a first switch connected in series between the input power source and ground, and wherein a common node of the second switch and the first switch is the lowest switch common node of the plurality of switches of a corresponding phase leg;
the first flying capacitor of the Mth phase is connected between a common node of the third switch and the second switch of the Mth phase leg, and a common node of the second switch and the first switch of the (M+1)th phase leg;
the first flying capacitor of the Lth phase is connected between a common node of the third switch and the second switch of the Lth phase leg, and a common node of the second switch and the first switch of the first phase leg;
a first inductor of the L inductors is connected between the common node of the second switch and the first switch of the first phase leg and the output terminal of the hybrid multi-phase step-down power converter; and
an Mth inductor of the L inductors is connected between a common node of the second switch and the first switch of the Mth phase leg and the output terminal of the hybrid multi-phase step-down power converter.

5. The hybrid multi-phase step-down power converter of claim 4, wherein when L is an even number, the hybrid multi-phase step-down power converter is configured to operate in four different time intervals, and wherein:
in a first time interval of the four different time intervals, the first switches, the third switches of odd-numbered phase legs and the second switches of even-numbered phase legs are configured to be turned on, and the second switches of the odd-numbered phase legs, and the first switches and the third switches of the even-numbered phase legs are configured to be turned off, and wherein inductors connected to the odd-numbered phase legs are discharged, and inductors connected to the even-numbered phase legs are charged;
in a second time interval of the four different time intervals, the first switches of the L phase legs are configured to be turned on, and the third switches, the second switches of the L phase legs are configured to be turned off, and wherein the L inductors are discharged;
in a third time interval of the four different time intervals, the first switches, the third switches of the odd-numbered phase legs and the second switches of the even-numbered phase legs are configured to be turned off, and the second switches of the odd-numbered phase legs and the first switches and the third switches of the even-numbered phase legs are configured to be turned on, and wherein the inductors connected to the odd-numbered phase legs are charged and the inductors connected to the even-numbered phase legs are discharged; and
in a fourth time interval of the four different time intervals, the first switches of the L phase legs are configured to be turned on, and the third switches, the second switches of the L phase legs are configured to be turned off, and wherein the L inductors are discharged.

6. The hybrid multi-phase step-down power converter of claim 4, wherein:
the first switches, the second switches and the third switches of the L phase legs, the first flying capacitors of L phases and the L inductors form a power converter having a ratio of the input voltage of the hybrid multi-phase step-down power converter to the output voltage of the hybrid multi-phase step-down power converter is equal to 2/D.

7. The hybrid multi-phase step-down power converter of claim 6, wherein:
the power converter is configured to operate with a duty cycle in a range from 0% to 50%, and wherein as a result of having the duty cycle, an output voltage of the power converter is regulated in a range from 0 V to one fourth of an input voltage applied to the power converter.

8. The hybrid multi-phase step-down power converter of claim 1, further comprising:
L inductors, each inductor of the L inductors connected between a lowest switch common node of the plurality of switches of a corresponding phase leg and an output terminal of the hybrid multi-phase step-down power converter, wherein:
each of the L phase legs comprises a third switch, a second switch and a first switch connected in series between the input power source and ground, and wherein a common node of the second switch and the first switch is the lowest switch common node of the plurality of switches of a corresponding phase leg;
the first flying capacitor of the Mth phase is connected between a common node of the third switch and the second switch of the Mth phase leg, and a common node of the second switch and the first switch of the (M+1)th phase leg;
the first flying capacitor of the Lth phase is connected between a common node of the third switch and the second switch of the Lth phase leg, and a common node of the second switch and the first switch of the first phase leg;
a first inductor of the L inductors is connected between the common node of the second switch and the first switch of the first phase leg and the output terminal of the hybrid multi-phase step-down power converter; and
an Mth inductor of the L inductors is connected between a common node of the second switch and the first switch of the Mth phase leg and the output terminal of the hybrid multi-phase step-down power converter, and wherein:
the second switch and the third switch of each phase leg are configured to operate with a same duty cycle D, and wherein the third switch of each phase leg conducts sequentially with a phase shift equal to (360/L) degrees with reference to the second switch of the same phase leg;

the third switch of the Mth phase leg turns on and off together with the second switch of the (M+1)th phase leg;

the third switch of the Lth phase leg turns on and off together with the second switch of the first phase leg; and the first switch of each phase leg is turned on and off complementary to the second switch of the same phase leg.

9. The hybrid multi-phase step-down power converter of claim 8, wherein:

the first switches, the second switches and the third switches of the L phase legs, the first flying capacitors of the L phases and the L inductors form a power converter having a ratio of an input voltage to an output voltage equal to 2/D.

10. The hybrid multi-phase step-down power converter of claim 8, wherein:

the hybrid multi-phase step-down power converter is configured to operate with a duty cycle in a range from 0 to (1/L), and wherein as a result of having the duty cycle, an output voltage of the hybrid multi-phase step-down power converter is regulated in a range from 0 V to (1/(2L)) of the input voltage applied to the hybrid multi-phase step-down power converter.

11. The hybrid multi-phase step-down power converter of claim 1, further comprising L inductors, wherein each of the L phases further comprises a second flying capacitor, and wherein:

each phase leg comprises a first switch, a second switch, a third switch and a fourth switch connected in series between ground and the input power source;

the first flying capacitor of the Mth phase is connected between a common node of the second switch and the third switch of the Mth phase leg, and a common node of the first switch and the second switch of the (M+1)th phase leg;

the first flying capacitor of the Lth phase is connected between a common node of the third switch and the second switch of the Lth phase leg, and a common node of the first switch and the second switch of the first phase leg; and each of the L inductors is connected between a common node of the first switch and the second switch of a phase leg of the L phase legs and an output terminal of the hybrid multi-phase step-down power converter, and wherein:

the first switches, the second switches, the third switches and the fourth switches of the L phase legs, the first flying capacitors and the second flying capacitors of the L phases and the L inductors form a power converter having a ratio of an input voltage to an output voltage equal to 3/D.

12. The hybrid multi-phase step-down power converter of claim 11, wherein:

the second flying capacitor of the Mth phase is connected between a common node of the fourth switch and the third switch of the Mth phase leg, and a common node of the first switch and the second switch of a phase leg other than the (M+1)th phase leg; and the second flying capacitor of the Lth phase is connected to a common node of the third switch and the fourth switch of the Lth phase leg, and a common node of the first switch and the second switch of a phase leg other than the first phase leg.

13. The hybrid multi-phase step-down power converter of claim 11, wherein:

the second flying capacitor of the Mth phase is connected between a common node of the fourth switch and the third switch of the Mth phase leg, and a common node of the third switch and the second switch of the (M+1)th phase leg; and the second flying capacitor of the Lth phase is connected to a common node of the third switch and the fourth switch of the Lth phase leg, and a common node of the third switch and the second switch of the first phase leg.

14. The hybrid multi-phase step-down power converter of claim 11, wherein:

the second switch, the third switch and the fourth switch of each phase leg are configured to operate with a same duty cycle D, and wherein the fourth switch of each phase leg conducts sequentially with a phase shift equal to (360/L) degrees;

the first switch of each phase leg is turned on and off complementary to the second switch of the same phase leg; and the power converter is configured to operate with a duty cycle in a range from 0 to (1/L), and wherein as a result of having the duty cycle, an output voltage of the power converter is regulated in a range from 0 V to (1/(3L)) of an input voltage applied to the power converter.

15. The hybrid multi-phase step-down power converter of claim 11, wherein:

the second flying capacitor of the each one of the L phases is connected between a common node of the fourth switch and the third switch of a phase leg, and a common node of the first switch and the second switch of the same phase leg.

16. The hybrid multi-phase step-down power converter of claim 15, wherein L is an even number, and wherein the hybrid multi-phase step-down power converter is configured to operate in four different time intervals, and wherein:

in a first time interval, first switches and third switches of odd-numbered phase legs, and second switches and fourth switches of even-numbered phase legs are configured to be turned on, and second switches and fourth switches of the odd-numbered phase legs, and first switches, and third switches of the even-numbered phase legs are configured to be turned off, and wherein the inductors of the odd-numbered phase legs are discharged, and the inductors of the even-numbered phase legs are charged;

in a second time interval, the first switches of the L phase legs are configured to be turned on, and the fourth switches, the third switches, the second switches of the L phase legs are configured to be turned off, and wherein the L inductors are discharged;

in a third time interval, the first switches and the third switches of the odd-numbered phase legs, and the second switches and fourth switches of the even-numbered phase legs are configured to be turned off, and the second switches and fourth switches of the odd-numbered phase legs, and the first switches and the third switches of the even-numbered phase legs are configured to be turned on, and wherein the inductors of the odd-numbered phase legs are charged, and the inductors of the even-numbered phase legs are discharged; and in a fourth time interval, the first switches of the L phase legs are configured to be turned on, and the fourth switches, the third switches, the second switches of the L phase legs are configured to be turned off, and wherein the L inductors are discharged, and wherein:

the hybrid multi-phase step-down power converter is configured to operate with a duty cycle in a range from 0% to 50%, and wherein as a result of having the duty cycle, an output voltage of the hybrid multi-phase step-down power converter is regulated in a range from 0 V to one sixth of an input voltage applied to the hybrid multi-phase step-down power converter.

17. The hybrid multi-phase step-down power converter of claim 1, further comprising a second flying capacitor and a third flying capacitor for each one of the L phase legs and L inductors, wherein L is an even number, and wherein:
  each phase leg comprises a first switch, a second switch, a third switch, a fourth switch and a fifth switch connected in series between ground and the input power source;
  the first flying capacitor of the Mth phase is connected between a common node of the second switch and the third switch of the Mth phase leg, and a common node of the first switch and the second switch of the (M+1)th phase leg;
  the first flying capacitor of the Lth phase is connected between a common node of the third switch and the second switch of the Lth phase leg, and a common node of the first switch and the second switch of the first phase leg;
  the second flying capacitor of each phase is connected between a common node of the fourth switch and the third switch, and a common node of the first switch and the second switch of the same phase leg;
  the third flying capacitor of a Jth phase is connected between a common node of the fourth switch and the fifth switch of a Jth phase leg, and a common node of the first switch and the second switch of a (J−1)th phase leg, wherein J is a positive integer and J is greater than 1, and J is equal to or less than L;
  the third flying capacitor of the first phase is connected between a common node of the fourth switch and the fifth switch of the first phase leg, and a common node of the first switch and the second switch of the Lth phase leg; and
  each of the L inductors is connected between a common node of the first switch and the second switch of a phase leg of the L phase legs, and the output terminal of the hybrid multi-phase step-down power converter, and wherein:
    the first switches, the second switches, the third switches, the fourth switches and the fifth switches of the L phase legs, the first flying capacitors, the second flying capacitors and the third flying capacitors of the L phases and the L inductors form a power converter having a ratio of an input voltage to an output voltage equal to 4/D.

18. The hybrid multi-phase step-down power converter of claim 17, wherein the power converter is configured to operate in four different time intervals, and wherein:
  in a first time interval, first switches, third switches and fifth switches of odd-numbered phase legs, and second switches and fourth switches of even-numbered phase legs are configured to be turned on, and second switches and fourth switches of the odd-numbered phase legs, and first switches, third switches and fifth switches of the even-numbered phase legs are configured to be turned off, and wherein the inductors of the odd-numbered phase legs are discharged, and the inductors of the even-numbered phase legs are charged;
  in a second time interval, the first switches of the L phase legs are configured to be turned on, and the fifth switches, the fourth switches, the third switches, the second switches of the L phase legs are configured to be turned off, and wherein the L inductors are discharged;
  in a third time interval, the first switches, the third switches and the fifth switches of the odd-numbered phase legs, and the second switches and fourth switches of the even-numbered phase legs are configured to be turned off, and the second switches and fourth switches of the odd-numbered phase legs, and the first switches, the third switches and the fifth switches of the even-numbered phase legs are configured to be turned on, and wherein the inductors of the odd-numbered phase legs are charged, and the inductors of the even-numbered phase legs are discharged; and
  in a fourth time interval, the first switches of the L phase legs are configured to be turned on, and the fifth switches, the fourth switches, the third switches, the second switches of the L phase legs are configured to be turned off, and wherein the L inductors are discharged, and wherein:
    the power converter is configured to operate with a duty cycle in a range from 0% to 50%, and wherein as a result of having the duty cycle, an output voltage of the power converter is regulated in a range from 0 V to one eighth of an input voltage applied to the power converter.

19. The hybrid multi-phase step-down power converter of claim 1, further comprising:
  K expansion units, wherein each one of the K expansion units comprises L expansion cells, and wherein each expansion cell comprises:
    an expansion switch connected between a first terminal and a second terminal of a corresponding expansion cell; and
    an expansion capacitor connected between the second terminal and a third terminal of the corresponding expansion cell;
  L inductors, each connected between a common node of the first switch and the second switch of a phase leg of the L phase legs, and an output terminal of the hybrid multi-phase step-down power converter, wherein:
    each one of the L phase legs comprises a third switch, a second switch and a first switch coupled in series between the input power source and ground;
    the first flying capacitor of the Mth phase is connected between a common node of the second switch of the Mth phase leg and the K expansion units, and a common node of the second switch and the first switch of the (M+1)th phase leg;
    the first flying capacitor of the Lth phase is connected to a common node of the second switch of the Lth phase leg and the K expansion units, and a common node of the second switch and the first switch of the first phase leg;
    the second terminal of an Hth expansion cell of a first expansion unit is coupled to the third switch of an Hth phase leg through (K−1) expansion units, wherein H is an positive integer and L is greater than or equal to H;
    the third terminal of an Mth expansion cell of the first expansion unit is connected to a common node of the first switch and the second switch of a phase leg other than the (M+1)th phase leg;

the third terminal of an Lth expansion cell of the first expansion unit is connected to a common node of the first switch and the second switch of a phase leg other than the first phase leg;

the first terminal of an Hth expansion cell of an Ith expansion unit is connected to the second terminal of an Hth expansion cell of an (I−1)th expansion unit, and wherein I is a positive integer, and wherein I is greater than 1, and K is greater than or equal to I;

the second terminal of an Hth expansion cell of a Kth expansion unit is connected to the third switch of the Hth phase leg; and the third terminal of the Hth expansion cell of the Ith expansion unit is connected to a common node of the first switch and the second switch of a phase leg other than the phase leg to which the third terminal of an Hth expansion cell of the (I−1)th expansion unit is connected.

20. The hybrid multi-phase step-down power converter of claim 19, wherein:

after the K expansion units have been added into the hybrid multi-phase step-down power converter, a ratio of the input voltage of the hybrid multi-phase step-down power converter to the output voltage of the hybrid multi-phase step-down power converter is equal to (K+2)/D, and wherein K is an integer, and D is the duty cycle of the hybrid multi-phase step-down power converter.

21. The hybrid multi-phase step-down power converter of claim 20, wherein:

the second switch, the third switch of each phase leg, and switches of all expansion units are configured to operate with a same duty cycle D, and wherein the third switch of each phase leg conducts sequentially with a phase shift equal to (360/L) degrees;

the first switch of each phase leg is turned on and off complementary to the second switch of the same phase leg; and the hybrid multi-phase step-down power converter is configured to operate with a duty cycle in a range from 0 to 1/L, and wherein:

as a result of having the duty cycle, the output voltage of the hybrid multi-phase step-down power converter is regulated in a range from 0 V to $1/((K+2)\times L)$ of an input voltage applied to the hybrid multi-phase step-down power converter.

22. The hybrid multi-phase step-down power converter of claim 20, wherein when L is an even number, wherein:

the third terminal of the Hth expansion cell of an odd-numbered expansion unit is connected to a common node of the first switch and the second switch of the Hth phase leg; and the third terminal of the Hth expansion cell of an even-numbered expansion unit is connected to a common node of the first switch and the second switch of a phase leg other than the Hth phase leg.

23. The hybrid multi-phase step-down power converter of claim 22, wherein:

the hybrid multi-phase step-down power converter is configured to operate in four different time intervals, and wherein:

in a first time interval, first switches of odd-numbered phase legs, odd-numbered switches of odd-numbered expansion units, even-numbered switches of even-numbered expansion units and second switches of even-numbered phase legs are configured to be turned on, and second switches of the odd-numbered phase legs, the even-numbered switches of the odd-numbered expansion units, the odd-numbered switches of the even-numbered expansion units and first switches of the even-numbered phase legs are configured to be turned off, and wherein inductors connected to the odd-numbered phase legs are discharged, and inductors connected to the even-numbered phase legs are charged;

in a second time interval, first switches of the L phase legs are configured to be turned on, and third switches, second switches of the L phase legs, and switches of the K expansion units are configured to be turned off, and wherein the L inductors are discharged;

in a third time interval, the first switches of the odd-numbered phase legs, the odd-numbered switches of the odd-numbered expansion units, the even-numbered switches of the even-numbered expansion units and the second switches of the even-numbered phase legs are configured to be turned off, and the second switches of the odd-numbered phase legs, the even-numbered switches of the odd-numbered expansion units, the odd-numbered switches of the even-numbered expansion units and the first switches of the even-numbered phase legs are configured to be turned on, and wherein the inductors connected to the odd-numbered phase legs are charged and the inductors connected to the even-numbered phase legs are discharged; and in a fourth time interval, the first switches of the L phase legs are configured to be turned on, and the third switches, the second switches of the L phase legs, and the switches of the K expansion units are configured to be turned off, and wherein the L inductors are discharged, and wherein:

the hybrid multi-phase step-down power converter is configured to operate with a duty cycle in a range from 0% to 50%, and wherein as a result of having the duty cycle, an output voltage of the hybrid multi-phase step-down power converter is regulated in a range from 0 V to $1/(2\times(2+K))$ of an input voltage applied to the hybrid multi-phase step-down power converter.

* * * * *